(12) United States Patent
Chachek et al.

(10) Patent No.: US 11,354,728 B2
(45) Date of Patent: Jun. 7, 2022

(54) SYSTEM, DEVICE, AND METHOD OF AUGMENTED REALITY BASED MAPPING OF A VENUE AND NAVIGATION WITHIN A VENUE

(71) Applicant: WE.R AUGMENTED REALITY CLOUD LTD., Kfar Saba (IL)

(72) Inventors: Amit Chachek, Closter, NJ (US); Tomer Chachek, Beit Yehoshua (IL); Gil Gavish, Brooklyn, NY (US); Igor Maslo, Holon (IL); Yaniv Hasbani, Tel Aviv (IL); Glenn Russell Jocher, Los Angeles, CA (US); Marc Barnada Rius, Frankfurt am Main (DE)

(73) Assignee: WE.R AUGMENTED REALITY CLOUD LTD., Kfar Saba (IL)

( * ) Notice: Subject to any disclaimer, the term of this patent is extended or adjusted under 35 U.S.C. 154(b) by 212 days.

(21) Appl. No.: 16/826,328

(22) Filed: Mar. 23, 2020

(65) Prior Publication Data

US 2020/0302510 A1 Sep. 24, 2020

Related U.S. Application Data

(60) Provisional application No. 62/822,895, filed on Mar. 24, 2019.

(51) Int. Cl.
*G06Q 30/00* (2012.01)
*G06Q 30/06* (2012.01)
(Continued)

(52) U.S. Cl.
CPC ....... *G06Q 30/0639* (2013.01); *G06K 9/6289* (2013.01); *G06Q 30/0276* (2013.01);
(Continued)

(58) Field of Classification Search
None
See application file for complete search history.

(56) References Cited

U.S. PATENT DOCUMENTS 8,422,994 B2 * 4/2013 Rhoads .................. H04W 4/02
455/411
8,467,133 B2 * 6/2013 Miller .................... G06Q 30/02
359/13

(Continued)

FOREIGN PATENT DOCUMENTS

KR 20180089907 A * 8/2018 ............. G08C 17/02
WO WO-2019023659 A1 * 1/2019 ........... G06Q 20/123

OTHER PUBLICATIONS

Alfonso Segura. AR and VR in Fashion Retail. (May 7, 2018). Retrieved online Dec. 16, 2021. https://fashionretail.blog/2018/05/07/ar-vr-in-fashion/ (Year: 2018).*

(Continued)

*Primary Examiner* — James A Reagan

(57) ABSTRACT

System, device, and method of Augmented Reality based mapping of a venue and navigation within a venue. A method includes: performing a crowd-sourced mapping process, that maps a retail store and maps particular products sold within that retail store, based on computer-vision analysis of a plurality of images captured by a plurality of end-user devices of customers within that retail store; and generating a representation of a store map reflecting actual real-time location of particular products within that retail store. Turn-by-turn walking directions are provided, to guide the user from his current in-store location towards a destination product within that retail store. Augmented Reality promotions, advertisements and marketing content elements, route guidance, and other content are generated and displayed on the end-user device.

15 Claims, 42 Drawing Sheets

(51) Int. Cl.

| | |
|---|---|
| *H04W 4/021* | (2018.01) |
| *G06Q 30/02* | (2012.01) |
| *G06K 9/62* | (2022.01) |
| *H04W 4/024* | (2018.01) |
| *G06V 20/20* | (2022.01) |

(52) U.S. Cl.
CPC ............ *G06V 20/20* (2022.01); *H04W 4/021* (2013.01); *H04W 4/024* (2018.02)

(56) References Cited

U.S. PATENT DOCUMENTS

| | | | | |
|---|---|---|---|---|
| 8,472,120 | B2* | 6/2013 | Border | G02B 27/017 359/13 |
| 8,606,645 | B1* | 12/2013 | Applefeld | G06Q 30/02 705/26.1 |
| 9,412,121 | B2* | 8/2016 | Tatzel | G06Q 30/0276 |
| 9,484,046 | B2* | 11/2016 | Knudson | G06T 1/0064 |
| 9,547,873 | B2* | 1/2017 | Rhoads | G06Q 30/0643 |
| 9,759,917 | B2* | 9/2017 | Osterhout | G06F 3/011 |
| 9,910,501 | B2* | 3/2018 | Chirakan | G06F 3/017 |
| 10,095,929 | B1* | 10/2018 | Hoover | G06Q 30/0643 |
| 10,180,572 | B2* | 1/2019 | Osterhout | G06Q 30/02 |
| 10,216,284 | B2* | 2/2019 | Chirakan | G06Q 30/0633 |
| 10,971,171 | B2* | 4/2021 | Davis | G06F 3/0481 |
| 11,249,714 | B2* | 2/2022 | Spivack | A63F 13/80 |
| 2002/0010734 | A1* | 1/2002 | Ebersole | H04L 67/36 709/201 |
| 2010/0030578 | A1* | 2/2010 | Siddique | G06Q 40/12 705/3 |
| 2010/0070171 | A1* | 3/2010 | Barbeau | G01C 21/3617 701/408 |
| 2012/0062596 | A1* | 3/2012 | Bedi | G06Q 30/0267 345/633 |
| 2013/0215116 | A1* | 8/2013 | Siddique | G06Q 20/204 345/420 |
| 2013/0293530 | A1* | 11/2013 | Perez | G06Q 30/0251 345/418 |
| 2013/0317944 | A1* | 11/2013 | Huang | G06Q 30/0623 705/26.61 |
| 2014/0100994 | A1* | 4/2014 | Tatzel | G06Q 30/0276 705/27.1 |
| 2014/0100995 | A1* | 4/2014 | Koshy | G06Q 30/0643 705/27.2 |
| 2014/0100996 | A1* | 4/2014 | Klein | G06T 1/00 705/27.2 |
| 2014/0100997 | A1* | 4/2014 | Mayerle | G06Q 30/0276 705/27.2 |
| 2014/0357312 | A1* | 12/2014 | Davis | G06F 3/04842 455/550.1 |
| 2015/0012426 | A1* | 1/2015 | Purves | G06Q 20/321 705/41 |
| 2015/0073907 | A1* | 3/2015 | Purves | G06Q 20/32 705/14.58 |
| 2015/0123973 | A1* | 5/2015 | Larsen | G06T 17/20 345/427 |
| 2016/0086384 | A1* | 3/2016 | Stroila | H05K 999/99 345/633 |
| 2016/0196603 | A1* | 7/2016 | Perez | G06F 3/16 345/633 |
| 2016/0210602 | A1* | 7/2016 | Siddique | G06Q 20/384 |
| 2017/0039613 | A1* | 2/2017 | Kaehler | G06Q 30/0643 |
| 2017/0236006 | A1* | 8/2017 | Davis | H04M 1/72469 715/716 |
| 2018/0315011 | A1* | 11/2018 | Clarke | G06Q 20/208 |
| 2018/0357670 | A1* | 12/2018 | DeLuca | G06K 9/6201 |
| 2019/0107990 | A1* | 4/2019 | Spivack | G06F 3/1454 |
| 2019/0107991 | A1* | 4/2019 | Spivack | G06F 3/013 |
| 2019/0108578 | A1* | 4/2019 | Spivack | G06F 3/147 |
| 2019/0260870 | A1* | 8/2019 | Spivack | G06F 3/011 |
| 2019/0278993 | A1* | 9/2019 | Hoover | G02B 27/017 |
| 2019/0325498 | A1* | 10/2019 | Clark | G06K 7/1417 |
| 2020/0258480 | A1* | 8/2020 | Bronder | G09G 5/38 |
| 2020/0401576 | A1* | 12/2020 | Yerli | G06F 9/46 |
| 2021/0084451 | A1* | 3/2021 | Williams | H04W 4/38 |
| 2021/0374783 | A1* | 12/2021 | Bronicki | G06V 20/52 |
| 2021/0374823 | A1* | 12/2021 | Bronicki | H04W 4/35 |
| 2021/0374836 | A1* | 12/2021 | Bronicki | G06Q 30/0623 |

OTHER PUBLICATIONS

Steven Wong. Augmented Reality Could Revolutionize How People Shop And Engage With Brands. (May 26, 2017). Retrieved online Dec. 16, 2021. https://www.alistdaily.com/digital/morph3d-augmented-reality-dressing-room-revolutionizes-retail-shopping/ (Year: 2017).* wired.com. "Google Turns to Users to Improve Its AI Chops Outside the US." (Apr. 5, 2018). Retrieved online Feb. 27, 2022). https://www.wired.com/story/google-turns-to-users-to-improve-its-ai-chops-outside-the-us/ (Year: 2018).*

Deloitte. "Augmented and virtual reality go to work." (Feb. 24, 2016). Retrieved online Apr. 10, 2022. https://www2.deloitte.com/us/en/insights/focus/tech-trends/2016/augmented-and-virtual-reality.html (Year: 2016).*

* cited by examiner

Fig. 14       1400

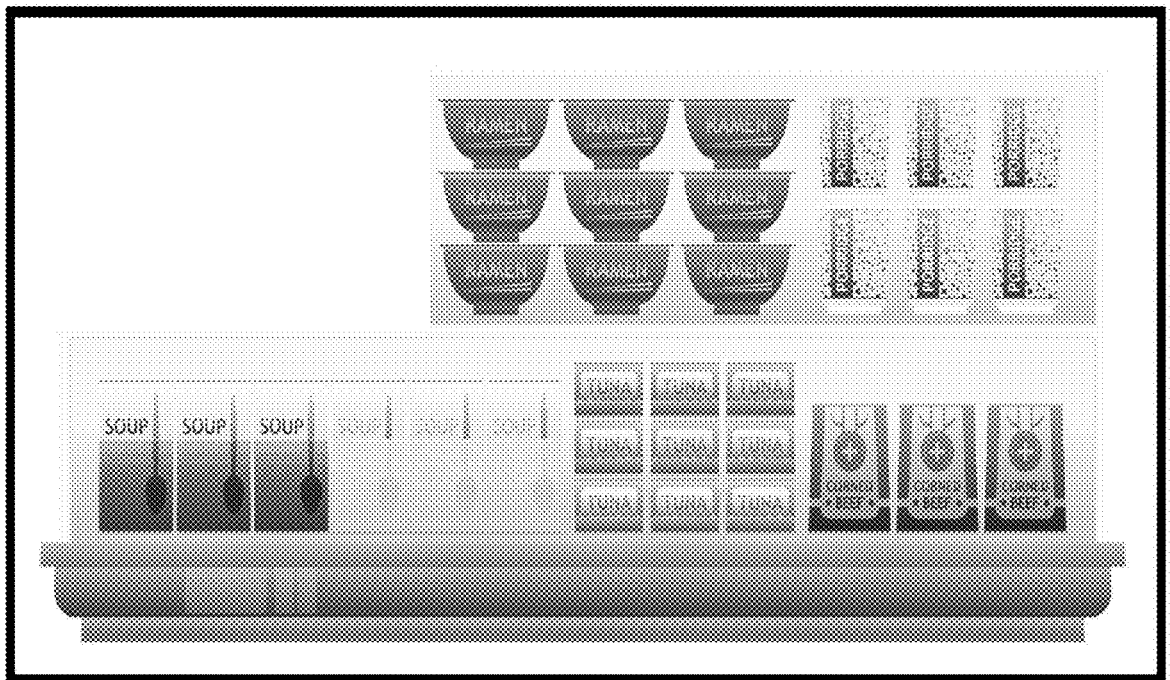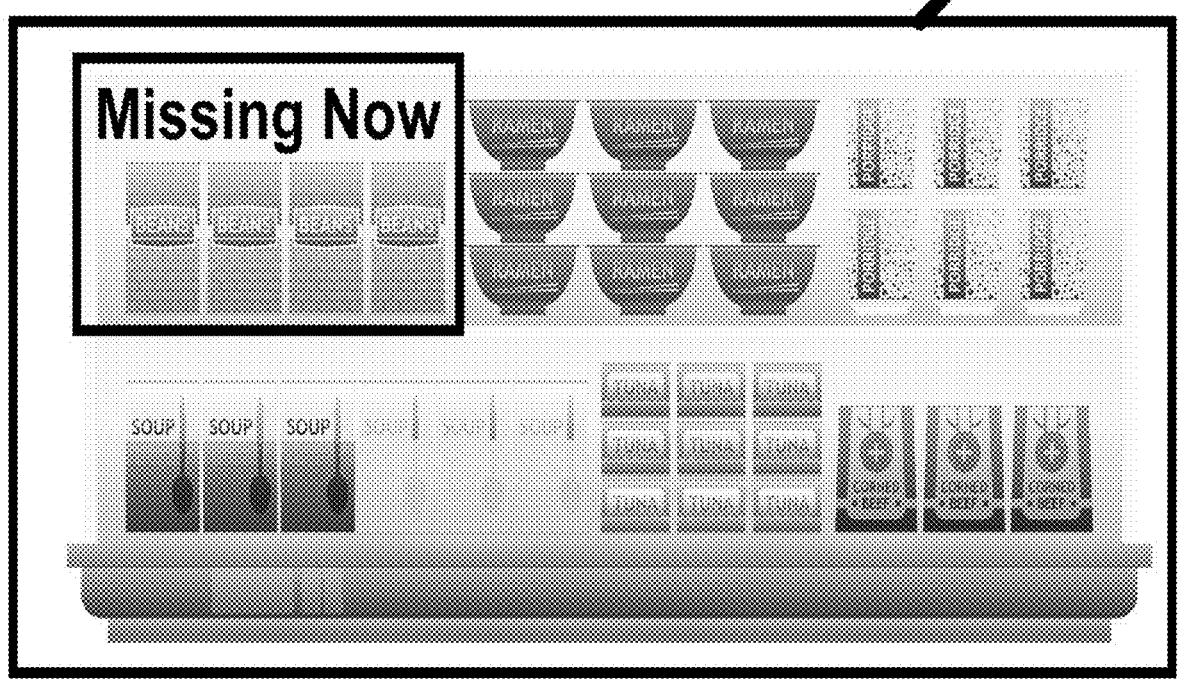
Fig. 18

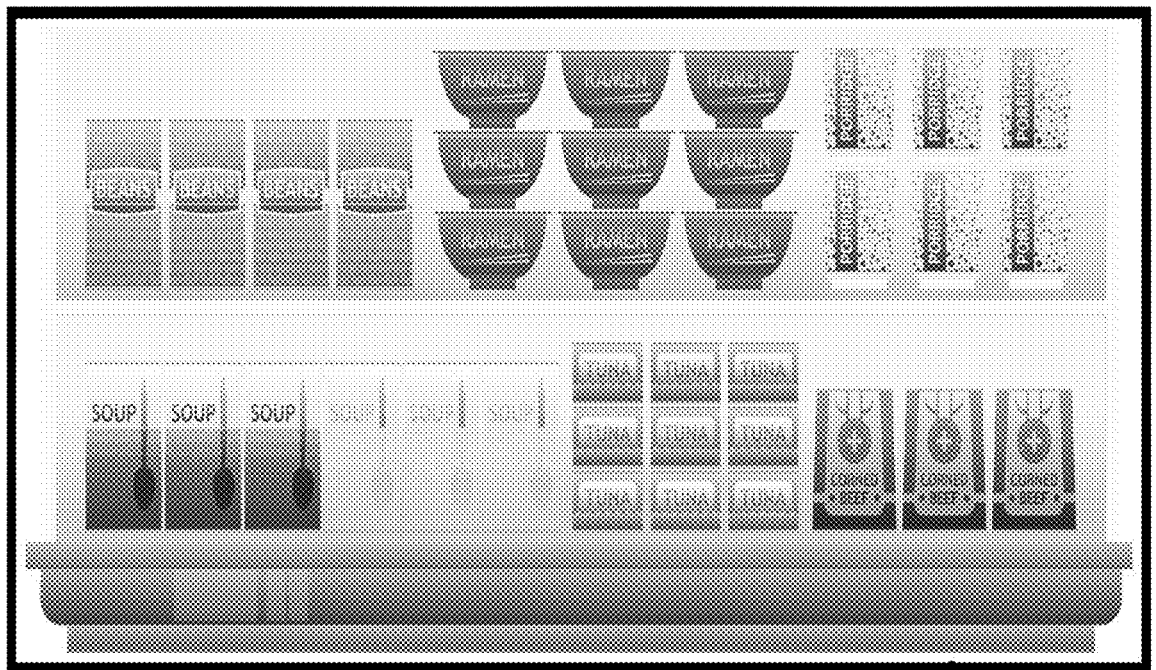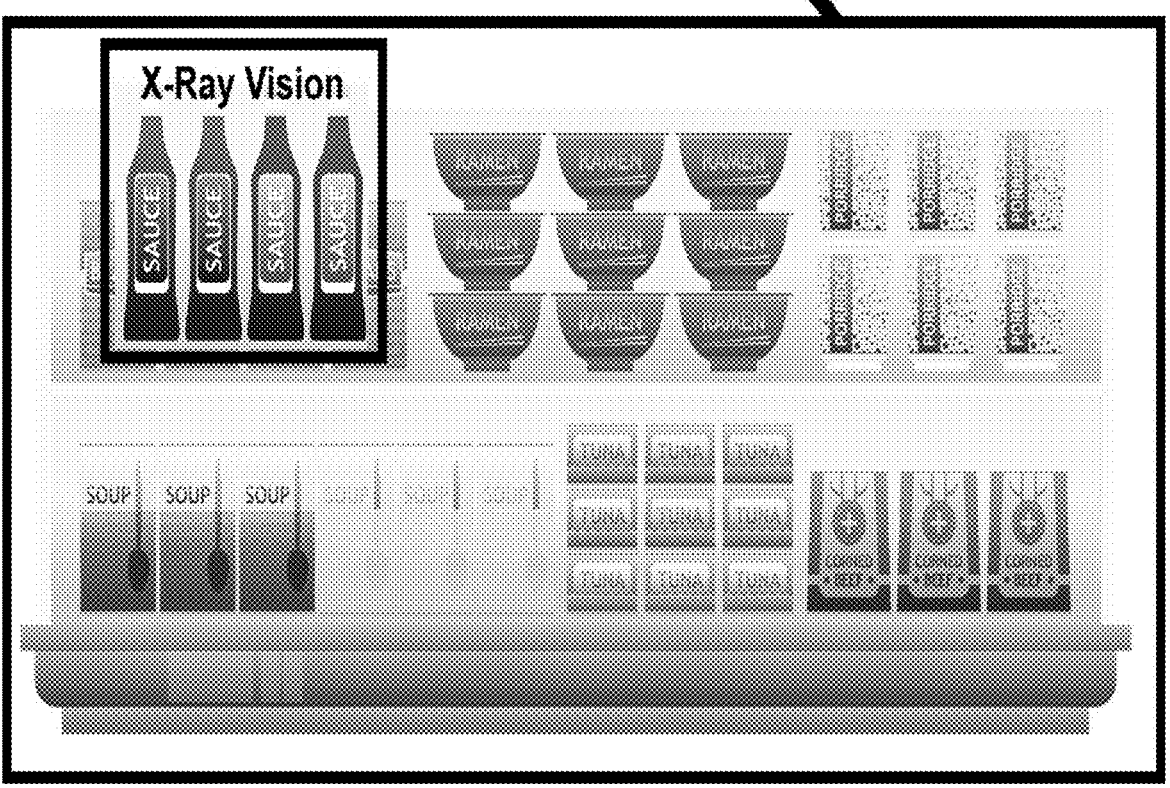
Fig. 19

(North-West Quarter)

(South-West Quarter)

(North-East Quarter)

(South-East Quarter)

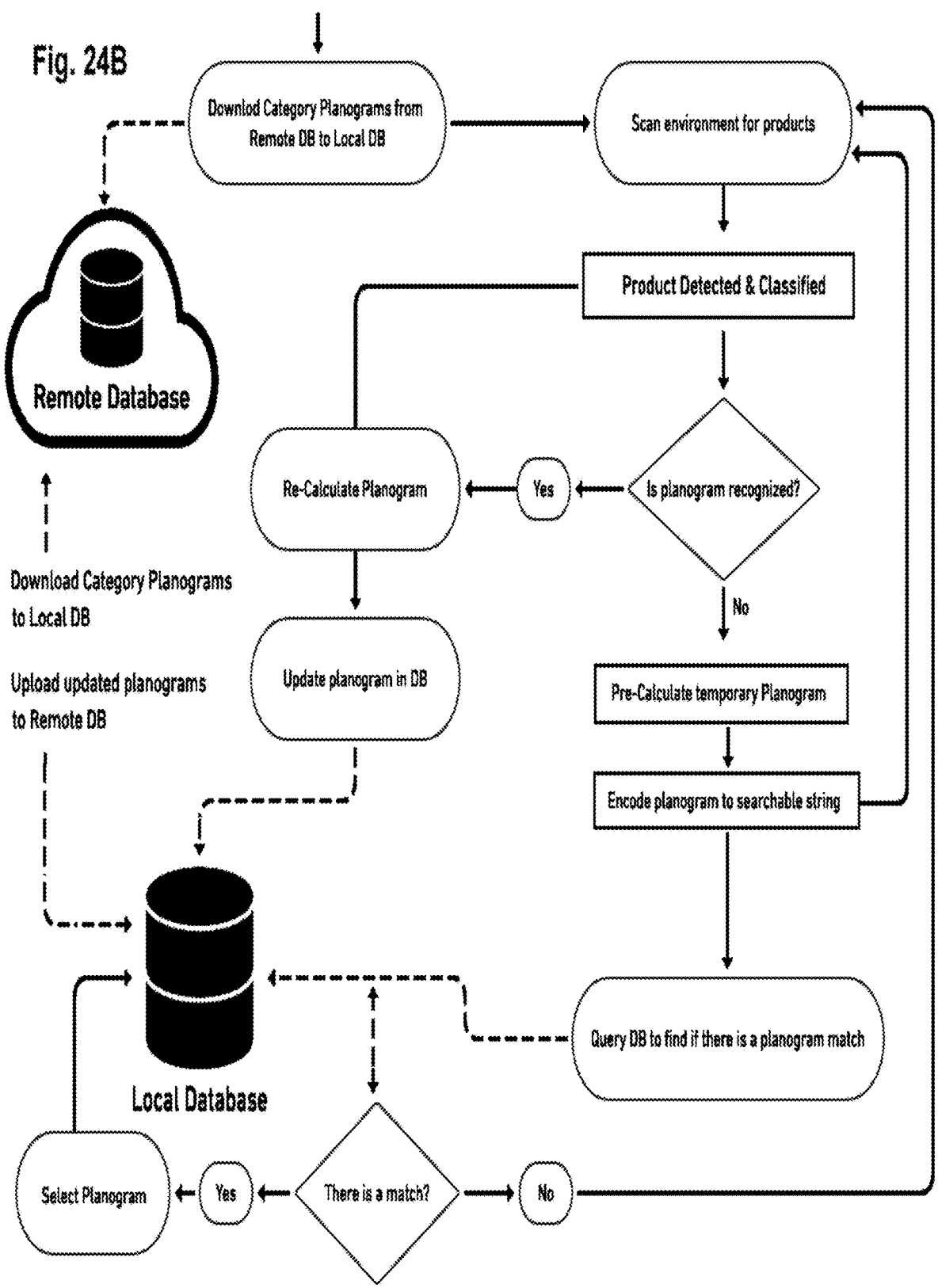

SYSTEM, DEVICE, AND METHOD OF AUGMENTED REALITY BASED MAPPING OF A VENUE AND NAVIGATION WITHIN A VENUE

CROSS-REFERENCE TO RELATED APPLICATIONS

This patent application claims benefit and priority from U.S. 62/822,895, filed on Mar. 24, 2019, which is hereby incorporated by reference in its entirety.

FIELD

The present invention is related to electronic devices and computerized systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

SUMMARY

The present invention provides systems, devices, and methods for Augmented Reality (AR) based mapping of a venue and its real-time inventory, as well as real-time navigation within such venue. The system utilizes flexible and modular technology, that is continuously updated in real-time or in near-real-time, for localization of a user (having an end-user electronic device, such as smartphone or tablet or smart-watch) within a venue (e.g., a store, a supermarket, a shopping center, a mall, or the like), and for navigating or routing or guiding such user among products or elements in such venue based on the spatial localization and recognition of inventory elements and other elements that are located in such venue. The present invention is capable of operating in a continuously-changing environment of a busy store or mega-store of a retailer, in which shelves and aisles are continuously changing, and in which the views captured by store cameras and/or by electronic devices of users are continuously shopping, for example, due to customers taking or removing products from shelves, employees stocking or re-stocking products into shelves, employees moving and re-arranging items within the store (e.g., particularly before and after holidays and sale events), and many other changes that occur.

Some embodiments may utilize real-time or near-real-time mapping of the venue and its current inventory, as well as its current arrangement of inventoried items, by crowd-sourcing numerous images or frames or videos that are obtained from end-users that roam the store, such as from customers and/or from employees. Some embodiments may incentivize customers to participate in such crowd-sourced effort of mapping and localization of the venue and its inventor, or may reward such participation, by providing to such participating customers one or more incentives, rewards, prizes, discounts, coupons, promotional items, monetary incentives, crypto-currency, virtual rewards (e.g., "stars" or "points" which may optionally be exchanged for real-world tangible items, or for money or for crypto-currency), or the like. Additionally or alternatively, some embodiments may provide to the participating user an improved or interesting user experience, such as by showing to him animated AR avatars or characters that may run through the aisles of the store or may pop-out of a shelf or a storage cabinet in the store, thereby making the in-store experience of such participating user a more interesting one or a fun interaction, optionally with elements of gamification and/or prizes (e.g., discounts, promotions) that are achieved if the user performs one or more pre-defined tasks.

The system may thus create an up-to-date planogram of the store and its current inventory, reflecting the current supply of products and their current and precise in-store location and arrangement, based on crowd-sourced images or videos from multiple end-users having multiple respective end-user devices.

A conventional inventory database of a store may be able to merely indicate that the store currently has 500 bottles of Sprite available for sale, with 50 such bottles located at their regular location which is Shelf 3 on Aisle 6, and with 450 other bottles located at the warehouse. In contrast, the planogram or inventory data-set generated by analysis of crowd-sourced images or videos, may enable the system to generate additional or other insights; for example, an insight that one bottle of Sprite is actually located right now in Shelf 2 of Aisle 4 (e.g., a customer has left it there); or an insight that the intended Shelf 3 on Aisle 6 currently shows only 12 bottles of Sprite, and therefore 38 bottles are either misplaced in the store or are currently located within shopping carts and shopping baskets of customers that did not yet check-out; or an insight that in contrast to the inventory database, 30 bottles of Sprite are actually located right now at a "Get Ready for Super-Bowl" promotional table at the front of the store; and/or that more than 43 customers have stood in front of the Sprite shelf in the past 20 minutes, indicating a high demand or high interest of customers in this particular shelf (or product) at this particular time; and/or other advanced insights. Such insights cannot be generated by conventional systems, including those that utilize fixed ceiling camera and/or robotic devices; for example, the ceiling camera has a limited field-of-view that cannot capture the true details that are needed for generating such insights; and the limited number of robotic devices, together with their low speed of movement, do not enable a real-time mapping and localization of such inventory having thousands of items located on hundreds of shelves; while in contrast, dozens or hundreds of end-user devices of participating users (customers and/or employees) may be harnessed by the system of the present invention to capture data that allows generation of such advanced insights.

In some embodiments, the generated planograms and/or AR-based localization data may be represented using light-weight formats, such as CSV or XML formats, rather than utilizing heavy databases and large files (which require expensive storage and processing resources, as well as cause latency and delay when accessed by a user). The system may further enable, or may be utilized in conjunction with, one or more solutions for "visual scan and go" or "take and go", in which the system identifies that a particular user has placed a particular product in his basket or shopping cart, and upon exiting the store may proceed to automatically bill the user's account (or his payment method, such as credit card or debit card) with the price of the relevant product(s) at their relevant quantities; and without necessarily relying or local scan or remote scan of a barcode on the product in order to enable such check-out process.

In some embodiments, localization of a user and/or a product and/or an item (e.g., a shelf, a cabinet, a fridge) within the store, may be performed based on fusion of data from multiple sources; for example, based on Wi-Fi based localization (e.g., taking into account the signal strength of the Wi-Fi signal at or by an end-user device in order to deduce its location in the store), in combination with visual-based localization or computer vision based localization (e.g., taking into account that an analysis of an image that was just captured or streamed by the end-user device, shows an up-close view of a shelf with 13 bottles of Sprite). In some embodiments, this may assist the system to determine, for example, whether the user is located right now in front of the general beverage shelf (which has bottles of Sprite), or in front of a promotional shelf for Super Bowl products (which also has bottles of Sprite). The combination of signals and data from two or more sources, optionally utilizing Machine Learning (ML) and/or other techniques, may enable the system to provide a more accurate localization and/or a more continuous localization, or users and/or of products.

Furthermore, the computer vision analysis of images or videos captures by end-user devices, may be utilized in order to calibrate or fine-tune the accuracy of the Wi-Fi based localization. For example, the system may detect that for at least 85 percent of the users, who stood in front of the Sprite shelf and sent an image of that shelf, the Wi-Fi signal at that time was extremely low, or had a particular signal strength value (or a particular subset or range-of-values); and therefore, the system may adapt and learn that if another user shows such low signal, it may be estimated that he is also located at that particular shelf or area, even if that particular user does not currently share images from his end-user device with the system. This may enable the system to support even applications or "apps" that utilize only Wi-Fi based localization, at a greater accuracy and/or reliability, based on insights that were generated by the system by correlating between Wi-Fi localization data and images from users who do participate in the crowd-source effort.

In some embodiments, the system may utilize one or more techniques in order to improve the accuracy of identifying a product (and also its in-store location); for example: (a) by requesting from a user an indication of the size of the product (e.g., "are you standing in front of a product that is taller than one foot?"; (b) by requesting from a user an approval of a text or a logo of a product (e.g., "It seems that you are standing next to the Sprite bottles shelf, is this correct?"); (c) by fine-tuning or drilling-down into categories and sub-categories of products (e.g., analyzing a set of images, detecting that they all relate to Soda Beverages, and therefore drilling-down and determining that the blue liquid bottle is Gatorade juice and is not a window cleaning liquid); (d) by utilizing GPS localization, in some embodiments (e.g., when the user is standing next to a door or window of a large mega-store; allowing the system to determine based on GPS localization that the user is now standing at the North exit of the store which is close to the Beverage section, rather than at the South exit of the store which is next to the Cleaning Supplies); (e) by performing cutting or cropping or trimming of images of products (e.g., modifying an image of a product to appear as if the product is viewed from its front side), thereby allowing the system to better cut and isolate the product-image from its surrounding, which in turn translates into an improved computer-vision based identification of the product, and which also enables the system to use such cut or trimmed or aligned image as a "tracker" that remains associated with a particular item or product or shelf and possibly continues to be tracked even as the end-user device moves (e.g., the user is walking) and/or if the product moves (including, for example, movement of the product not in relation to the end-user or not in relation to the end-user device; such as, the user picks up a product from the shelf and holds the product in his hand and starts walking, the product remains at the same distance relative to the user's device and the user himself, and the product image or graphics, or other AR-based content or VR-based content, continue to stick to the product on the screen even as the user walks around the store); (f) by utilizing inputs from multiple different users in order to re-assure and re-confirm the spatial location of a particular product or item (e.g., five end-user devices have submitted, in the past three minutes, images that indicate via ML analysis and computer vision that a bottle of Sprite is shown at the Toys shelf; therefore, deducing automatically that this is indeed a bottle of Sprite that was misplaced there); and/or other suitable methods.

In some embodiments, some or most of all of the computer vision analysis of captured image footage or video footage, may be performed locally within the end-user device of each such user of the crowd-sourced participants; thereby reducing the need and the cost to send and receive large amounts of image data or video data, or to store or process them at cloud-based servers or store-located servers; and/or increasing the level of privacy that is provided to users, as the system need not continuously share or upload a live stream of video or images, which involves a greater exposure to the privacy of the user himself as well as other in-store customers around him, but rather, the system only selectively uploads particular images or image-portions that depict a recognized product, rather than images of faces or people); and/or also increasing the speed of detecting products and localizing items within the store due to parallel computing or distributed computing efforts (e.g., ten end-user devices are performing locally and in parallel in near-real-time their computer vision analysis on their ten respective images or video streams; instead of the latency that would be created by each device having to upload its images or videos to a processing queue at a remote server). In some embodiments, only a small percentage of images that are captured and that are processed locally on the end-user device, end up being uploaded or sent to a remote server (e.g., only identified and confirmed products); and also, images or image-portions that correspond to human users and/or to their faces, are not uploaded or not shared with a remote server, thereby increasing the privacy of the solution provided by the system. Some embodiments may thus further enable the implementation of "scan and go" or "take and go" technologies, or "self check-out solutions, and/or may allow the system to synchronize between or among (i) product location data as extracted from cameras of end-user devices of users, and (ii) product location data as sensed by store-operated camera and sensors (e.g., ceiling camera, shelf camera, weight sensor of a shelf, barcode scanner), thereby improving the accuracy of self check-out and seamless checkout processes.

In some embodiments, the planograms and the inventory maps that are generated by the crowd-sourced system of the present invention, may be utilized for a variety of purposes; including, for example, to generate a notification to the store management team about a lack of a particular product or type of products (e.g., "the Sprite bottles shelf currently has only three bottles left please re-stock immediately"), or about an excess inventory of a particular product on a shelf (e.g., "the Sprite bottles shelf currently shows 15 bottles, please take back 5 bottles to the warehouse), or about misplacement of a product (e.g., "a Sprite bottle is currently located on Shelf 3 in the Toys section"), or about defective products (e.g., "an open Sprite bottle is currently shown on Shelf 4 in Beverages, please remove it from there immediately"), or about discrepancy between inventory database and actual shelves (e.g., "Store inventory database shows that we have a total of 8 bottles of Sprite currently available for sale, but image data of the Beverages shelf shows there 11 bottles of Sprite"), or other insights or notifications which may be generated by comparing the current maps to one or more pre-defined maps or data-sets, and/or by applying one or more rules or conditions for generating such notifications or alerts.

Some embodiments may provide or may enable automation of complicated processes; for example, automated scanning and tagging of products (e.g., based on a product barcode that is shown in the image taken by an end-user device, in combination with computer vision analysis that identifies the product itself); allowing the system to collect dozens or hundreds of images of a single product in a short time, and a cloud-based server may gather the analyzed data from multiple end-user device in order to construct meshes and sub-meshes of products, based on categories or other taxonomy system; and such categorized data may then be used to rapidly map the inventory and content of a new store which sells some or all of already-identified products that were identified from other stores. In a demonstrative example, the mapping of products that are sold at five current branches of a particular chain of stores, may allow rapid automated mapping of the products of the sixth branch, and may also allow rapid and automated mapping of the products of an entirely different store that sells the same products or a subset of the same products. Furthermore, end-user devices operate to enrich the information gathered in the cloud, and in turn the cloud-based system may send to end-user devices data that would assist the end-user devices to further map and localize the store or the products therein, or that would help the end-user device to provide advanced AR-based features when the user is within such store (e.g., AR-based coupons and promotions, animated avatars, or the like).

In some embodiments, the system of the present invention may be utilized in conjunction with marketing and advertising campaigns, as discussed further herein. For example, a customer in the store that participates in the AR-based crowd-sourced effort of mapping and localizing the store's product and inventory, may be awarded or rewarded with prizes, rewards, discounts, coupons, promotional items, or the like. Furthermore, advertisers may utilize the system in order to initiate and generate real-time AR-based and location-based in-store advertising; such that, for example, an end-user device that is determined to be located in front of the Sprite bottles shelf, would show on his screen an animated promotion or animated avatar that suggests to him to purchase this product (or, conversely, to purchase a competing product), optionally, with a tailored promotion (e.g., a unique 20% off coupon to purchase Sprite, for a user that lingered for at least T seconds in front of the Beverages shelf). Moreover, such advertising or marketing campaign may further be tailored or customized based on other data that may be available about the particular user of the end-user device (e.g., gender, age, age-range, profession, or the like), as may be obtained from a user profile (e.g., defined by the user when he installs the relevant application) or as may be extracted from shopping history or shopping information (e.g., deducing that this particular user is a female, since the user has lingered in front of a shelf for female clothes and in front of a shelf for feminine hygiene products) or as may be extracted from other sources (e.g., the user may be logged-in into his social network account which provides various other data about the particular user). Additionally or alternatively, such advertising or marketing campaign may further be tailored or customized based on the real-time supply and/or the real-time demand for a particular product or type-of-product; for example, allowing an advertiser to indicate to the system in advance, that if at least 15 customers have lingered at the Sprite shelf in the past 10 minutes, then there is currently ample demand for this product in this store at this time-slot, and that no promotional coupon should be offered; or conversely, allowing an advertiser to indicate to the system in advance, that if not more than two customers have lingered at the Sprite shelf in the past 10 minutes, then there is currently lack of demand for this product in this store at this time-slot, and therefore a promotional coupon should be offered to customers that enter the Beverages aisle.

BRIEF DESCRIPTION OF THE DRAWINGS

FIG. 18 is a schematic illustration of two images displayed on a user device, demonstrating AR-based augmenting of missing products, in accordance with some demonstrative embodiments of the present invention.

FIG. 19 is a schematic illustration of two images displayed on a user device, demonstrating images used or generated by an X-ray vision module in accordance with some demonstrative embodiments of the present invention.

FIGS. 24A-24B are two parts of a flow-chart demonstrating planogram flow in an application, in accordance with some demonstrative embodiments of the present invention.

DETAILED DESCRIPTION OF SOME DEMONSTRATIVE EMBODIMENTS

Figure 1:
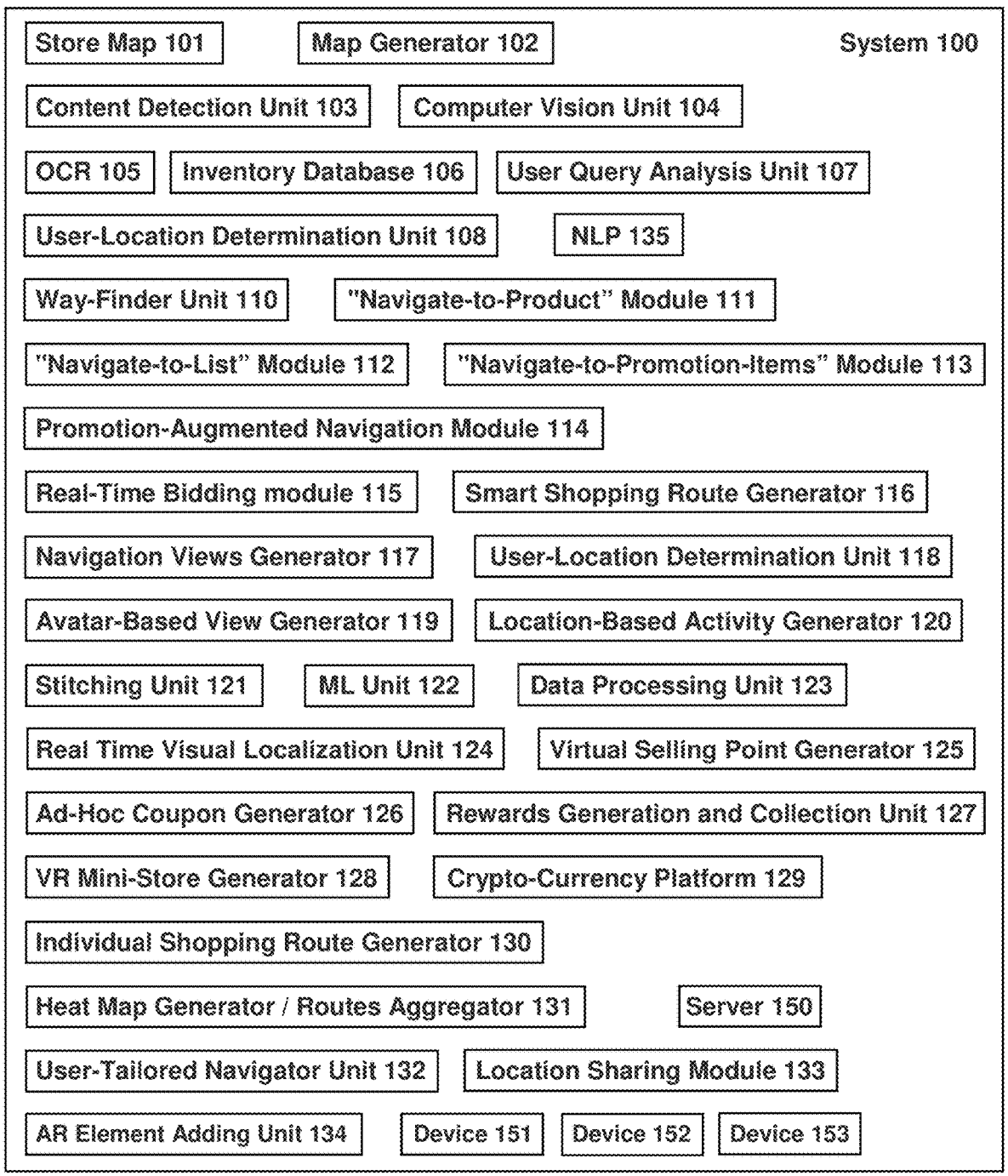
FIG. 1 is a schematic block-diagram illustration of a system, in accordance with some demonstrative embodiments of the present invention.

The present invention includes systems, devices, and methods that generate and utilize Augmented Reality (AR) data or datasets or objects or representations, particularly for the purpose of organizing and/or categorizing and/or classifying real-life items or products or locations, and/or for navigating from a first real-life location (or product region) to a second real-life location (or product region), such as, within a store, a superstore or megastore, a shopping mall, or the like.

The present invention may comprise for example: a visual and/or AR-based navigation system; a product-based advertising and marketing system; an AR-based navigation compass and guidance tool; and a platform for implementing a cryptocurrency ecosystem that utilizes or incorporates the above-mentioned features and/or other features. Embodiments of the present invention may be utilized, for example, in AR systems, in Virtual Reality (VR) systems, for AR-based navigation, for VR-based navigation, for AR or VR based shopping systems or electronic commerce systems, and/or for various other purposes.

In a first set of embodiments of the present invention, a visual navigation system is provided, optionally implemented as an Augmented Reality (AR) based navigation system which may assist human users in real-life navigation scenarios, and/or optionally implemented as a Virtual Reality (VR) based navigation system which may assist human users in navigation through or within a VR environment (e.g., in an online game; in an emulated or simulated representation of an environment; or the like).

For demonstrative purposes, some portions of the discussion herein may relate to utilization of the system by a user having a smartphone; however, the features of the present invention may be accessed, utilized, generated and/or provided via other suitable devices, for example, a portable electronic device, a mobile electronic device, a tablet, a laptop computer, a smart-watch, a fitness monitoring gadget, a wearable device, a portable gaming device or portable gaming console, a camera, an imager, a video camera, an audio/video recorder, a video recorder, a portable navigation device, a vehicular navigation device or system, a dedicated or specific-purpose AR device or AR gear or AR gadget or AR helmet or AR headset or AR headgear or AR glasses or wearable AR device, a dedicated or specific-purpose VR device or VR gear or VR gadget or VR helmet or VR headset or VR headgear or VR glasses or wearable VR device, or other suitable devices.

For demonstrative purposes, some portions of the discussion herein may relate to utilization of the system by a user, particularly by a human user or a person; however, the present invention and its features may be utilized by, or in conjunction with, non-human users such as, for example, a robot or a machine that needs to move and/or navigate in real-life environments, an autonomous or self-driving or self-operating car or vehicle or drone, a remotely-controlled or remote-controlled car or vehicle or drone, or other suitable non-human machines that may be regarded as "users" of the system.

The system of the present invention provides a cross-platform location-based AR or VR tool set, featuring or enabling a deep environment and object detection and understanding based on one (or more) scalable map and featuring 6 degrees of freedom with regard to navigation or movement or viewing capabilities.

Reference is made to FIG. 1, which is a schematic block-diagram illustration of a system 100, in accordance with some demonstrative embodiments of the present invention. In a demonstrative implementation, system 100 is configured to facilitate real-life navigation and/or localization and/or mapping of users (as well as products, items, store elements, or the like) within a superstore or megastore or other large-size facility, typically spanning numerous aisles and/or cabinets and/or shelves and/or corridors and/or other structures for storing products and for allowing users to walk therein.

In a demonstrative embodiment, a plurality of users (e.g., customers in a retail tore) hold and operate a respective plurality of end-user devices; for example, devices 151-153, which may be smartphones, tablet, smart-watches, Augmented Reality (AR) glasses or helmets or head-wear or gear, or the like. Optionally, client/server architecture may be used, such that each one of devices 151-153 may communicate over wireless link(s) (e.g., over Wi-Fi, over a cellular connection, over an Internet connection) with server 150, which may be located in the retail store and/or may be located remotely (e.g., a cloud-computing server). In other embodiments, distributed architecture or peer-to-peer architecture may be used, such that one or some or all of the devices may operate as nodes or as network elements that may receive and/or transmit data to other units. For demonstrative purposes, the other components of system 100 are depicted externally to server 150 and externally to devices 151-153; however, such depiction is only for purposes of clarity of the drawing; and it is hereby clarified that any of the components or units or modules that are shown in FIG. 1, may be implemented as part of server 150 and/or as part of devices 151-153.

A digital representation of a Store Map 101 is created by a Map Generator unit 102, which may be based on operations performed by a human administrator and/or by automatic or semi-automatic tools or machines (e.g., a 360-degrees camera assembly that is mounted on a travelling robot or travelling vehicle), and/or may be generated based on a crowd-sourced effort of participating end-user devices (e.g., smartphones of customers) that perform imaging of the store and further perform local computer vision analysis of captured images or video streams.

Optionally, the Store Map 101 (or other Environment Map) is created automatically or at least semi-automatically, by a computerized unit that collects the captured images or video frames of such traveling imaging equipment, and stitches or fuses or merges together images or frames to generate a generally-continuous representation of the environment. Optionally, images or frames are captured while also capturing location-based data or geo-spatial data (e.g., based on GPS, based on Wi-Fi signal strength, based on Wi-Fi SSID detection or strength, based on wireless beacon, based on cellular triangulation, based on triangulation of one or more types of data, or the like); and/or while also capturing data related to the real-life movement and/or orientation of the image capturing entity (e.g., registering an indication that images 1 through 10 were captured in Camera 1 which faces north; and that images 11 to 15 were captured by Camera 1 facing east after the imaging device has turned 90 degrees clockwise; or the like). In some embodiments, the localization data from multiple sources is fused together or combined, in order to re-assure that a particular result is correct, or in order to negate a possible result that turns out to be incorrect based on data from other sensors.

The captured data enables the system to correctly stitch together the Store Map 101, optionally represented as a planogram, representing therein not only the aisles and corridors in which users walk but also the actual real-time inventory and placement of items and products on the shelves of the store; and further enables the system to allocate a real-life geo-spatial location that corresponds to the content of each image; for example, image number 234 was taken at the south-west corner of the store by the camera was facing south, and therefore the content of that image represents a store content (e.g., one or more items on the shelf in that store) that is located at the south-most shelf in the south-west corner of that store. In some embodiments, at least part of the computer vision analysis, or all of it, is performed locally on each end-user device that captured the relevant footage; in order to reduce costs of data transport and data storage and data processing, and/or in order to speed-up the detection process via parallel computing or distributed computing.

The Store Map 101 is analyzed by a Content Detection Unit 103, which analyzes the content of each captured image or frame and deduces or generates insights with regards to items or products that are stored at that location in real life. For example, a Computer Vision unit 104 and/or an Optical Character Recognition (OCR) unit 105, which may be implemented as part of each such participating end-user device and/or as part of a remote server, may analyze an image or a captured frame, and may determine that it shows three boxes of "Corn Flakes"; and may optionally detect a logo or a brand-name which may be compared to or match with a list of product makers or product manufacturing; thereby enabling the system to determine which product is located in real life at which locations in the store, and to further associate each such product with other data or meta-data, for example, manufacturer, product real-life weight, product real-life dimensions, nutritional data of the product, allergy information for the product, product price, discounts or promotions or coupons that are currently associated and/or usable in conjunction with this product, or the like. Such data may be obtained or fetched from an Inventory Database 106 of the store; for example, by identifying in the image the product name "corn flakes", then identifying in the image a particular manufacturer logo and a particular product size (e.g., 16 oz), and then obtaining the other data regarding this particular product from the Inventory Database 106.

Accordingly, the Map Generator unit 102 operates to generate not only a representation of a map of the store (or other environment) with its corridors and walls and travel routes; but also, importantly, indications on said map representation that associate between each location on the map and a particular product (or, a group of products) that are offered for sale at that particular real-life location, or that are viewable by a user that stands at or near that real-life location and faces or views a particular direction (e.g., facing west). For demonstrative purposes, the mapping and the indications are discussed herein with regard to products; however, other objects in the environment can similarly be mapped and represented by the system; for example, a cash register or a point-of-sale (POS) terminal, a store facility, restrooms, changing room, fire exit, cafeteria, elevator, stairway, exit door, entry door, shopping carts parking area, or the like.

A user may be inside the store (or other mapped environment) and may utilize a smartphone (or other portable electronic device) to request assistance with in-store navigation or wayfinding or route guidance. In a first example, the user inputs to his smartphone the query "I am looking right now at the Frosted Flakes shelf; how do I get from here to the Milk?". The input may be provided by typing into the smartphone, or by dictating the query by voice which the smartphone captures and then converts to a textual query (e.g., locally within the smartphone and/or via a cloud-based or remote speech-to-text unit). Optionally, the input may be provided by the user via other means; for example, the user may lift his smartphone to be generally perpendicular to the ground, may take a photo of the Frosted Flakes shelves, and may say "take me to the Milk" or "I need to buy Milk"; and the smartphone or a cloud-based server may perform content analysis of the photo (e.g., via Optical Character Recognition (OCR) and/or via computerized vision or computerized image recognition), and may thus recognize the input-portion indicating that the user is located near (and is facing) the Frosted Flakes and that he desires to go to the Milk shelf or department.

Based on the user's input, the user's electronic device, locally and/or with the assistance of a remote server, may operate as follows: (a) parse the user query to extract from it the desired destination; (b) extract or deduce the precise current in-store location of the user; (c) determine a walking route from the current location to the destination, based on the Store Map and by utilizing a suitable route guidance algorithm; (d) generate turn-by-turn walking instructions for such route, and convey them to the user by voice and/or text and/or animation and/or other means, as a bulk set of instructions, or as a gradually exposed set of instructions that keeps being updated as the user walks. The set of instructions may be tailored or customized by the system, to be based on in-store elements or products, and not necessarily be based only on Aisle numbers; for example, by generating walking instructions of: (i) turn to your left; (ii) walk 30 feet until you see the Poultry section; (iii) turn there to your right; (iv) walk 20 feet until you see the Dairy section; (v) turn there to your left; (vi) walk 6 feet and you reach the Milk, which is located at the lowest shelf (your knee level) within a closed fridge. The routing instructions may thus be based on Products or in-store items or in-store elements, and may optionally include instructions based on Aisle numbers (e.g., "turn left at Aisle 6").

In some embodiments, optionally, the AR-based navigation instructions that are generated, displayed and/or conveyed to the user, may include AR-based arrows or indicators that are shown as an overlay on top of an aisle or shelf of products, which guide the user to walk or move or turn to a particular direction in order to find a particular product; such as, the user stands in front of the Soda shelf, which is a long shelf of 7 meters; he requested to be navigated to Sprite, and he is currently seeing through his device the shelf-portion that stores bottles of Pepsi; the system generates AR-based content, such as an AR-based arrow that points to the left and has a textual label of "walk 3 meters to your left to see Sprite", and that content is shown on the visualization of the Pepsi shelf on the user device. For example, such AR-based or VR-based navigation arrows or indicators, are shown as an overlay on products, to guide the user how or where to move within the aisle or the category of products in the store. Furthermore, the above-mentioned AR-based or VR-based content, may be generated and displayed to the user in conjunction with the Visual Search process that was described above, and that is demonstrated in FIG. 5. For example, the user says or otherwise conveys a command to his device, "show me or emphasize to me products on this shelf that are Gluten Free" (or that are Vegan, or that are Kosher, or that are Dairy Free, or that are Fat Free, or that are Low Sodium, or the like); and the system proceeds to perform rapid real-time recognition of the products that are currently imaged in the field-of-view of the imager of the end-user device, to fetch or obtain or lookup or download product data for each recognized product (e.g., nutrition values, ingredients, allergens information, or the like), to determine which sub-set of the imaged products fulfill the constraints that the user provided based on his Visual Search query, and then proceeds to generate and displayed AR-based or VR-based emphasis of such sub-set of products, for example, by adding a glowing frame around such particular products as displayed, and/or by adding a textual label or a graphical indicator or an animated content, or the like.

As the user walks within the store, the system continuous to monitor his current real-time location; and may generate and convey to the user Corrective Instructions if it detects a deviation from the suggested walking route; such as, by generating an alert that "You have turned left at Aisle 5, but you should have turned left at Aisle 6 at the Poultry section". Additionally or alternatively, upon detection of such route deviation, the system may automatically re-calculate a new walking route, from the current deviated location to the planned destination point or destination product, and may convey to the user the updated walking instructions.

Some or all of the above-mentioned operations may be performed, for example, by utilizing a User Query Analysis Unit 107, which operates to collect the input from the unit via one or more means (e.g., dictated speech, typed text, image or video of the current surrounding of the user), and to extract form such input (I) an indication of the current location of the user, and/or (II) an indication of the destination that the user wants to reach within the store (or the mapped environment).

In some embodiments, the current location of the user may be deduced by the system via one or more suitable ways; for example, by computer vision analysis or OCR analysis of image(s) or video taken by the user, and/or by location-finding algorithms (e.g., triangulation, wireless or cellular triangulation, wireless beacons, Wi-Fi strength indicators, based on the strength and/or availability and/or non-availability and/or appearance an/or disappearance of certain Wi-Fi or wireless networks or W-LANs or SSIDs, based on RF TTF, or the like). Such operations may be performed by one or more modules of the system, which may be implemented as a User-Location Determination Unit 108.

The particular location of the user within the store or the venue, as derived from his portable device location via one or more of the above-mentioned methods or other methods or a combination of them, may further be used to construct a Shopping Route or a Traveling Route that each particular user exhibits or follows, and/or a common or most-common or most-frequent shopping route or traveling route that characterizes an aggregated group of discrete users (or their majority, or their most common route).

Accordingly, an Individual Shopping Route Generator 130 may analyze the in-store or in-venue location of a particular user over time, and may generate a representation of the actual Shopping Route/Travel Route that this particular user has exhibited, during a particular shopping session or visit or trip. Furthermore, a multiplicity of such routes, that were generated for this particular individual over time, may enable the system to uniquely generate a most-common or more-frequent or most-frequent travel route of that particular user, as deduced from analysis of multiple such routes of him that were extracted from multiple different visits or trips of him within the venue.

For example, the system may determine that user Adam typically or more-often or more-frequently or often, or in 90% of other percent of his trips within a particular venue, travels in a counter-clockwise direction of the store, and always crosses or walks along the entirety of Aisle 5 (the Dairy aisle) from south to north, and always crosses Aisle 8 (the pet food aisle) from north to south; and always (or in N percent of his visits to this store, or in M percent of his visits to the branches of this store chain) spends at least T seconds in aisle 7, or in front of the Corn Flakes shelf or product; and so forth. By tracking the movements of each user within the venue, in a single shopping route and/or across multiple such visits of the same venue (and optionally, across multiple visits of the same user in multiple different branches of the same store chain; or even, in some implementations, across multiple visits of the same user in multiple different store of the same types, such as Pharmacy stores or Food stores or Clothes stores), the system may generate the route-segments of interest or the locations-of-interest or the products-of-interest to that particular user.

The system may further correlate or match or associate such data, with additional information indicating user interest or user non-interest. In a first example, the location-based tracking of user Adam may indicate to the system that user Adam typically or often or always spends between 45 to 55 seconds in front of the Corn Flakes product or in front of the Breakfast Cereals shelf; and may enable the system to determine or deduce that Adam is interested in this particular product or in this particular type of products. In a second example, the location-based tracking of user Adam may indicate to the system that user Adam typically crosses the entirety of Aisle 8 (pet food aisle) in 10 to 15 seconds, without stopping to view any particular item or segment in that aisle; and may enable the system to determine or deduce that Adam is non-interested in the products of this particular aisle which he only crosses in order to reach another, different, area-of-interest within the store. In a third example, the location data may further be matched or associated with results of analysis of an image of a face of the user; for example, as the user is examining the Cereals shelf, his own smartphone may take an image of his face (such as, when the use is holding his smartphone as an Augmented Reality tool, positioning the smartphone generally perpendicularly to the ground), and a computer vision analysis of his facial expression may indicate boredom or interest or non-interest or happiness or sadness or other state of mind or mood; thereby enabling the system to generate a user-specific route which indicates locations or segments in which the user was happy, or sad, or bored, or interested, or the like.

A Heat Map Generator/Routes Aggregator 131 may analyze the shopping routes of multiple users across multiple visits to the same venue; and may generate a "heat map" of the venue, indicating the most-popular and least-popular paths of travel that users in this venue exhibit over time; as well as locations-of-interest, or areas in the venue or particular shelves or products at which most users or many users (e.g., at least N percent of the users) spend an increased time-period (e.g., at least S seconds) and/or exhibit a particular facial expression. The generated heat map, or the analysis of the aggregation of user-specific routes and the more-common and less-common path segments across multiple users and across multiple visits to the same venue, enable the system to propose to a specific user navigation route(s) that suit his particular needs or preferences, without asking the user what his particular preferences are.

Figure 4:
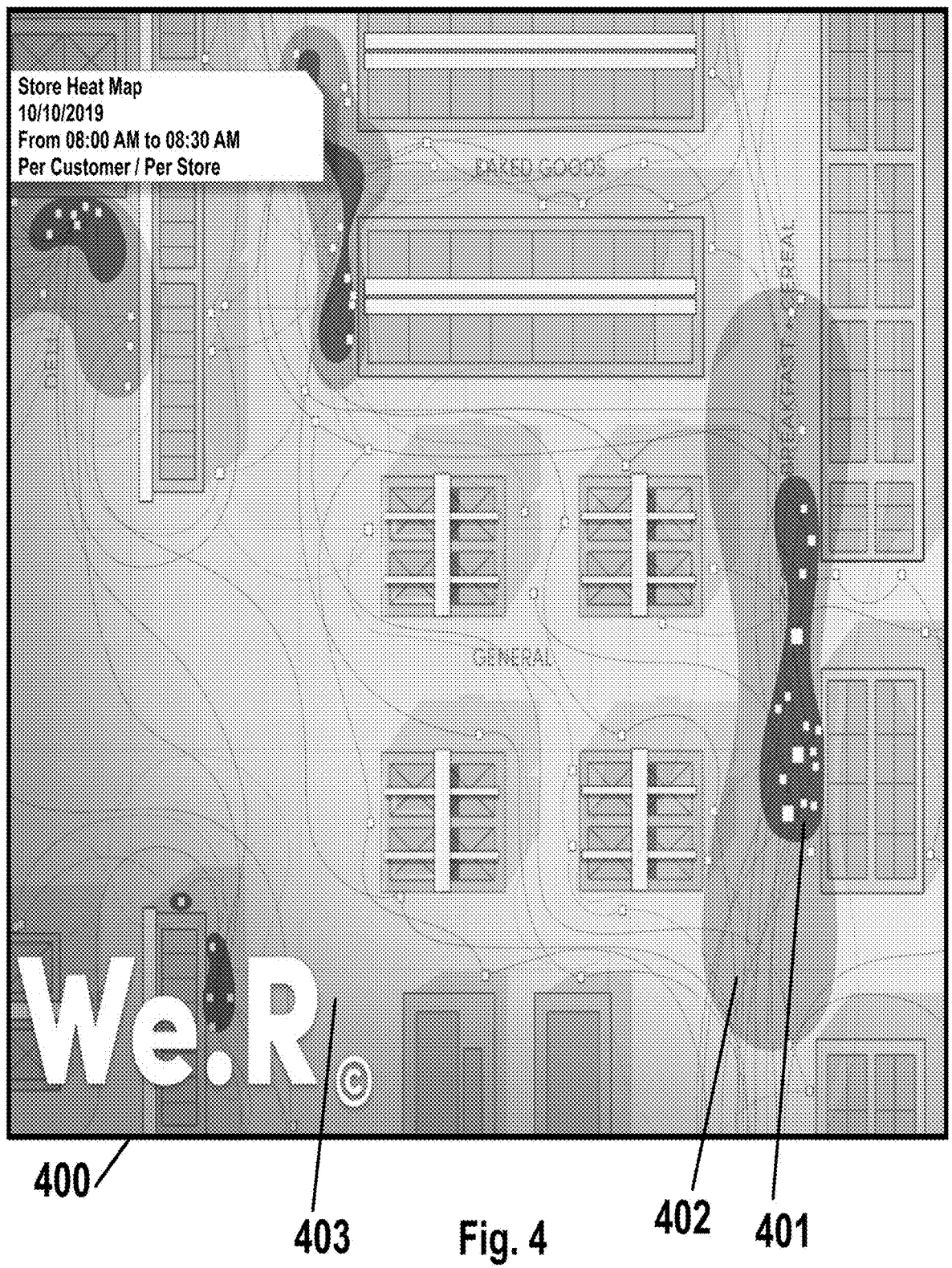
FIG. 4 is a schematic illustration of a heat map, which may be generated and/or utilized in accordance with some demonstrative embodiments of the present invention.

Reference is made to FIG. 4, which is a schematic illustration of a Heat Map 400, which may be generated and/or utilized in accordance with some demonstrative embodiments of the present invention. Different colors or patterns may be utilized to indicate store regions in which very high customer traffic was observed (region 401), or high customer traffic was observed (region 402), or low customer traffic was observed (region 403). The heat map may represent the traffic of multiple customers in the store at a particular time-slot; or, may be a user-specific/user-tailored heat map that shows the heat map of a specific user at a specific time-slot in this specific store; or, may be generated as a group or class-based heat map that reflects the traffic of customers of a particular type (e.g., only female customers) during a particular time-slot. Pre-defined rules may be utilized to define when to count a user as a "lingering" customer; for example, a user that stands at least 10 seconds in front of a particular shelf, may be classified as a "lingering" customer, and the heat map may optionally indicate spots or locations in which such customers tend to linger or stay or stand.

In a first example, user Bob queries the system, how to move from his current location (near the Breads) to a particular destination (the Eggs shelf); the system may firstly determine that user Bob needs to cross the store from south to north; the system then examines or analyzes previous shopping routes of user Bob within this venue, and determines that user Bob has typically crossed the store from south to north by taking Aisle 7 (the pet food aisle), and particularly while spending between 30 to 45 seconds in front of the Cat Food area; and therefore, the system may specifically tailor a navigation route for user Bob, from the Breads to the Eggs, such that the suggested route includes Aisle 7 as a route-segment, as this particular segment has been identified as more relevant to this particular user; and while avoiding a navigation route that includes Aisle 8 in it, since that aisle (Baby products) was not visited by user Bob in the past 90 days. These unique functions of the system of the present invention, are in direct contrast with conventional navigation/mapping systems, which generate the same "shortest route" or "fastest route" to all users that wish to travel from Location A to Location B. Instead, the system of the present invention may generate to user Carl a first route from Breads to Eggs, that specifically and intentionally passes through Aisle 4 that user Carl always (or often) visits when he is at this venue; whereas, the system generates to user David a second route from Breads to Eggs, that intentionally avoids passing through Aisle 4 that user David has never visited during his previous visits in this venue in the past 120 days.

In another example, navigation routes to an in-venue destination may be modified or generated by the system in order to intentionally include (or preclude) a particular route-segment or venue-segment or venue-region, due to one or more reasons or conditions; for example, dynamically navigating user Adam from Breads to Eggs in a route that avoids Aisle 5 because based on localization of users in the store, Aisle 5 is currently extremely crowded (e.g., has at least 15 persons in that aisle at this time); or in a route that excludes Aisle 3 because the store map has recently been updated by a store employee to indicate that there is a liquid spill on the floor there, or such hazard was automatically detected via sensors and/or imagers of the store (e.g., using computer vision analysis), and/or based on user-submitted reports (e.g., a shopper and/or an employee have reported a hazard in Aisle 3). In another example, the navigation route to a particular in-venue destination may be modified to necessarily include an in-venue area or location or segment that the venue administrator wishes to make more popular, or that includes new products or promoted products; or that a third-party advertiser had paid for inclusion in such in-venue navigation routes. In some embodiments, users in general, or particular types of users (e.g., female visitors; or teenage visitors; or senior citizens; or users that have shopped for Gluten Free items; or the like), may be presented with particularly tailored in-venue navigation routes, to accommodate a pre-defined marketing plan that the venue wishes to implement with regard to this type of users or population; for example, guiding senior citizens towards their in-store destination via Aisle 6 which includes hearing aids and reading glasses, while guiding teenage shoppers towards the same in-store destination via Aisle 9 which includes skateboards and basketballs; thereby tailoring an in-venue or in-store navigation route, towards a desired destination, based on the characteristics of the particular user that is being navigated towards it. The above-mentioned operations may be implemented, for example, via a User-Tailored Navigator Unit 132.

It is noted that the query of the user may be more complex than the above-mentioned example; and may include other types of queries such as, for example, "take me to the nearest Gluten Free item", or "I need to buy something sweet", or "My child needs to use the restroom"; and the system may utilize Natural Language Processing (NPL) via an NLP unit 135, or other analysis engine, to extract or deduce the particular parameters of the query of the user.

The extracted query, and the extracted or deduced user location, are transferred to a Query Solver unit 109, which finds or generates a solution or a response to the query of the user. In a first example, the user stands in front of Frosted Flakes, and requests to go to the Milk section in the store; the Query Solver unit 109 initiates an internal query to a Way-Finder Unit 110 of the system, which has access to the Inventory Database 106 and to the Store Map 101, and which generates one or more suitable walking routes to the requested destination or product. The output of the Way-Finder Unit 110 may be provided to the user via one or more suitable ways; for example, as an on-screen textual guidance (e.g., a displayed message of "Turn left, walk 10 meters, turn right, and you will arrive to the Milk", and/or as an audio message or a narrated speech message (e.g., which automatically narrates the navigation directions via a local or remote text-to-speech conversion unit), and/or by displaying a graphical on-screen representation on the smartphone of the user (e.g., depicting an arrow to turn left; or depicting all the navigation steps at once; or depicting gradual step-by-step navigation instructions that are dynamically updated as the user walks around).

In a second example, the user stands in front of Frosted Flakes, and says or enters a query of "Take me to the nearest Gluten Free food item". The Query Solver unit 109 requests from the Inventory Database 106 of the store, a list of all the products that are (i) food items, and are (ii) gluten free; then, it checks the distance of each such product relative to the current location of the querying user; and it chooses the product that has the shortest walking distance, and provides to the user the navigation directions to that particular gluten-free food product.

In a third example, the user may input a more complex query such as, for example, "Take me to all the beverage products that are On Sale today". The Query Solver unit 109 searches the Inventory Database 106 of the store for all products that (i) are a beverage and (ii) are sold today at a sale price relative to their regular price. Those products are than placed at their suitable locations in the Store Map; and the Way-Finder Unit 110 may construct a walking route (e.g., particularly, the most efficient or shortest walking route, by using one or more suitable "traveling salesman" algorithms") that allows the user to efficiently or rapidly visit the particular products that meet said criteria. The walking route, with the names of the products, may be displayed to the user in advance; or may be dynamically displayed or conveyed or narrated to the user as he walks along the route, as a turn-by-turn navigation solution.

In a fourth example, the user may input the query "I want to buy today all the items that I bought in my last visit to this store". The Query Solver unit 109 may access the historic shopping record(s) of that particular user, based on his username and/or his phone number and/or other identifier; may retrieve the list of items that were purchased by him in the most-recent visit; and may proceed to place those items on a store map, and to generate the indoor navigation instructions from product to product within that list.

Other suitable parameters may be utilized for queries, and for constructing or tailoring results based on queries; for example, prices, price range, being on sale or at a discount, being part of a promotion ("buy one and get one free"), being a clearance item, being a discontinued item, being a new or just-received item or recently-launched product, being at a certain size or dimensions or weight (e.g., "two-liter bottle of soda"), being at a particular color (e.g., "red dress"), being made of a particular material (e.g., "wool jacket"), having a particular nutritional value or consumer warning or allergy information (e.g., "dairy free" or "soy free" or "gluten free"), being appropriate or being targeted to a particular gender or age or age-range (e.g., "jackets for men", or "toys for ages 3 to 6 years old"), and/or other suitable query parameters that made be parsed or deduced and may then be matched to the Inventory Database 106 for determination of the relevant products and their in-store location for indoor navigation purposes. Optionally, the user may fine-tune or narrow-down a previous query, via follow-up instructions of sorting or filtering; such as, a wide query of "take me to men's jackets" may be fine-tuned or filtered to become "take me to men's jacket made of wool and having a price of under 90 dollars".

Figure 5:
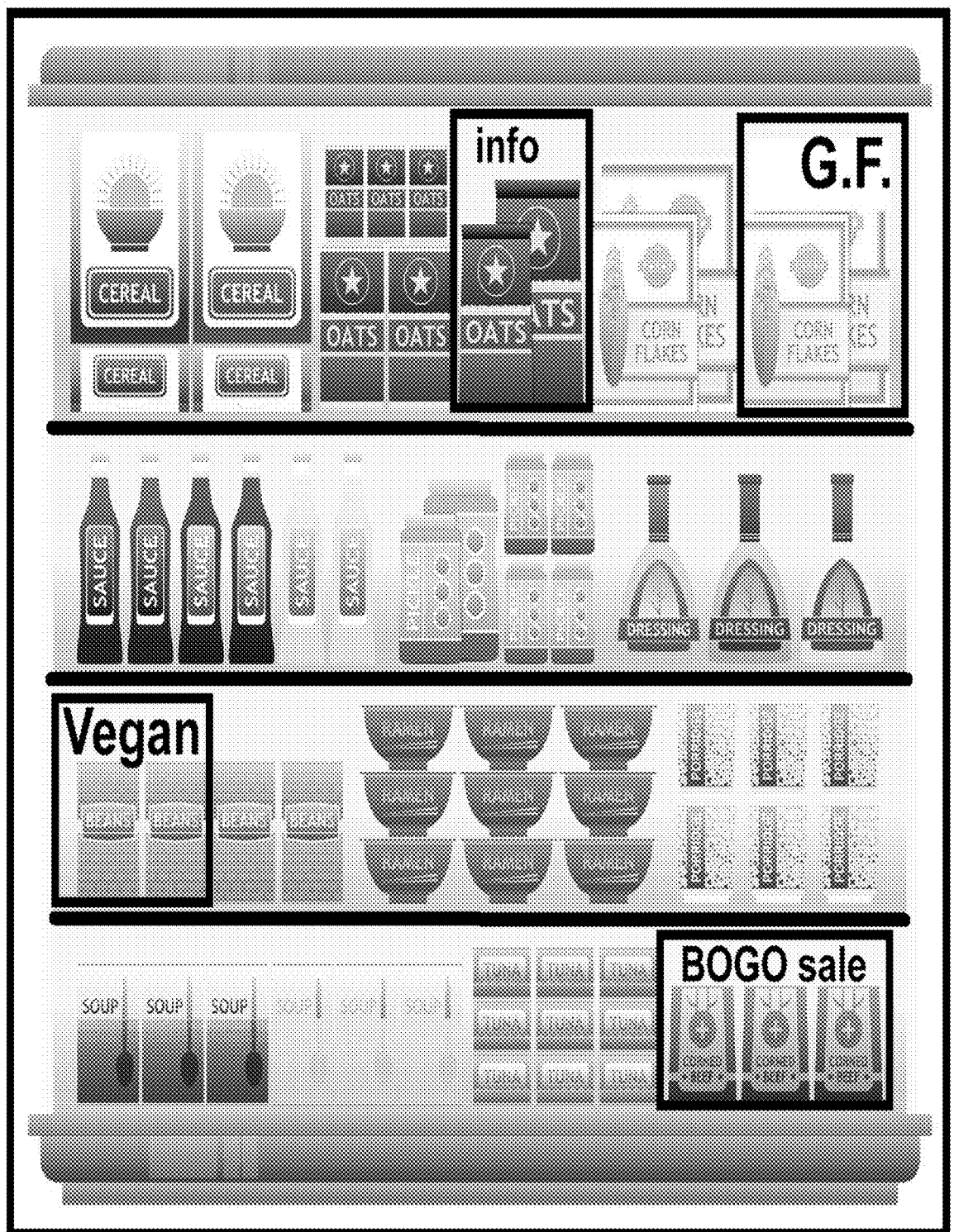
FIG. 5 is a schematic illustration of an Augmented Reality (AR) image, pointing out to the user one or more particular items or product in a store, which may be generated and utilized in accordance with some demonstrative embodiments of the present invention.

In accordance with the present invention, such filtering may be performed not only for the purpose of navigating towards a product, or among products; but also, for example, for the purpose of pointing-out to the user a particular product on a shelf that the user is currently viewing. Reference is made to FIG. 5, which is a schematic illustration of an Augmented Reality (AR) image 500, pointing out to the user one or more particular items or product in a store, which may be generated and utilized in accordance with some demonstrative embodiments of the present invention. For example, the user points his electronic device (e.g., smartphone, tablet, AR or VR gear or glasses, or the like) towards a shelf or an aisle or other region in the store. The precise localization of the device is determined, based on computer vision analysis of image(s) captured and/or by using other parameters or available data which may be fused together (e.g., Wi-Fi signal strength; Bluetooth signal strength; Cellular signal strength; Cellular triangulation; Wi-Fi triangulation; Bluetooth triangulation; magnetic force strength; GPS data, or the like); a computer vision analysis operates to identify or recognize the products that are captured in the frame or image, and to construct a table that indicates which product is represented in different image regions. Then, the user may utilize his device to request, for example, "show me all the Gluten Free products that are in my field-of-view now", and the system checks which of the identified products is defined in the store inventory database (or, in a general cross-stores database of product characteristics) as a Gluten Free product, and then causes the screen of the user device to point out or to emphasize or to encircle only those particular items; thereby showing, for example, a particular AR overlayer indication for such Gluten Free products, or (as demonstrated) for Vegan products, or for products that are On Sale (e.g., "buy one get one free sale"), or the like. Such filtering may be performed in real time, even as the user walks through the aisles, and/or even if the user is located at a slanted direction relative to the shelf of products and not necessarily directly facing the shelf; since the system may still recognize and identify products from computer vision analysis of side-views or perspective views of shelves or products. In some embodiments, optionally, the Augmented Reality image or frame that is displayed to the user, may include responsive elements or clickable elements or selectable elements; for example, demonstrated with the label "info" that appears next to (or, appears on) a particular product or item; such that a tap or a click of the user on that element on the screen, causes the system to obtain additional content about this particular product and to display it on the screen of the user device; such additional content may be, for example, a text or graphics or animation about the particular product, or about a promotion related to it, or about particular benefits or characteristics of that product (e.g., as obtained from a product database), or other suitable data about that product (e.g., "limit two per customer").

Optionally, the system may comprise one or more specific modules or units, tailored to perform one or more of the operations or processes that are described above and/or herein. For example, a "Navigate-to-Product" Module 111 enables a user to select a particular product on his smartphone, such as, by browsing a past online purchase or online order of that user in that store (offline or online), and/or by searching or browsing the website of the store; and then displays to the user, in addition to the product information (price, size, color, or the like) and/or the ability to purchase it online, also a button or link or GUI element of "navigate me to this product at this store", or "take me to this product in this store". In response to engagement of the user with this GUI element, the system looks up this particular product in the Store Map; and generates a walking route from the current location of the user to the destination product; and conveys this route to the user via his smartphone, as textual and/or audible turn-by-turn navigations instructions and/or as a video or animation or graphical explanation, and/or by showing an on-screen AR avatar or an AR route that moves accordingly while the user is actually walking through the store and indicates to the user where to turn.

Figure 6:
FIG. 6 is an illustration of an Augmented Reality (AR) image or frame, which may be generated and/or utilized in accordance with some demonstrative embodiments of the present invention.

Reference is made to FIG. 6, which is an illustration of an Augmented Reality (AR) image 600 or frame, which may be generated and/or utilized in accordance with some demonstrative embodiments of the present invention. As the user holds his device and aims the camera towards a corridor in the store, the relevant mapping and navigation modules of the system determine the walking route to the desired product destination, and generate and display on the user device an overlay AR element, or a set of AR elements, indicating the walking path; such as, arrows on the floor or near the ceiling in the image, or asterisk characters (as demonstrated), or an animated avatar or character that virtually walks or runs or flies through the aisle towards the destination, or other AR-based content.

Figure 7:
FIG. 7 is an illustration of an Augmented Reality (AR) image of another frame, which may be generated and/or utilized in accordance with some demonstrative embodiments of the present invention.

Reference is made to FIG. 7, which is an illustration of an Augmented Reality (AR) image 700 of another frame, which may be generated and/or utilized in accordance with some demonstrative embodiments of the present invention. It demonstrates multiple different types of AR-based elements or content items, which are shown as overlay on a real-time image that is shown on the user device; for example, indicating an AR-based walking path on the floor, indicating AR-based indicators for gluten free items on shelves, indicating an AR-based "i" or "info" symbol or selectable on-screen element for a particular product (e.g., to show additional information about it), indicating or showing AR-based virtual sign hanging from the ceiling, or the like.

Figure 8:
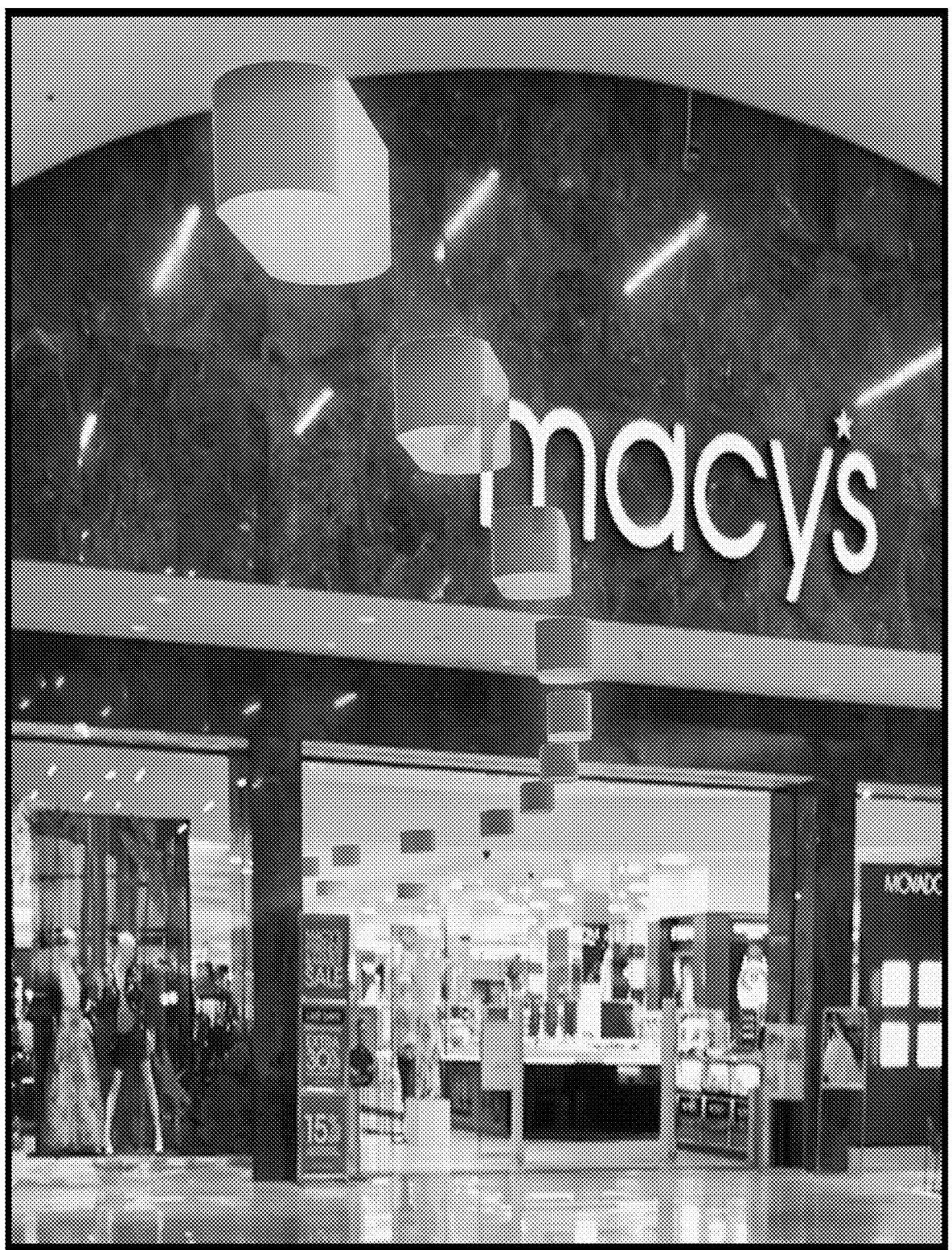
FIG. 8 is an illustration of an Augmented Reality (AR) image of yet another frame, which may be generated and/or utilized in accordance with some demonstrative embodiments of the present invention.

Reference is made to FIG. 8, which is an illustration of an Augmented Reality (AR) image 800 of yet another frame, which may be generated and/or utilized in accordance with some demonstrative embodiments of the present invention. It demonstrates another way of generating and displaying AR-based navigation guidelines, as AR-based elements or "virtual dots" or "virtual milestones" that are shown in particular regions of the image, as an overlay of AR content, to indicate to the user which way to walk in order to reach a particular destination or product.

Figure 9:
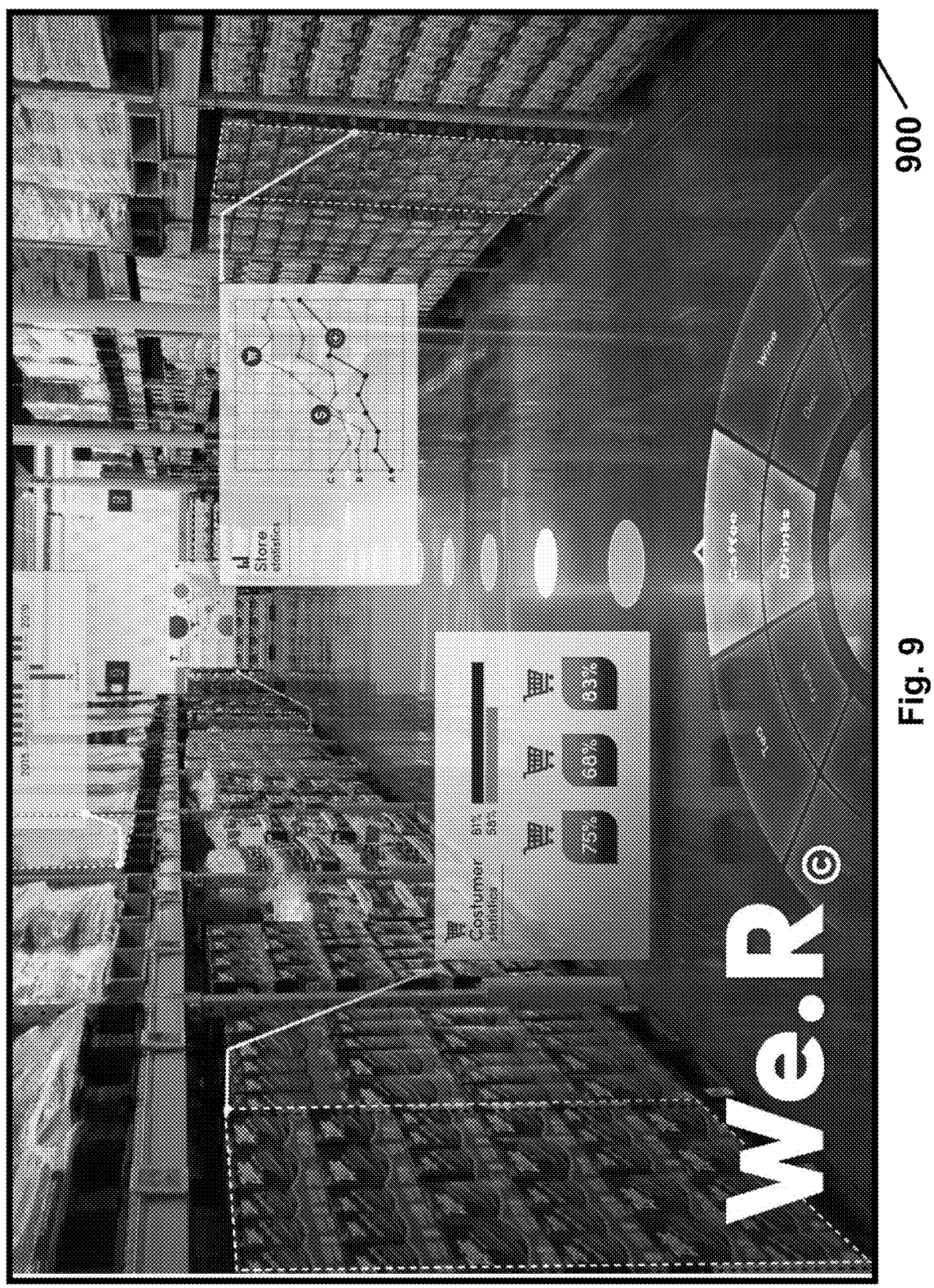
FIG. 9 is an illustration of an Augmented Reality (AR) image of another frame, which may be generated and/or utilized in accordance with some demonstrative embodiments of the present invention.

Reference is made to FIG. 9, which is an illustration of an Augmented Reality (AR) image 900 of another frame, which may be generated and/or utilized in accordance with some demonstrative embodiments of the present invention. It demonstrates an AR overlay of content that indicates, for example, additional information about products, wherein the additional information is displayed as "popping out" perpendicularly relative to the shelf or the aisle, appearing as AR-based signs or as AR-based boards of information, each such AR-based information board being connected via an AR-based connector line to a particular product or shelf. Further shown is an AR-based compass mechanism that is an overlay on the floor of the store, indicating various products or departments and their relative directions; for example, indicating that "coffee" is located at 12 o'clock direction of that compass, whereas "tea" is located at 11 o'clock direction, and so forth.

In another example, a "Navigate-to-List" Module 112 enables a user to request turn-by-turn navigation directions and/or AR-based navigation directions, in order to visit the real-life locations of multiple products that are on a List of the user; such as, a wish list of products, a previous Order that the user placed online or offline, a list of Favorite products that he pre-selected, a list of products that share a common characteristic (e.g., "all products that are currently on sale of at least 40% discount"; or, "all food items that are currently having a promotion of buy-one-get-one-free"); or, all the products that appear in this week's Weekly Circular brochure of the store; or, all the Food Items that appear in this month's Monthly Circular brochure of the store; or the like. The list may be displayed on the smartphone of the user, or may be otherwise selected by the user (e.g., via the command "obtain my most recent order in this store"); and then, a button or link or GUI element of "navigate me to the products on this list at this store" may be presented, or the user may provide such command via voice even without a button or GUI element. In response, the system looks up these particular products in the Store Map; and applies a suitable mapping and navigation algorithm, such as a suitable "traveling salesman" algorithm, to generate a walking route from the current location of the user to and through the various destination products, one after the other, particularly in an efficient or short route; and conveys this route to the user via his smartphone, as textual and/or audible turn-by-turn navigations instructions and/or as a video or animation or graphical explanation, and/or by showing an on-screen AR avatar or an AR route that moves accordingly while the user is actually walking through the store and indicates to the user where to turn.

In another example, a "Navigate-to-Promotion-Items" Module 113 enables a user to request turn-by-turn navigation directions and/or AR-based navigation directions, in order to visit the real-life location(s) of one product or of multiple products that are currently sold with a particular promotion or with any type of promotion. For example, the user may be presented with options such as, "navigate me to all products being sold at a price of at least 25% discount", or "navigate me to the closes product that is on sale", or "navigate me to the closes Food Item that is currently on sale of at least 30% off", or "navigate me to all the Women's Clothes that are currently on promotion of buy-one-get-another-at-half-price", or "navigate me to all Gluten Free food items that are on sale today", or the like. Upon user engagement with such option, via a tap or click, or via user input based on text or uttered speech, the system looks up these particular products in the Inventory Database and then places them on the Store Map; and applies a suitable mapping and navigation algorithm, such as a suitable "traveling salesman" algorithm, to generate a walking route from the current location of the user to and through the various destination products, one after the other, particularly in an efficient or short route; and conveys this route to the user via his smartphone, as textual and/or audible turn-by-turn navigations instructions and/or as a video or animation or graphical explanation, and/or by showing an on-screen AR avatar or an AR route that moves accordingly while the user is actually walking through the store and indicates to the user where to turn.

In some embodiments, the navigation route (within the venue; and/or to a product or to an in-venue destination or location; to a promoted product; based on a shopping list or on a past shopping record or based on a wish list) may be conveyed to the end-user in a variety of ways; for example, as Augmented Reality (AR) navigation elements, such as virtual on-screen arrows or trail or mile-stones or way-stones or stepping stones, or as an AR avatar that walks or flies or otherwise moves virtually along the on-screen navigation route, or as a first-person view or a third-person view or a perspective view, or as a top view, or as a textual list of turn by turn instructions which may be presented as text on the screen and/or may be conveyed verbally as audible speech via a text-to-speech converter. Some embodiments may be configured to assist disabled persons or blind persons or visually impaired persons, by providing such users with an audible voice-based turn-by-turn navigation route which includes instructions by speech, and which further enables such users to input their queries or destinations or requests via voice input; for example, enabling a user to say verbally to the microphone of his smartphone "I need to get to the Breads section", which in turn is converted from speech to text, and is interpreted or parsed by the system, which determines that the current in-venue localization of this end-user is at the Eggs shelf, and queries the Store Map for a navigation route from that location to the Breads section, and then conveys the step-by-step or turn-by-turn navigation directions to the end-user as audible speech.

In some embodiments, the system may comprise a drag-and-drop tool or GUI that enables an advertiser (e.g., a product manufacturer) to drag-and-drop a particular advertisement or other promoted content (e.g., a coupon code, a discount code, a promotion code, an animation or video about a product, or the like) into or onto a particular location in a representation of the Store Map; and optionally enables to select a radius or distance around that point; thereby allowing the manufacturer to efficiently command the system, that users that are located within two meters of the Cereal shelf, will be presented with AR content from this manufacturer about a particular Cereal product.

Some embodiments may optionally comprise an automated or semi-automated tool or "bot" or module, which may enable a store owner or a venue operator to efficiently, rapidly and/or non-expensively generate an AR map or a VR map of its store or venue (which may be a real-life store and/or an online web-based store or shopping website); for example, by enabling the module of the present invention to crawl or scan or search its store database and/or its store website or to connect to its store inventory database, in order to gather and collect information about the various products that are sold by that online/offline store or venue; and then, enabling the store owner to utilize a single device, such as an AR-enabled smartphone or tablet, or a portable device for capturing images and/or video together with enablement of in-store localization data, to collect frames or images or videos of the store with their corresponding locations, and to stitch them and analyze them in order to automatically generate an AR/VR based map of the store and its entire structure and products; and further enabling each such discrete item in the generated map, to be associated with (or linked to) a particular product as identified in the store inventory database; thereby enabling to efficiently generate an AR/VR based map, as well as an AR-based version of a real-life store, in which each real-life product or in-store location is also associated with (or linked to) the relevant product or item in the store database; and further enabling such retailer or store owner to efficiently incorporate third-part advertisement content, and particularly AR-based ad elements, into or onto an on-screen representation or an AR-based representation of the store. The system may thus enable the creation and operation of an entire AR-based store, optionally by scanning the website or product database of that store owner, generating a catalog of products, and then correlating them with actual footage collected by a single device of the store owner as it roams in the real-life store, or correlating them with a crowd-sourced collection of multiple such footage that was collected from multiple end-users (e.g., several employees of the store that roam the store with several smartphones); and further enabling automatic incorporation of third-party ads or promoted content or promotions into such AR-based experience.

In some embodiments, the system may be further configured to enable end-users to similarly create an AR-based version of their own home or house or apartment or residence; and to share such AR-based version with other end-users; while the system catalogues the captured footage from House 1 into a series or set of discrete products, each such product being automatically associated (based on OCR and/or computer vision analysis) with a particular online product as sold by a particular retailer (or by multiple retailers), optionally also being associated with an Affiliate link or a Referral link such that an online purchase of that product may cause payment of a referral commission to the relevant AR-based house owner; and such that, for example, user Adam may utilize the system to generate an AR-based version of the house or the kitchen or the pantry cabinet of user Adam, and may then share this AR-based version with his friend Bob or with a group of friends or with the general population of users; and when user Bob clicks on a particular item in the AR-based representation of the house of user Adam, user Bob is transferred to the website or the application of an online retailer that sells this particular product; and such purchase by user Bob further causes user Adam (the referring user) to gain a commission or a referral fee.

Optionally, a Promotion-Augmented Navigation Module 114 may operate to convey to the user promoted or discounted search results and/or product highlights, which may be displayed on a VR or AR map, and/or may further be shown in AR-based augmentation elements as the user travels through the store. For example, the company Food-Maker manufactures Corn Flakes; and pays to the store in order to promote this product. The user utilizes his smartphone within the store, to navigate from his current location (the Bread shelf) to a destination (the Milk shelf). In some implementations, the system may intentionally select a travel route, that necessarily passes next to the Corn Flakes shelf; and upon reaching the real-life vicinity of that shelf, the smartphone of the user may convey to the user a pop-up alert (graphics, text, animation, video) and/or an AR element (e.g., overlay upon the viewfinder's field of view as shown on the screen) and/or as audible speech, which draws the attention of the user to the Corn Flakes item and/or to the fact that this product is on sale or is at a discount today.

In some implementations, optionally, the system of the present invention may use a Real-Time Bidding module 115, to enable different makers to dynamically compete in real time, in an auction style competition, on which product will be displayed or promoted to the specific user along the Augmented Reality walking route within the store. For example, Food-Maker-1 may bid to pay to the store 75 cents for each placement of that navigation information which promotes his Corn Flakes product to any user; whereas Food-Maker-2 may bid to pay to the store 80 cents for each placement of navigation information which promotes his Soda product to users that are females in the age range of 30 to 40 years old (e.g., known to the system based on the user being logged-in to the website of the store; or based on a user profile that the Application or "app" of the AR-based navigation may request from users to fill out); whereas Food-Maker-3 may bid to pay to the store 60 cents for each placement of navigation information which promotes his Bread but only to users that requested to navigate to the Breads Area. Then, when a male user Adam requests to navigate to the Milk department, Food-maker-1 wins the real-time bidding and his product is placed in the Augmented Reality navigation route or the VR route displayed or conveyed to the user; whereas, when a female user Betty, age 34, requests to navigate to the Fruits area, Food-Maker-2 wins the real-time bidding. Accordingly, the system of the present invention may include such Real Time Bidding (RTB) modules, that marketers and advertisers may use; as well as a marketing platform that allows an advertiser to define and launch an advertising campaign that would then be implemented to a particular retail store (or a chain of a retail store), in a particular time-slot, towards a particular type of audience of users (e.g., only towards females under the age of 40 years), with regard to a particular product or type-of-product, with regard to a particular type of promotion or advertisement or other marketing content that would be AR-based/VR-based generated and displayed to such users. A backend platform may be used to manage, or to interact with, such marketing modules, advertising modules, campaign management modules, and/or other suitable tools which may be provided to advertisers and which may be selectively applied and enforced by the system of the present invention.

In some embodiments, navigation routes are not replaced and/or do not become longer due to the placement of promoted items within the navigation route; but rather, some embodiments may place a promoted product in the AR navigation route only if it is located in real-life anyway within the shortest or the most efficient travel route to the in-store destination of the user, and/or only if it does not cause the shortest travel route to become longer than P percent more (e.g., not more than 10 percent more) due to the placement of the promoted product within the AR navigation route.

In some embodiments, a Smart Shopping Route Generator 116 may operate to generate, for the particular user, an in-store smart or efficient or short shopping route; based on purchase(s) history of the user, community suggestions (e.g., at least P persons have recommended today to purchase a particular product which is new or which is on sale), current discounts or coupons or promotions; and optionally by taking into account user's data, a user profile that indicates areas of interests (e.g., clothes and food, but not pets), or an analysis of past purchases (e.g., an analysis conclusion that the user has purchased only food and clothes items in the past 12 months in this store, therefore no need to suggest to her pets related products), or predictions based on various parameters (e.g., a prediction that in his visit today, the user will most probably purchase Challah bread, since today is Friday and the user has always purchased Challah bread every time that he visited this store on a Friday), and/or other data. This module of the system may collect and analyze such data, and generate a list of products that are of interest to this particular customer at this time and in this store; and may proceed to trigger the generation of a navigation map that efficiently visits these products, and to generate turn-by-turn navigation instructions or guidance (e.g., as text, graphics, video, animation, AR elements, or the like). In some embodiments, the user may initiate the generation of such shopping route; or, the system may autonomously generate it and suggest it to the user. In some embodiments, the system and/or the user may put limits or constraints on such suggestions; such as, to show not more than K products per suggested route, or to show only items that are within a particular price range per-item or per-shopping-cart, or other suitable conditions or constraints.

A Navigation Views Generator 117 may operate to provide to the user the in-store navigation route in one or more suitable forms, such as: (a) textual turn-by-turn instructions, displayed on the screen and/or shown with graphical elements (arrows) and/or conveyed verbally using a text-to-speech converter; (b) first-person view, in which the user holds his smartphone generally perpendicular to the floor, in front of him as he walks; and an on-screen indication shows to the user where and when to turn right or left, or to proceed forward for N additional meters, or to rotate or move his body to the left in order to see the destination product, or the like; (c) third-person view, in which the user holds his smartphone as he walks, and sees on his smartphone an elevated perspective view or an elevated flat map view of the store, with the route shown on it as well as promoted products or destination product(s) indicated on it; (d) an on-screen Compass navigation element, particularly when the user holds his smartphone generally parallel to the ground, showing the user which direction to take via on-screen arrows or a spinning dial, and/or indicating to the user which products or which destination products or which promoted products or which store sections are located in which direction relative to the current positioning of the smartphone within the store. Particularly, in addition to each one of the relevant modes of conveying information, one or more Products or Promoted Products may be presented as augmentation to the navigation information or map.

In some embodiments, the module may automatically switch between views or points-of-view or AR-based tools, based on a change in the spatial orientation or slanting of the smartphone; for example, detecting that the smartphone is held generally perpendicular to the ground may automatically trigger a switch to a first-person AR-based view; detecting that the smartphone is held at a slanting of approximately 45 degrees relative to the ground may automatically trigger a switch to third-person perspective AR-based view; detecting that the smartphone is held generally parallel to the ground may automatically trigger a switch to AR-based compass view; or the like.

For example, the user holds his smartphone generally horizontally, or generally parallel to the ground, with the top edge of the smartphone facing east. The smartphone shows on its screen a compass dial or a circle, indicating that: (a) at the Top side of the compass dial (which is East in real life), lies the route to the Dairy section; (b) at the Right side of the compass dial (which is South in real life), lies the Breads shelf (e.g., either immediately to the right side of the user, or later it would be located on his right side if he continues to travel along his current direction); (c) at the Left side of the compass dial (which is North in real life), lies the Fruits section; or the like. The user now turns, for example, 90 degrees clockwise, and is now facing South in real life; and on his screen, the entire compass dial rotates accordingly, such that the Breads Shelf is now shown at the Top region of the on-screen compass dial, and the other sections of the compass dial are dynamically updated according to the present orientation and location within the store.

Figure 10:
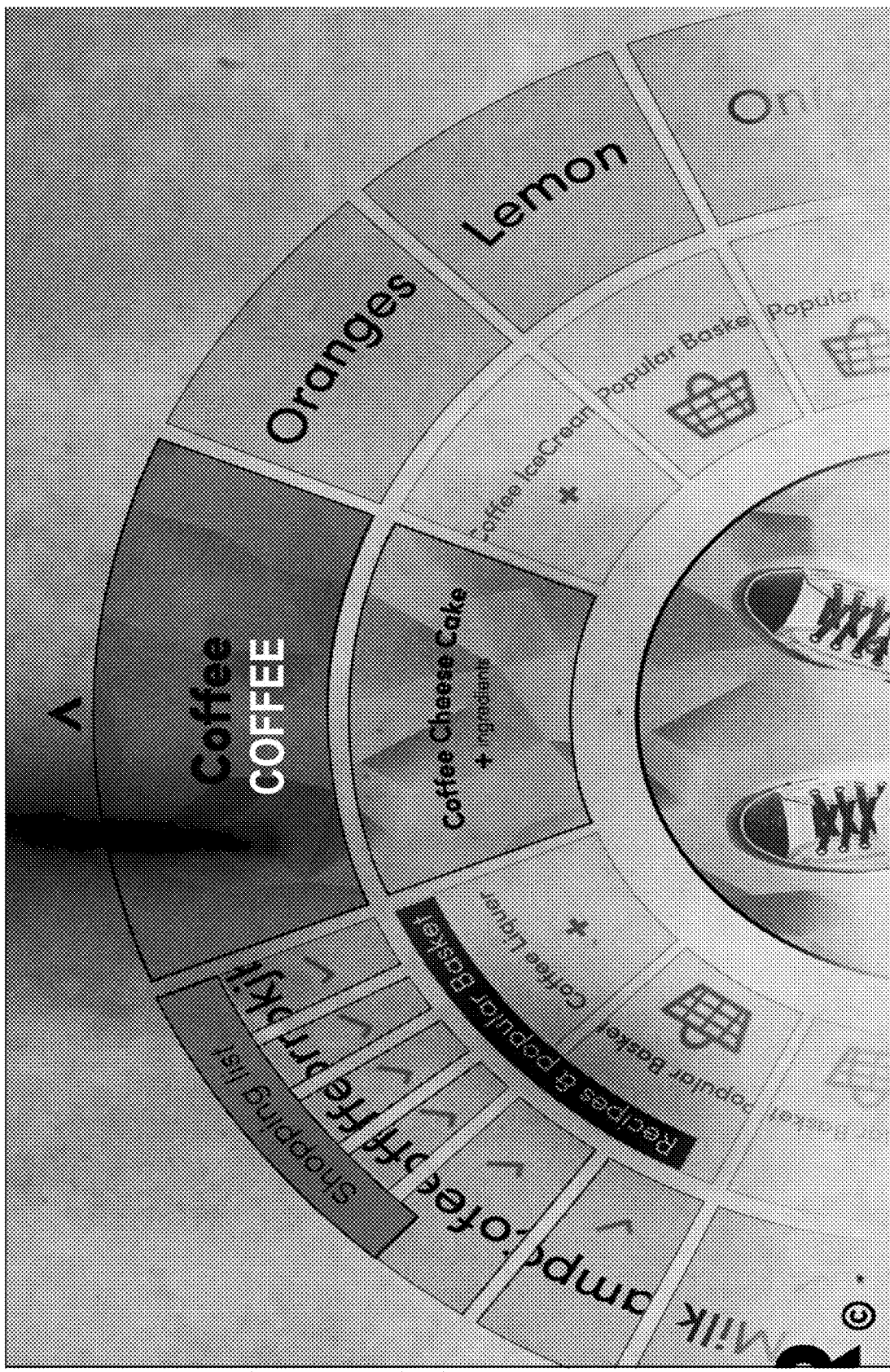
FIG. 10 is a schematic illustration of an AR-based compass element that is shown via a screen of an electronic device of the user, as an overlay on the floor of a store, in accordance with some demonstrative embodiments of the present invention.

Reference is made to FIG. 10, which is a schematic illustration of an AR-based compass element 1000 that is shown via a screen of an electronic device of the user, as an overlay on the floor of a store, in accordance with some demonstrative embodiments of the present invention. The AR-based content points to the direction of each product or type-of-product that is shown in the compass, based on the mapped inventory of the store and/or based on the store map or planogram. Products or departments in the stores, or shelves or aisles, are identified with labels or tags, in this example.

Figure 11:
FIG. 11 is a schematic illustration of an AR-based compass element that is shown via a screen of an electronic device of the user, as an overlay on the floor of a store, in accordance with some demonstrative embodiments of the present invention.

Reference is made to FIG. 11, which is a schematic illustration of an AR-based compass element 1100 that is shown via a screen of an electronic device of the user, as an overlay on the floor of a store, in accordance with some demonstrative embodiments of the present invention. The AR-based content points to the direction of each product or type-of-product that is shown in the compass, based on the mapped inventory of the store and/or based on the store map or planogram. Products or departments in the stores, or shelves or aisles, are identified with images of relevant products or types-of-products, rather than with textual labels, or in addition to utilization of textual labels.

Figure 12:
FIG. 12 is a schematic illustration of an AR-based compass element that is shown via a screen of an electronic device of the user, as an overlay on the floor of a shopping mall or shopping center, in accordance with some demonstrative embodiments of the present invention.

Reference is made to FIG. 12, which is a schematic illustration of an AR-based compass element 1200 that is shown via a screen of an electronic device of the user, as an overlay on the floor of a shopping mall or shopping center, in accordance with some demonstrative embodiments of the present invention. The AR-based content points to the direction of each store or type-of-store that is shown.

Figure 13:
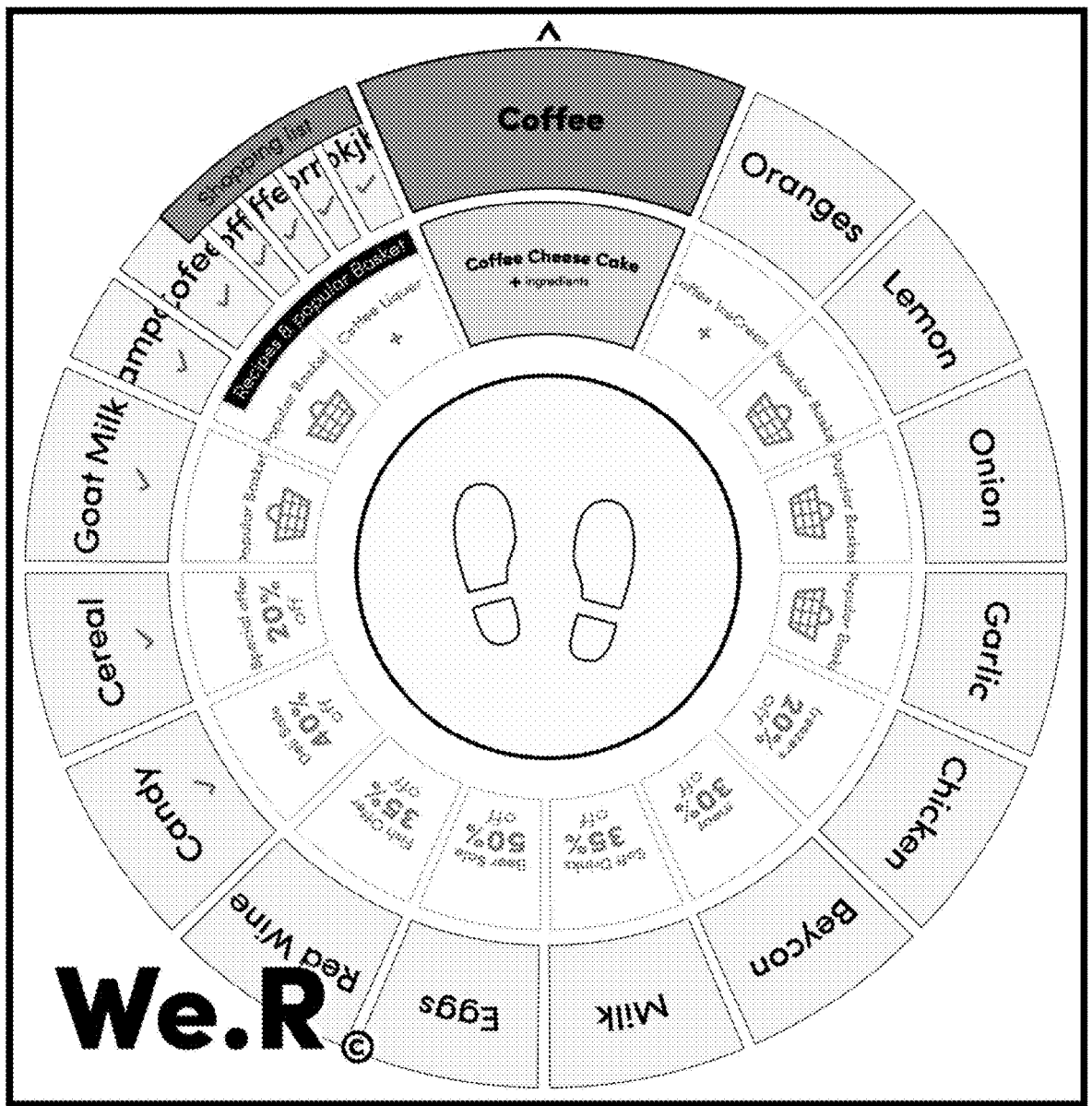
FIG. 13 is a schematic illustration of an AR-based compass element that is shown via a screen of an electronic device of the user, as an overlay on the floor of a store, in accordance with some demonstrative embodiments of the present invention.

Reference is made to FIG. 13, which is a schematic illustration of an AR-based compass element 1300 that is shown via a screen of an electronic device of the user, as an overlay on the floor of a store, in accordance with some demonstrative embodiments of the present invention. The AR-based content may comprise multiple AR-based rings; for example, an outer ring pointing towards the location of products or types-of-products; an inner ring pointing towards products or items that are on sale or are associated with a promotion, indicating the type of promotion or amount of discount and the direction to reach it; and/or other suitable information which may be arranged in such AR-based rings of content.

In some embodiments, the AR-based compass element that is shown as an AR overlay relative to the floor of the store, may be an interactive component and may be further utilized not only to convey output to the user, but also to collect input from the user; such as, based on imaging the feet of the user that step onto particular portions or regions of the compass element. For example, in some embodiments, a user may step with his shoe on the floor, at a floor portion that has AR-based content of the compass region that shows "Soda"; and the imager of the user device may utilize computer vision analysis to determine that by this particular stepping, the user has indicated that he is interested in walking to the Soda aisle and/or that he is interested in sub-categories or products of Soda; and in response, the system may initiate walking directions from the current location of the user towards the shelf that has Soda products; or, in some embodiments, in response to such detected stepping-based input, the system breaks-down the Soda compass element (as AR-based content) into smaller elements (e.g., "Cola" and "Seltzer"), or creates other AR-based content (e.g., an internal or inner ring in the compass; or an external or outer ring in the compass) that performs a "drill down" into sub-categories or even specific products, in order to provide specific walking directions to that sub-category or product. Additionally or alternatively, in some embodiments, stepping on the Soda category of the AR-based compass, may further invoke the generating and displaying of additional AR-based content that notifies the user about a particular promotion in that category of products, or that presents an advertisement for a particular product in that category, or that invokes a gamification challenge or a game that involves this type of product, or that provides other useful information or product information about the products in that category. Accordingly, the "stepping" by the user on a floor region, that corresponds to a particular region or section of the AR-based compass, is imaged and analyzed and utilized by the system as a means for obtaining input and selections and commands from the user.

Figure 14:
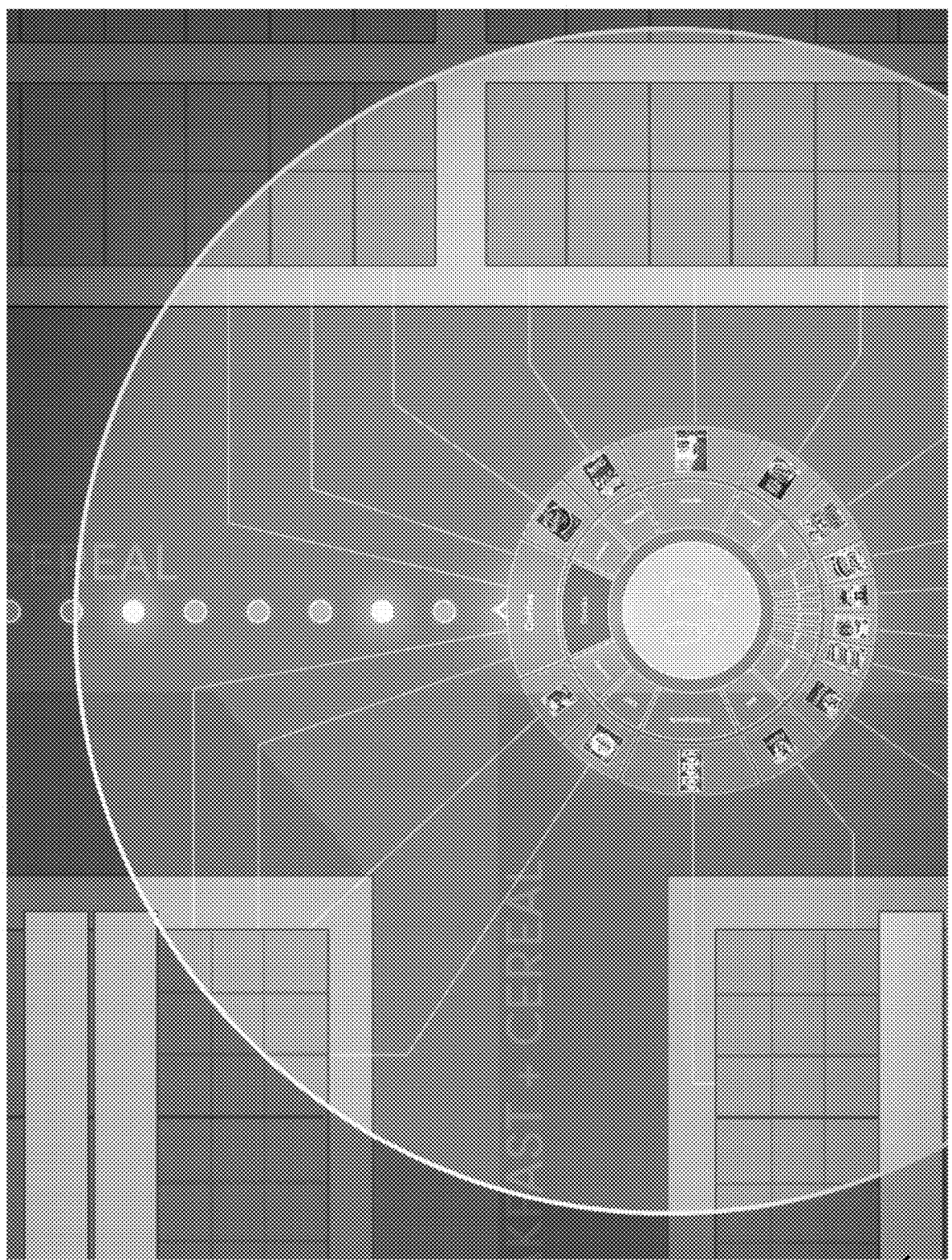
FIG. 14 is a schematic illustration of a portion of a store map or a planogram, in accordance with some demonstrative embodiments of the present invention.
Figure 15:
FIG. 15 is a schematic illustration of an AR view seen by a user in a store, in accordance with some demonstrative embodiments of the present invention.

Reference is made to FIG. 14, which is a schematic illustration of a portion of a store map 1400 or a planogram, in accordance with some demonstrative embodiments of the present invention. It demonstrates the path or route from a current location of the user's device, towards various different products or shelves or other in-store destinations; and such paths are used by the system to generate the navigation compass which is shown as an AR-based content element when the user holds his device generally parallel to the ground or floor Reference is made to FIG. 15, which is a schematic illustration of an AR view seen by a user in a store, in accordance with some demonstrative embodiments of the present invention. The user stands in a store and holds (for example) his smartphone in his hand, generally perpendicular to the ground. The user still sees the regular non-augmented "real world", on the right side and on the left side of his smartphone. On the screen of his smartphone, the user sees a real-time image of the store, with Augmented Reality (AR) content shown as overlay elements within the image; for example, showing AR-based content of a walking path to a destination product, showing an AR-based avatar or character roaming within the store, showing an AR-based indicator for a sale or promotion (shown as AR-based "40% off" tag or label in this example), shown an AR-based indicator for a particular product or type-of-product that is within the captured field-of-view (e.g., indicated as an AR-based information board about "Donut" in this example), or the like. As the user moves or walk, the computer vision module tracks these products or items within the changing frame or image that is currently captured, and moves or changes or replaces accordingly the AR-based content, in a manner that is responsive to the currently-captured image, and in accordance with pre-defined rules (e.g., indicating promoted items that should be augmented or emphasized via AR-based elements; indicating a user request to show or to emphasize promoted items or Vegan items or Kosher items or the like; indicating a user request to show only items that meet a particular filtering criterion or constraint or set of characteristics; or the like).

Figure 16:
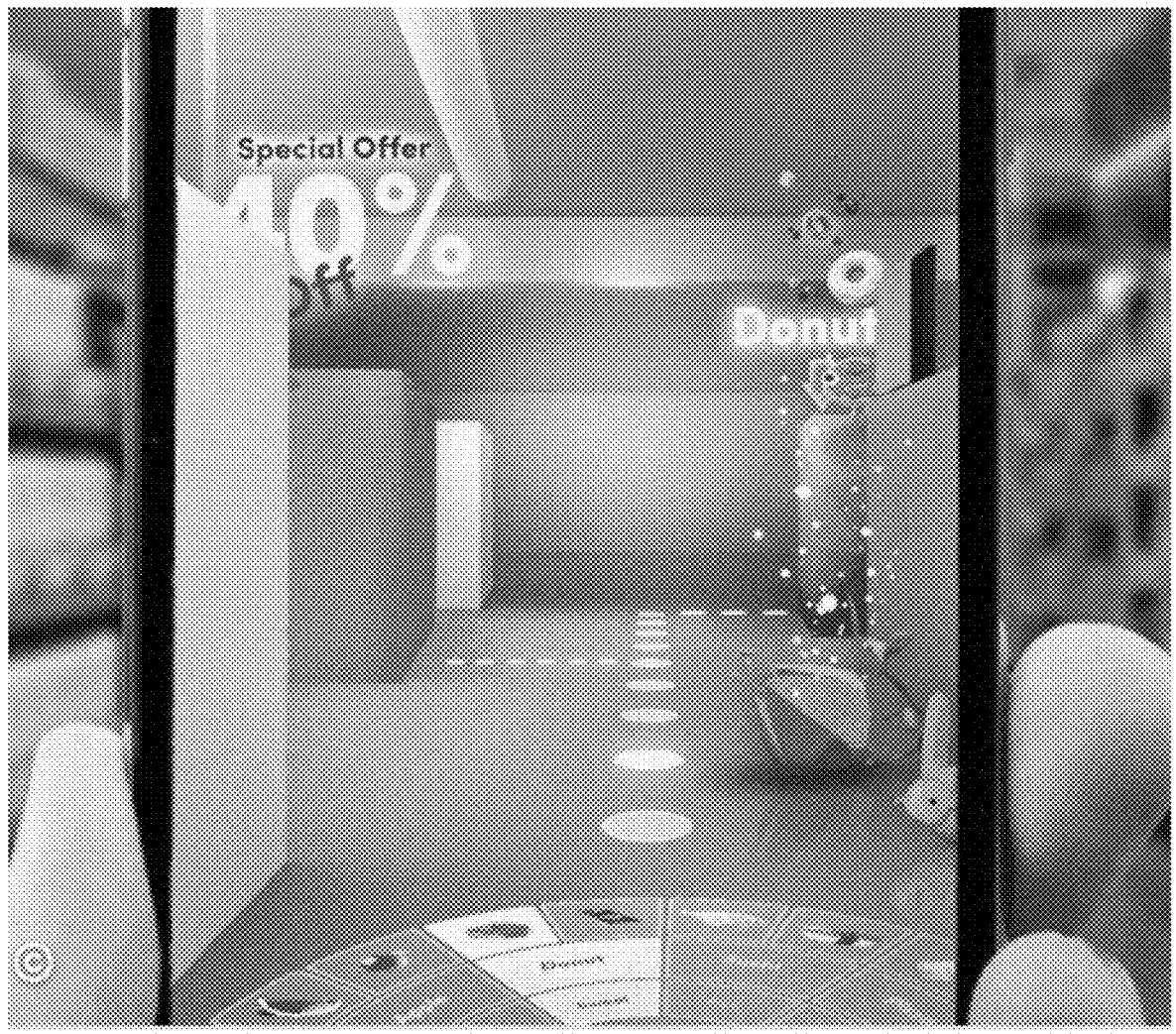
FIG. 16 is a schematic illustration of a first-person VR view seen by a user in a store, in accordance with some demonstrative embodiments of the present invention.

Reference is made to FIG. 16, which is a schematic illustration of a first-person VR view seen by a user in a store, in accordance with some demonstrative embodiments of the present invention. This view may be generally similar to the view shown in FIG. 15; however, in FIG. 16, the entirety of the image is replaced with VR or virtual content, instead of utilizing AR-based content on top of a real-life image. In other words, FIG. 15 demonstrates a real-life captured image, which is augmented with AR-based elements shown ad hoc at particular image-portions; whereas, FIG. 16 demonstrates a virtual representation (e.g., of shelves, aisles, items, products, store elements, and additional labels and signs and indicators) rather than AR-based content, of such elements. The virtual content may be preferred by some users, particularly when the view is sometimes confusingly crowded with many products; and the virtual replacement of content may allow some users to see more easily the additional information that the system chooses to place on the screen.

Figure 17:
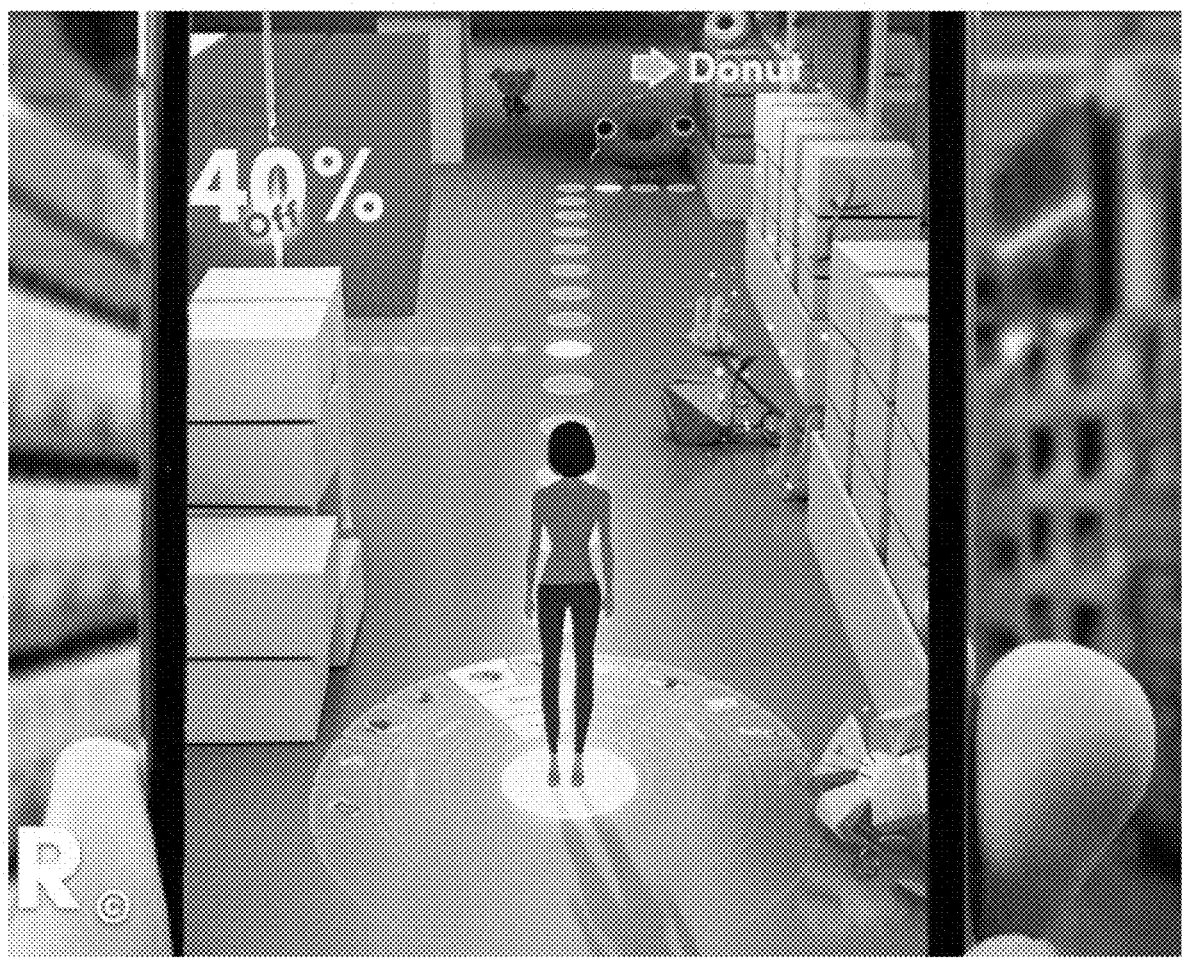
FIG. 17 is a schematic illustration of a third-person VR view seen by a user in a store, in accordance with some demonstrative embodiments of the present invention.

Reference is made to FIG. 17, which is a schematic illustration of a third-person VR view seen by a user in a store, in accordance with some demonstrative embodiments of the present invention. This view may be generally similar to the view shown in FIG. 16; however, in FIG. 17, the virtual depiction of the real world is depicted to the user, on his device, as a third-person experience, showing an avatar corresponding to the user himself, as if the user is located a few feet behind and above the actual location of his end-user device. This view may be preferred by some users, for purposes of in-store navigation and/or for locating particular in-store items or products.

In some embodiments, the navigation tools may allow six degrees of freedom, and may dynamically update the on-screen data as the user moves. The user's current location may be sensed and/or monitored via one or more means that the system may utilize; for example, based on readings by the user's GPS unit, based on Wi-Fi and/or cellular triangulation, based on Wi-Fi signal strength, based on SSID existence and/or signal strength, based on one or more wireless beacon signal(s) and/or their triangulation in space, based on proximity to in-store sensors (e.g., Bluetooth sensors, NFC sensors), or the like. In some embodiments, the in-store location data may be manually provide by the user, such as, by typing or entering the phrase "I am in the Fruits Section"; or by the user dictating this speech to the microphone of his smartphone; or by the user selecting his location from a list of store regions; or by the user scanning his smartphone (and particularly, a barcode or QR code that is temporarily displayed on his smartphone's screen) at a scanning device within the store. In some embodiments, the system may deduce or determine the location of the user within the store based on image analysis and/or computerized vision algorithms and/or OCR operations of one or more images or frames captured by the camera of the smartphone of the user, which enable the system to determine, based on image analysis, that the user is now precisely located in front of the Corn Flakes product shelf. In other embodiments, one or more cameras or sensors within the store may capture data that may be analyzed to determine the user's location; such as, multiple cameras that capture images of faces of users, coupled to a face recognition module that compares the captured images with a database of store clients and their photos (e.g., obtained from the user's profile when he signed up; or obtained from a social network based on an email address or a phone number of the user; or the like). Other suitable methods may be used, or may be implemented by a User-Location Determination Unit 118 of the system.

In some embodiments, an X-Ray Vision Module 119 may enable the smartphone to display to a user in-store information and photos and products, as if the user or the smartphone have x-ray vision capabilities that can penetrate through walls or cabinets or obstacles. This unique feature of the present invention may be implemented in various suitable ways, for example: user Adam is located inside the store at Aisle 6; he is looking East, towards a shelf stacked with Corn Flakes boxes. User Adam lifts his smartphone to be generally perpendicular to the ground, and to orient the viewfinder of his camera towards the Corn Flakes shelf. User Adam says verbally aloud, "show me/tell me which products are located behind this shelf in the next aisle". In response to such inquiry, the system determines the current in-store location of Adam, based on one or more of the methods described above; and further detects his current orientation (e.g., east-bound) based on compass units and/or gyroscope units located in his smartphone; the system then determines that the query is asking which products are located on the east-side shelf of Aisle 5 of the store; the system then checks the Store Map and the Inventory Database, to determine which products are located on that particular shelf; and the system displays on the user's smartphone the relevant output, for example, an actual real-life photo of that shelf on Aisle 5 (e.g., a pre-defined static photo, from a static database that contains several hundreds of images of shelf-portions of that store; or, a dynamic real-life photo of that shelf as obtained from a Ceiling Camera of the store that points to that shelf), or an emulated image of that particular shelf (e.g., an on-screen image of a shelf, having on top of it three Stock Photo images of the most-common products that are on that particular shelf), and/or an audible response (e.g., verbal audio clip that says "behind this shelf of Corn Flakes, in the next Aisle which is Aisle Number 5, there is located a shelf of Pet Food"). In some embodiments, the X-Ray Vision feature of the system may enable the user to see through multiple layers of obstacles, and not only through a single one; such as, enabling the system to display to the user a photo (e.g., static photo, or dynamic real-life photo, or stock photo of stock images of products) that depicts which items are located "three corridors down" or "two more aisles to my left".

Reference is made to FIG. 19, which is a schematic illustration of two images 1901-1902 displayed on a user device, in accordance with some demonstrative embodiments of the present invention. For example, image 1901 shows a non-augmented view or a non-modified view of a shelf: the user points the camera of his smartphone (or other electronic device) towards a shelf, and image 1901 demonstrates the view as originally captured and shown to the user. The user may then tap or click or select a particular region on his screen, such as the top-left region; and may command his device to generate and show an "X-Ray Vision" version of that region. The X-Ray Vision Module 119 proceeds to analyze the image, in relation to the current in-store location of the user; may determine that the user is in front of Shelf 14, facing east; may determine that the next shelf to the east is Shelf 13; may determine from the store's map or planogram that Shelf 13 holds bottles of soda; and may therefore display as Augmented Reality (AR) content, as an overlay on the entire screen of the user device or on the particular screen-portion or image-portion that the user selected or tapped or clicked, a representation of those soda bottles of Shelf 13 (e.g., stock images of the products, or actual real-world images of those exact bottles as captured and shared a few minutes earlier by another customer in that same store); thereby providing to the user an X-Ray Vision capability via his smartphone (or other electronic device), to see behind shelfs or dividers or separators or other barriers.

The user may notice that the top-left portion is empty and appears to be missing items; and may provide to the user a request or a query of "show me which products are missing from this top shelf". The system may check the store's planogram of map, and may determine which products are typically intended to be stored on that shelf-region; and may then generated the modified image or the Augmented Reality (AR) image 1802, which depicts stock images or stock photos of the missing products, optionally with a label or tag of their name and/or the fact that they are currently missing or out-of-stock. In some embodiments, system may automatically perform computer vision analysis of the original image 1801, and may recognize or detect that there is an empty shelf space which is greater than a pre-defined threshold and thus indicates a large In some embodiments, the information may be depicted in AR or VR style; such as, the user holds his smartphone, sees on the screen the actual real-life image of the Corn Flakes, which then becomes greyed-out or vanishes or is now overlay with an image of the "next aisle" content. In some embodiments, the system provides a "penetrate in" button or GUI element, or a "step back" button or GUI element, that may operate similar to a "zoom in" and "zoom out" buttons, but may operate on the basis of the X-Ray Vision feature described above; such as, a first "penetrate in" button or command, triggers the smartphone to display a photo of the content of the immediately Next Aisle, whereas a second "penetrate in" command shows the photo of the content of the aisle that is "two corridors" away, and a third "penetrate in" command shows the photo of the aisle that is "three passages" away, and so forth; and a "step back" button or GUI element or command takes the user at the opposite direction, allowing him to step back from viewing the Third aisle away to viewing the Second aisle away and then the First aisle away.

In some embodiments, an Avatar-Based View Generator 119 may operate to enable the user to see the actual view of any particular region in the store, by placing an avatar on an on-screen map or flat-map or perspective-map or VR map of the store, or by dragging an avatar along a first-person or third-person AR or VR representation of the store. For example, user Bob is located inside the store at Aisle 6; he is looking East, towards a shelf stacked with Corn Flakes boxes. User Bob sees on his smartphone a map of the store, with indications of products; such as, Aisle 2=Fruits, Aisle 3=Pet Food, or the like. User Bob taps on Aisle 3 on the on-screen map, or drag-and-drops an on-screen avatar to that location; and then, optionally, rotates an on-screen avatar to look West bound (or, to look to the left side). In response, the system checks the Store Map and the Inventory Database, to determine which products are located on that particular shelf that the on-screen Avatar is facing; and the system displays on the user's smartphone the relevant output, for example, an actual real-life photo of that shelf on Aisle 3 (e.g., a pre-defined static photo, from a static database that contains several hundreds of images of shelf-portions of that store; or, a dynamic real-life photo of that shelf as obtained from a Ceiling Camera of the store that points to that shelf), or an emulated image of that particular shelf (e.g., an on-screen image of a shelf, having on top of it three Stock Photo images of the most-common products that are on that particular shelf), and/or an audible response (e.g., verbal audio clip that says "on that shelf in Aisle 3, there are Cat Food by Maker-1 and Dog Food by Maker-2").

In some embodiments, the X-Ray vision feature and/or the Avatar-Based View feature, may optionally be augmented with or combined with promotions or paid promotions with respect to particular products. For example, Maker-2 of the Dog Food may be required to pay 50 cents per placement, to the store, in order to be included in the Avatar-Based View that is provided to users that are requesting to view on their phone what can be seen at that location. Optionally, the system may incorporate into the displayed photos, only photo(s) of products whose manufacturers have paid for such placement; and/or the system may automatically remove or black-out or white-out from such photos the portions that relate to products of non-paying manufacturers. Optionally, the real-time bidding/auction that is described above, may similarly be used when a user requests to see an X-Ray image or an Avatar-Based image of another region of the store, thereby allowing makers and manufacturers to compete in real time on the placement and/or inclusion of their product(s) in such unique views that are provided to users; and further allowing the bidding manufacturers to compete on particular end-users (e.g., "include my Bread Product only in X-Ray images that are shown to females in the age range of 20 to 40").

In some embodiments, the system tracks and/or shares the user's in-store location in real time, and is capable of providing location-based games or activities or promotions. For example, a Location-Based Activity Generator 120 may assist an adult user to keep his child occupied during a long shopping session; the smartphone of the user determines the current location of the user, and conveys to the child a challenge such as "Can you find with this smartphone, on the shelf, a Cereal box that has a Rabbit image on it?", and the child utilizes the smartphone in AR based mode to view the various shelves until he finds the requested item, and/or to capture an image of it; and optionally, augmented elements are displayed on the screen of the smartphone, such as, an animation of a treasure box opening may be displayed as an overlay element in the AR view once the child indeed points the imager of the smartphone towards the requested product.

Embodiments of the present invention may be utilized by in-store personnel, or mangers or supervisors or employees, or by manufacturers or distributors, and not only by consumers or customers. For example, a store manager or a regional supervisor may utilize the system to observe inventory, for AR presentation of inventory, to check product appearance, or the like. Similarly, a food manufacturer may utilize the system to examine where exactly in a particular store, and in which aisle and/or shelf and/or height from the floor, his particular product is displayed, and how many units of the product are visible to consumers in real life. In some embodiments, different levels of access privileges may be defined for different types of users (e.g., employee, manager, supervisor, manufacturer, consumer), enabling selective presentation of only some of the data based on the type of user and his respective access-control privileges.

In accordance with the present invention, the Store Map may be generated and/or updated dynamically, based on real-life photos or images or video-frames that are captured and/or uploaded by end-users (e.g., consumers, customers). For example, user Adam may utilize his smartphone within the store to navigate from Milk to Bread, using an Augmented Reality navigation mode such that the navigation directions are displayed on top of (as an overlay upon) real-life imagery captured via the smartphone's imager. The imager is thus continuously operational, and may periodically capture and send or upload images to the system's server or database, together with an indication of the precise user location and spatial orientation. A Stitching Unit 121 may operate to stitch together such uploaded or streamed images or frames, and/or to construct from them the store map or updates thereto; and/or to perform computerized vision and/or image analysis and/or OCR on the captured images or frame; and/or to update the Inventory Database accordingly (e.g., to indicate to the system that even though the Inventory Database currently shows that Seven boxes of corn flakes are in the store, a fresh image from a customer shows that only Four boxes are on the shelf, thereby indicating to the system that Four other boxes are possibly misplaced within the store and/or are located within shopping carts of consumers that did not yet perform a check-out process). It is noted that the Stitching Unit 121 of the present invention may further utilize other and/or alternate and/or additional sources of information, in order to stitch together data and/or images from multiple sources and to create three-dimensional cell representations of the venue and/or the products or items therein; for example, utilizing and/or stitching together data from one or more localization services and/or SLAM (simultaneous localization and mapping) platforms in order to construct and update a map of the store (or venue) and the items or products therein. Some embodiments may combine or stitch together or fuse together multiple 3D maps, that are generated separately by a crowd of mobile SLAM or SLAM-compliant or SLAM-based devices or units or portable devices or portable applications, and generate from them a single, unified, seamless, continuous, and scalable representation of 3D information of a venue as well as the products or items within it, with enablement of 6 degrees of freedom for a user to manipulate or modify the viewed venue or object, and with 6 degrees of freedom with regard to localization and/or semantic(s) of the mapped areas, spaces, cells and/or objects.

It is noted that for demonstrative purposes, some portions of the discussion herein may relate to mapping, detection, identification, and/or localization of a product or of multiple products within a store or venue; however, some embodiments may similarly operate to map, detect, classify, identify and/or localize other objects or items, for example, store infrastructure elements (e.g., elevator, escalator, restroom, exit doors, entry doors, cash registers, lighting fixtures, lamps, shelves, tables on which merchandise is placed) and/or other objects; which may then be tied into or otherwise associated with the store map, and may optionally be associated with various meta-data and/or features which may be tracked and monitored and then reported (e.g., how many shoppers have stopped in front of a particular merchandise table in the past 24 hours; how many shoppers have picked up an item from a particular shelf in the past week; or the like).

Optionally, a Machine Learning (ML) unit 122 may operate to perform Mobile Object Detection and/or Classification, and automated ML for environment understanding and object detection. For example, a ML-based object detector may detect and/or classify objects, optionally utilizing a Neural Network (NN) or a convolutiona (CNN) as a first layer classifier. Multiple images may capture objects and other ML data, and such images are uploaded to the server of the system. Classified image dataset may be fetched from the server. Invariant feature matching and data labeling may be performed, and detected feature(s) are identified and registered in three-dimensional space. In some embodiments, real-time organic occlusion and ML segmentation may further be performed, and suitable AI or ML processes may be applied to the captured data and/or to processed or partially-processed data extracted from images in order to update the Store Map and/or the Inventor Database of the store.

In some embodiments, a Data Processing Unit 123 may perform server-side processing of captured data, such as: (1) creation and/or updating of a 3D real planograma image management and classification database; (2) creation and/or updating of cell data, corresponding to spatial "cells" of real-life spaces or regions; creation and/or updating and/or utilization of raw and/or processed point cloud(s), localization maps, image datasets, classified textured floors and walls, utilization and incorporation of GPS data and RF TTF data, gaming content; (3) extraction of real planograma 3D matrix data, from data collected by mobile phones, head-mounted devices (HMDs), existing 3D maps or 2D maps with planograms and location-based Web data; (4) Automated image tagging based on, for example, invariant feature matching, OCR analysis, image analysis, computerized vision algorithm, comparing between image-portions and stock images of stock photos of products or logos or slogans; (5) data augmentations of existing image(s) with TF features policies (e.g., flip, crop, contrast, brightness, perspective); (6) training of a Deep NN (DNN) classifier; (7) automatic updates to cell data; (8) identification or creation of server-based cells representations and image stitching by using the localization solutions; (9) smart feature error detection and correction; (10) utilization of RF TTF (radio frequency transmit time factor) triangulation or localization, for robust seamless positioning solution, particularly when visual data is not possible by cell towers, P2P and P2X triangulation positioning and localization.

Some embodiments may use a Real Time Visual Localization unit 124, to help localize the user indoors based on a previously mapped environment, relying on an object/image recognition system, as well as the relative trajectory (e.g., from ARkit/ARcore); and optionally utilizing a particle filter to provide positioning in 6 axes for mobile AR, VR and MR applications. The unit may operate in real-time on a mobile platform together with other software after the user moves sufficiently in the environment, and may perform or may enable, for example: (a) Object detection/recognition localization between visible objects (2D/3D); (b) Localization on Map based on object detection/recognition (2D+1 rotation); (c) Prediction of particles in map using object detection/recognition (2D+1 rotation); (d) Correction of particles in Map using object detection/recognition and correction stage based on ARkit/core (2D+1 rotation); (e) Extrapolation of Map localization with ARKit/ARcore (6D pose); (f) Through evaluation in multiple scenarios.

Figure 2:
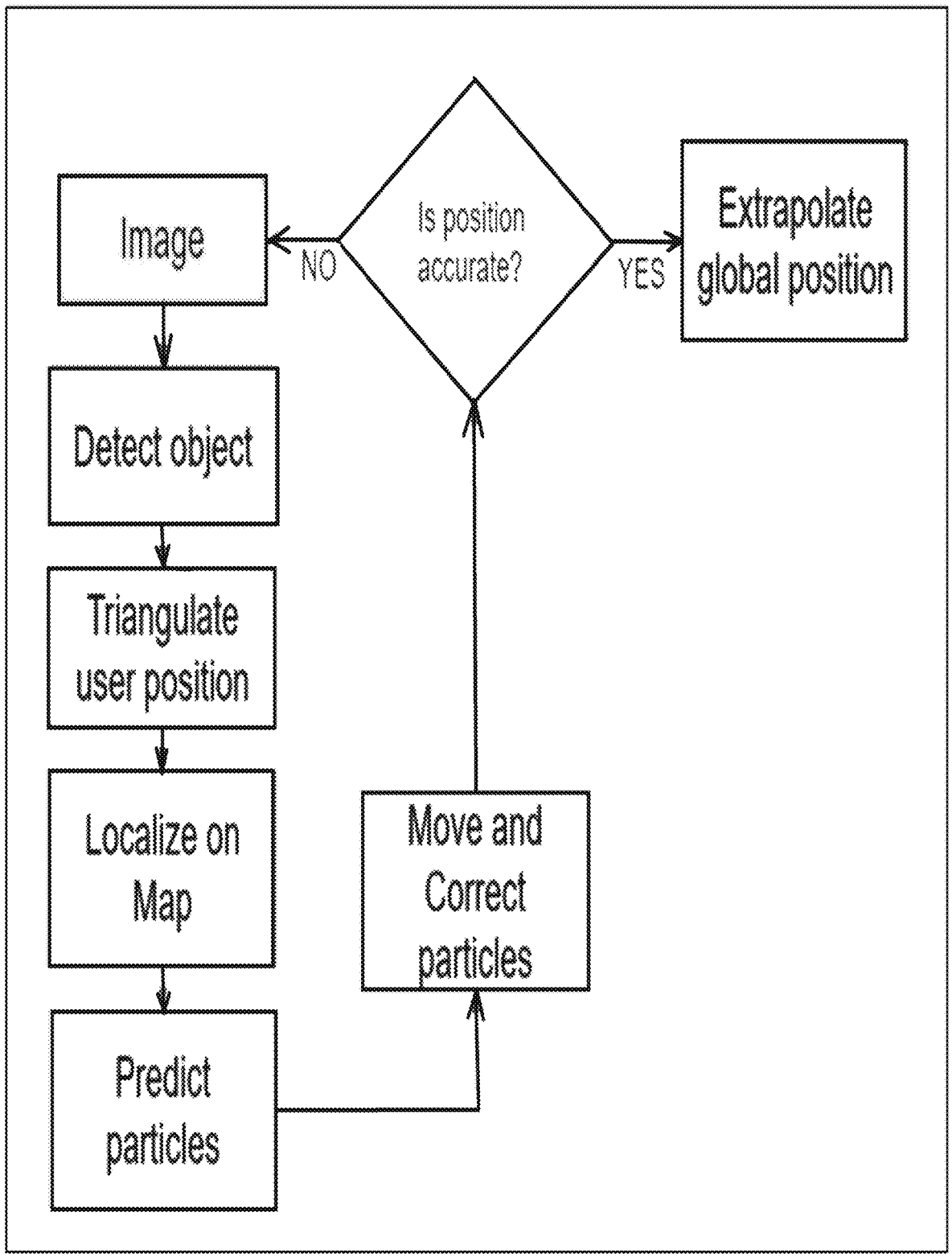
FIG. 2 is a flow-chart of a method of localization of a user and/or a product, in accordance with some demonstrative embodiments of the present invention.

Reference is made to FIG. 2, which is a flow-chart of a method of localization of a user and/or a product, in accordance with some demonstrative embodiments of the present invention. Such method, or other suitable methods, may be utilized or implemented via or by one or more of the components of system 100, and/or by any of devices 151-153 and/or server 150. Additionally or alternatively, the process of FIG. 3A may be utilized, as described further herein.

In some embodiments, the system may provide product-based, user-based and/or location-based advertising, at a fixed price or rate, or optionally in combination with real-time bidding or dynamic auction among bidders or advertisers based on advertising criteria and pre-defined bidding limits or budgets. As the physical and the digital converge into one engaging shopping experience around the manufacturer's product at the store, the present invention provides new and innovative advertising capabilities in the store, as well as outside it and even at home, by using a complete user-centered AR location and product-based AR platform, toolsets and optionally an SDK. This may allow brands and manufacturers to advertise smarter cheaper and more efficiently, and to reach the particular user(s) who are already located within a store and are on their way towards a particular product or destination within the store. By navigating around the store in real time, personalized and tailored promotional sales are revealed to specific users based on their behavior at the store, highlighting brands and their respective products, and giving the user more information in an organic way; and even providing to a specific user a specific promotion that may not necessarily be available to other customers. Accordingly, the system of the present invention allows brands to promote their products directly to their target market segment(s), and/or to actual consumers that are about to perform a real-life purchase in a brick-and-mortar store and can be guided towards buying a particular product; or, in some implementations, may be prevented from buying a product of a competitor, or may be switched from an intention to buy a competitor product to purchase another product instead, or, by persuading a user to purchase additional items (or additional quantities) relative to the original product that he intends to purchase.

For example, every product in the store Inventory Database is associated with an on-map digital representation. Product templates may be used, such as customized templates and animations which highlight and promote particular products or product-features (e.g., being organic; being on sale; being dairy free; or the like). Location based advertisements in the system may include customized virtual advertisement content at hotspot areas, as the user utilizes his smartphone (or other electronic device) for AR-based or VR-based navigation and/or shopping tour.

In some embodiments, a Virtual Selling Point Generator 125 may generate an ad-hoc virtual selling point, that pops up and is displayed as an Augmented Reality element on the user's phone, as the user is standing at or near a particular product or as the user is on his way towards a particular product. For example, user Adam is walking in the store with his smartphone in AR mode; the system determines his current location as being in immediate proximity to Corn Flakes. At this precise moment, Adam's smartphone may present an overlay AR component of graphics and/or animation and/or voice-over, that is specifically tailored to the Corn Flakes shelf of products, and/or is particularly tailored to a specific Corn Flakes product of a specific manufacturer. For example, the smartphone of Adam may convey to him product related information, such as, "did you know that Corn Flakes are a low-sodium item that is good for your heart?", or "attention, the Corn Flakes box by Manufacturer-1 is now on sale with 30 percent discount". In another embodiment, the Corn Flakes AR-based element is displayed not necessarily when the user Adam is standing near this particular product, but rather, for example, when user Adam has already indicated to the system that he is walking towards that product, and/or when he is walking towards a different product that is related to Corn Flakes based on a pre-defined product relation list (e.g., associating between Milk and Corn Flakes; or associating between Peanut Butter and Jelly), and/or when he is walking towards a different product that the system determines to be competing with (or replacement to) Corn Flakes (e.g., a different type of breakfast cereal), and/or when he is walking towards a different product along a travel route that includes an area in which Corn Flakes are displayed on the shelf and thus the user is expected to pass near them in about 20 seconds from now. Upon one or more of these conditions, or other criteria, the smartphone of the user may be triggered to launch the AR element of the Virtual Selling Point.

Similarly, a Virtual Stand or a Virtual Sales Associate or a Virtual Assistant or a Virtual Advisor or a Virtual Shopping Assistant or a Volumetric Personal Sales Assistant may be generated and provided to the user as an AR element, via the Virtual Selling Point Generator 125 or other suitable unit; such as, to enable e-commerce sales for multiple applications, or to interact with the user in an organic way and to provide the user with more information about brand products and content around the consumer.

The in-store navigation system may provide user-behavior data for brands and manufacturers of products, allowing a manufacturer to be the first to know about his customer's behavior around his product or near his competitors; enabling to generate a smart or efficient shopping route, based on user behavior analysis, featuring promotional content and AR experiences, and/or structured to increase or maximize data collection related to the brands and user interactions; and enabling to utilize user-specific data (gender, age, family status, or the like) to further tailor the recommendations and information to the particular user.

In some embodiments, some or all of the users (e.g., shoppers, visitors, store employees, personnel, security guards, cashiers, or the like) may be equipped with smartphones or other portable electronic devices and may utilize a Location Sharing Module 133 to enable a "share location" feature, in order to share their precise or their approximate in-store location or in-venue location with a common server which aggregates and tracks such data. Then, a shopper or visitor within the store may query his smartphone with a query such as "where is the nearest Store Employee" or "where is the Jewelry Department employee" or "where is the Paints Department consultant"; the query is transmitted to the server which tracks the relevant person(s) and/or the nearest person(s), and provides a response to the inquiring user (e.g., "the Jewelry Department employee is currently in Aisle 6, ten meters to your left"). Optionally, a "Go-To Employee" GUI element enables the user (the shopper, the visitor) to request AR-based or turn-by-turn navigation directions that would take him from his current location to the desired Store Employee. Additionally or alternatively, a "Summon Employee" GUI element enables the user (the shopper, the visitor) to initiate a request that a particular employee (e.g., the Paints expert of the store) would be summoned by the system and would be guided to walk to that particular shopper in order to assist him; thereby allowing user Bob to request that the Paints expert, no matter who he is and where he is, will approach and will reach user Bob who is sharing his location and who may continue to walk around the store while the system guides the relevant employee how to navigate to user Bob.

The real-time bidding system for advertisers, in accordance with the present invention, may allow brands and manufacturers to advertise smarter and cheaper by impression-based charging (CPI). The real time bidding system allows brands and agencies to promote their products in a specific place and time based on characteristics or types of users or groups of users. In some embodiments, the platform may include premium access to detailed real-time user-based analytics on brand products and the users interactions around the store and even at home; accessible to advertisers via a "drag and drop" front-end GUI, thereby enabling brands to control digital content appearance at the store (and even at home) by targeting their audience in a new and efficient way.

In a first example, the system may determine that user Bob is standing in front of the Soda and Beverages shelves; and that his smartphone is currently in AR mode, targeting the shelf of Cola beverages. In one implementation, the system performs image analysis and/or OCR, and determines that the user's smartphone is now targeting the Coca Cola drink. A real-time bidding may now take place within a split-second, between the Coca Cola Company which bids 40 cents per impression, and PepsiCo which bids 50 cents per impression, both of them targeting only male users in the age of 20 to 30 years old; the real-time bidding system determines that PepsiCo wins the current auction, and presents an overlay AR element, injected onto the display in Bob's smartphone, with a pop-up animation that conveys the message "Walk just two feet to your left, and pick up Pepsi which is on sale today!", as the system knows already from the Store Map and the Inventory Database that the Pepsi product is located two meters to the left of the Coca Cola product and is indeed on sale as conveyed. In another implementation, a first manufacturer may pay a premium in order to attempt to "hijack" or divert a consumer, that is standing in front of competitor's product, towards his own product. In another implementation, such diversion may be performed while the user is on his way to the destination product, based on his previous request of "Please take me to the Coca Cola shelf in this store", thereby allowing the competitor (PepsiCo) to inject an intervening AR-based promotion or advertisement along the route, as an AR element.

In a second example, an ad-hoc coupon generator 126 may further generate a user-specific manufacturer's coupon, directed specifically to this particular user. In the above scenario, the real-time bidding system may be pre-configured to not only display the advertising AR element, but to also display an on-screen coupon from the winning bidder with regard to this specific product. In the above scenario, the bidding winner (PepsiCo) further provides in advance an instruction that, in order to increase the chance that the user would be Converted from buying Coke to buying Pepsi as he stands near the shelf (or as he walks towards the destination shelf), a particular discount coupon is to be generated and displayed only for this user; and such coupon may then be scanned by the user at the cash register or the Point of Sale (PoS) terminal. In some implementations, the user-tailored coupon is displayed to the user Before he approaches the shelf that contains the two competing products; or, While he is on route to that shelf (e.g., as determined by his request for in-store navigation directions to that shelf or to the specific product or to the competing product); or While the user is aiming his smartphone in AR mode towards the competitor's product on the shelf (e.g., in order to "hijack" the customer); or While the user is aiming his smartphone in AR mode towards the same product on the shelf (e.g., in order to ensure that the customer remains Loyal to the brand that he is now watching, and/or in order to incentivize the user to do the additional step of actually picking up the product from the shelf and inserting it into his shopping cart).

In a third example, a heat-map is generated and/or updated, and is tailored specifically to a brand or a product, collecting the location-based data and/or the AR-based data of the user as he walks towards a product. For example, Manufacturer-1 that makes Product-1 wants to obtain a Heat Map, that illustrates what is a typical route of a consumer that indeed purchases Product-1, or which other products such user visits in this particular store before and after he visits the Product-1 shelf. The continuous tracking and the analysis of AR data and images, allow the system to determine that 70 percent of users (or, that 60 percent of female users in the age range of 30 to 40), who purchases Product-1, have also purchased (or took from the shelf) Product-2 before taking Product-1 from the shelf, or have also took from the shelf Product-3 after taking Product-1 from its shelf. These generated insights may enable the manufacturer of Product-1 to place AR-based advertisements or promotions in a "hot spot" which is the vicinity of Product 2, or to request the AR-based display of such ads or promotions to users that indicated that they are walking towards Product-2, or to in-store shoppers who are known to have purchased in the past Product-2.

As described above, the system may generate and utilize an AR-based on-screen Compass Navigator (or dial navigator), as a location-based UI or GUI or AR-based GUI, as an intuitive way to see what is around the user's space; optionally by also learning the user's behavior around the store, allowing Compass to highlight the most relevant, promoted and/or feature products targeted specifically to the user and his environment or preferences.

The on-screen compass may operate in various modes; for example, shopping mode, traveling mode, eating, drinking, or the like, and each mode may affect some or all of the features in the compass. It may highlight or point to the user's favorite products, and/or may recommended and point to similar products or related products, optionally indicated on the compass when passing near them or when passing at an intersection that may lead to them. A user may create a shopping list or a wish-list, and the system generates a shopping route that leads the user to all the products on the list, navigating by following the highlighted areas on the on-screen compass. Similarly, wish-list items and/or registry lists may appear on the map and compass for in-store navigation. In some embodiments, the user that generates his shopping list may be a customer that intends to perform his shopping physically at the retail store by himself. In other embodiments, the shopping list may be generated by, or for, a Personal Shopper person who is a user that holds an end-user device and collects products for shelves in order to fulfil a shopping order (or multiple such orders) that were placed by a customer (or by multiple such customers). The user may further indicate one or more filtering criteria (e.g., nutritional values, vegetarian, dairy free, gluten free, soy free, particular brands to avoid or to include, budget constraints, or the like); and by tagging all products in the store matrix, the system may highlight different products when passing by them or when walking in the store in general (e.g., "attention, a new gluten-free food item is on your left now", conveyed as an audible message, and also displayed in the on-screen compass). Furthermore, by analyzing past purchase of the user, the system may suggest to this user the most relevant products and paths, and may highlight them via the on-screen compass, as well as highlighting via the compass tool various personalized or general promotions or coupons or discounts (e.g., indicating to the user to turn left now in order to reach a shelf of discounted beverages).

In a demonstrative embodiment the on-screen AR-based compass navigator tool may include multiple concentric rings or circles, or arcs or curves or circle-portions, which may correspond to different granularity of the information represented by them or pointed by them. For example, a first AR-based ring may represent or indicate the direction and distance to a specific category or department by fixed value in relation to the map (e.g., "Baking Needs"); a second AR-based ring may represent the next group of products in the category and can be manually turned to select your choice (e.g., "Sugar"); a third AR-based ring may indicate a specific product (e.g., packets of brown sugar by Manufacturer-1). Clicking or tapping or spinning the on-screen ring(s) may further trigger the fine-tuning of product-based or category-based navigation.

The content displayed in or near the rings of the on-screen compass, may dynamically and automatically change or updated, based on the changing in-store location of the user, and/or based also on the spatial orientation of the user's smartphone (e.g., facing north, or facing south-east, or the like). For example, as the user makes a left turn from Aisle 4 to Corridor 5, the on-screen compass navigator rotates automatically by 90 degrees, and reveals a new category of items that can now be viewed in real life because of this turn, and/or changes the direction of another category due to that turn (e.g., a previous category of "Dairy Items" used to be ahead or "up", but due to the left turn of the user in the store, that category is now located on the Right side of the user and thus is shown in the "east" side of the category ring).

In some embodiments, the system may comprise a Rewards Generation and Collection Unit 127, which may increase the likelihood of consumers utilizing the system and/or may reward users for actively engaging with the system's AR-based platform. In a first example, each AR-based operation made by the user, may reward him with a pre-defined reward (e.g., coin, star, virtual coin, virtual money, real-life money, credits, coupons, discounts, promotions, crypto-currency, experience points, or the like). For example, a user that requests from his smartphone "please generate a shopping route with all the products that I bought in my previous visit to this store", may receive 5 credit points; a user that requests from his smartphone "take me to the Milk section" and then utilizes the AR-based navigation to reach it may be rewarded with 3 credit points; and so forth; a user that turned-on or enabled or allowed AR-based advertisements, or that watched an AR-based ad element, may be rewarded with 4 credit points; a user that intended to walk to Product-1 but was diverted towards Product-2 due to an AR-based advertisement may be rewarded with 6 credit points; a user that enabled the uploading and/or the sharing of images and/or video frames from his AR-based application to the system's server (and thus has helped to improve or to update the system/s database and/or map, and/or improved to recognize his location and/or orientation) may be rewarded with 1 credit point per image or per each 10-seconds of video sharing; and so forth. In some embodiments, credit points may be awarded to a user for completing AR-based tasks; such as, "please visit in this store the following five different locations that feature a promoted item"). The collected credit points may be exchanged for store credit, for coupons, for money, for real-life rewards or assets or free products, for crypto-currency, or the like.

Some embodiments of the present invention may generate an Augmented Reality (AR) view, of an area or region of a venue (store, mall, department within a store, or the like), which shows an actual image of the region (e.g., captured in real time via an imager of the smartphone or electronic device of the user), and Augmented with additional information or visual elements (graphics, animation, text, video, labels, tags, prices, filters, emphasis or highlighting of specific products or features, or the like). This may be performed by an AR Element Adding Unit 134, which may generate such additional elements and add them or overlay them onto a real-time imaging output of the venue or region. For example, the AR Element Adding Unit 134 may generate and add: (a) a price and/or a name of a particular product that is seen within the image or the ongoing AR view; (b) a tag or label of a product (e.g., "Diet Coke, 1.5 liters, 2 dollars"), or for an entire section or shelf or table of products (e.g., "Breakfast Cereals" or "Sugar" or "Rice"); (c) an emphasis or highlighting of a particular product that is within the region of interest or the viewed image (e.g., highlighting "Diet Coke 1.5 liters, which you have purchased in the past!"; or highlighting "Diet Pepsi 2 liters, which is on sale today!"; or highlighting "Sprite Zero is calorie free!" because a manufacturer of this product had paid or performed real-time bidding to have this product highlighted or emphasized in the view); (d) an AR avatar or AR decorations or additions, such as an avatar that is walking or flying around the store, animated or static decorations of flowers or bees or birds; (e) a navigation trail, shown in first-person view or third-person view or perspective view, the trail indicating a common or popular shopping trail of this particular user and/or of a group of users and/or of the population of visitors, and/or the trail including one or more segments or points-of-interest that are included in this trail due to their being on a current or past shopping list or wish list of this user, or due to their having a product that is promoted or on sale or that its manufacturer had paid or had performed real-time bidding in order for this product to be included in the navigation trail; (f) an on-screen virtual compass, optionally as an overlay onto the floor or ground of the store or venue, indicating the relative directions of departments (e.g., "dairy", "fruits") or product-types (e.g., "mineral water", "rice") or specific products (e.g., "Diet Coke" or "Pepsi), and allowing the user to interact with such on-screen compass by rotating and/or selecting one or more of its rings or ring-portions, and/or automatically rotating or spinning or updating such on-screen compass in response to detection that the user has moved or turned or rotated in real life; (g) an on-screen addition of particular products that are currently Missing or our "out of stock", by performing image analysis and computer vision analysis of the captured view, detecting that a first product is indeed shown on the shelf, whereas a second, nearby, product, is lacking from the image and instead of it there is a void or an empty space on the shelf, and then obtaining from the Store Map and from the Inventor Database the data about the missing product or out-of-stock product and then generating an overlay AR element that shows a virtual image of that missing product in the exact location of the empty shelf as viewed on the user's device; and/or other AR elements which may be generated and/or added on-the-fly as the user walks within the store.

Reference is made to FIG. 18, which is a schematic illustration of two images 1801-1802 displayed on a user device, in accordance with some demonstrative embodiments of the present invention. For example, image 1801 shows a non-augmented view or a non-modified view of a shelf: the user points the camera of his smartphone (or other electronic device) towards a shelf, and image 1801 demonstrates the view as originally captured and shown to the user. The user may notice that the top-left portion is empty and appears to be missing items; and may provide to the user a request or a query of "show me which products are missing from this top shelf". The system may check the store's planogram of map, and may determine which products are typically intended to be stored on that shelf-region; and may then generated the modified image or the Augmented Reality (AR) image 1802, which depicts stock images or stock photos of the missing products, optionally with a label or tag of their name and/or the fact that they are currently missing or out-of-stock. In some embodiments, system may automatically perform computer vision analysis of the original image 1800, and may recognize or detect that there is an empty shelf space which is greater than a pre-defined threshold and thus indicates a large quantity of missing products; and may perform the AR-based augmentation or addition of the missing products onto the screen of the user device, automatically upon recognizing such missing products or such empty shelf-space.

Some embodiments may further perform placement of ads on AR/VR/POV/3d map of a venue, near a relevant product shelf as it is shown in real life; as well as applying a product filter to an AR view of products in venue (e.g., marking or highlighting products that are on sale, or that are vegan or dairy free or gluten free, or that are currently on sale or are promoted); adding labels or tags to products, or aisles, or shelfs, or batches of multiple products; adding of AR navigation elements, arrows, mile stones, way stones, compass, a moving or pointing avatar, a virtual on-screen trail, or other AR navigation items on a real-life view of the venue, in order to reach a particular user-selected destination or a promoted product; adding AR information pointers or elements to particular products or shelves, and upon Click/Tap, showing more information or video or animation or voice-over about the pointed product or item or shelf; adding an image or an animation of a product, optionally in an enlarged form or size on the screen, depicting a particular product (e.g., promoted by a manufacturer, optionally via real-time bidding), such as an enlarged can of soda shown on the floor or between shelves with an on-screen animation as if the soda can is being opened and releases a spray of soda into the air, or a box of chocolate animated on the screen to become open and to release from it chocolates and birds, or the like.

Some embodiments may enable a visual at-home shopping experience. For example, based on a scanning or imaging of the user's home or kitchen or pantry or food cabinet or fridge or freezer, the system may generate a list of products that are of interest to this particular user; and may then generate an ad-hoc virtual store that is tailored to this specific user and that features these particular products (and/or competitors' products, especially if such competitors have placed bids to be featured), enabling the user to perform online purchases of these products from a miniature online store that is based on those products. Optionally, a VR Mini-Store Generator 128 may generate a virtual mini-which store may be displayed to the user as a Virtual Reality (VR) environment, in which the user "walks" using a first-person view or a third-person view; and such VR environment may further be augmented with promotions and advertisements by advertisers competing in a real-time bidding or auction. The system may thus enable the user to entirely save a trip to the actual brick-and-mortar store, and to replace it with a VR trip within a virtually simulated environment that mimics such store, and furthermore, which focuses on the items or the categories that are of interest to the specific user. For example, a user who does not own a pet, and that a scanning of his home does not show any pets or any pet food or pet related products, will encounter a system-generated VR mini-store that lacks any pet food section; similarly, a user who is a single female may be presented with a system-generated VR mini-store that lacks any male clothing items; or the like.

Optionally, some or all of the components or features of the system may be implemented in conjunction with a Crypto-Currency Platform 129, which may optionally comprise a payment and scanning ecosystem or modules. For example, credit points that are awarded to users that utilize the AR/VR system, may be exchanged or converted into cryptocurrency or into a blockchain-based cryptocurrency. Additionally or alternatively, shoppers that utilize the AR/VR system of the present invention may receive a particular additional discount on prices, as they are part of a particular group of shoppers that the system of the present invention may incentivize to act, thereby elevating the benefits of being a customer who is part of a larger group of the same type. The utilization of a crypto-coin or crypto-currency, as part of the AR-based or VR-based shopping experience, further enables the system to offer lower transaction fees and payment clearance fees, and/or by eliminating credit card fees; and these savings may be translated into additional discounts for users, and/or may be translated into bonus crypto-currency or credit points to participating users. In some embodiments, for example, a user that scans or images new areas in the store, or new products, or unmapped areas or under-mapped areas, or that provides high resolution images of certain products or areas, or that shares with the system's server his continuous stream of AR-based images or video or content, may be rewarded with crypto-currency or with other rewards (discounts, coupons, fiat money credit, or the like). In some embodiments, similarly, advertisers or manufacturers may utilize the crypto-currency of the system in order to pay for promotional content, for AR-based location-based advertisements, and for their real-time bidding for AR/VR placement of advertising content; and may similarly enjoy the saving in transaction costs and credit card clearance and collection costs and risks, thereby translating such utilization into cheaper advertising which is also more efficient and more focused as being tailored to the particular already-in-store customer.

Some embodiments of the present invention may utilize on-device AI multiple object detection and classification. For example, a consumer product app for mobile devices may help users to research consumer products in-store at retail outlets, by locating and identifying products of interest to them, and presenting to them relevant information on the product and/or the environment; and optionally presenting tailored AR-based coupons or promotions, and/or selected AR-based advertisements from manufacturers of specific products.

The app uses the smartphone camera to scan the environment for possible products of interest. The detection of products of interest may be a two-stage process. The first step is for a lightweight and responsive front-end AI to detect sellable items in real time, at up to 30 frames per second (FPS) in the camera scene. Cropped and corrected and filtered images of these sellable items are then analyzed in higher detail using secondary classifier models, such as backend cloud virtual machines (VMs) and/or on device category models. The detailed product information is then sent back to the user's mobile device to display in AR (as an over-layer) and/or otherwise on the screen (e.g., as a text box or balloon, as a pop-up window or tab, as an over-layer or under-layer, or the like).

The app bundle includes, for example, a lightweight AI for object detection, which highlights items of interest for further analysis in the cloud backend. The frontend AI is capable of operating in real-time or in near real time, and the backend analysis has access to a greater computing power for classification and product API queries, the results of which are presented to the app user to identify and explain specific products in-store. This two-tier system has the benefit of a low latency, responsive user interface/user experience (UI/UX), while also delivering a maximum amount of information about the product using the cloud backend.

In a demonstrative example, a You Only Look Once (YOLO) version 3/tiny-3 system may be used, having a convolutional neural network (CNN) architecture with 45 layers and 9 million parameters. Such front-end system may be capable of real-time object detection at 30 FPS on a modern mobile device.

In a demonstrative example, a batch of 16 example training image mosaics from a supermarket items dataset was used. The dataset included 4,816 training images and 534 validation supermarket images, with an average of over 50 labeled items per image. The dataset contained 1,000 unlabeled background images obtained from an open-source COCO image dataset, making it about 20% background.

In a demonstrative example, a batch of 16 example validation images from a supermarket items dataset was used; for example, independent holdout images not seen during training, and used for obtaining validation losses and performance metrics like mAP@0.5 and mAP@0.5 . . . 0.95.

In a demonstrative example, a PyTorch package utilized training results over 1,000 epochs on a dataset using different training strategies; the trained model achieved a final mAP@0.5 of 84.1. Classification loss plots were absent since this is a single-class model, and no classification training is required. Other values of results may be achieved, at different or greater accuracy levels and/or certainty levels and/or reliability levels, in accordance with the present invention, by utilizing one or more other datasets for training and/or for classifying, and/or by utilizing other NN or CNN or ML or DL or AI algorithms or tools.

The present invention may comprise a Particle Filter tool or unit or module or process, which includes a probabilistic algorithm that can be used to localize a moving device in a previously mapped environment. Multiple hypotheses of the device location, referred to as "particles", are distributed into the map repressing a discrete probability distribution of the device location in the map.

Figure 3A:
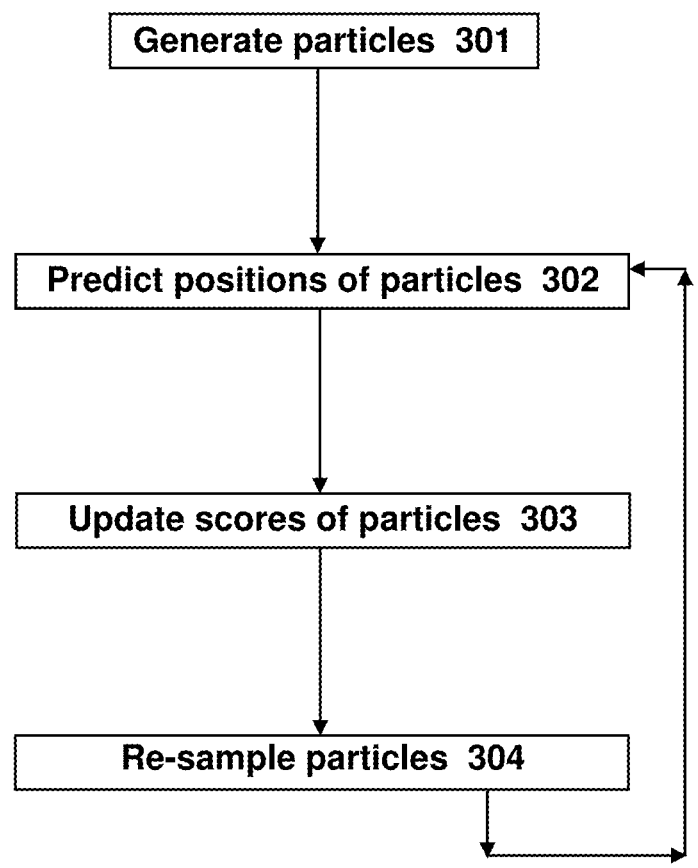
FIG. 3A is a flow-chart of a method of particles generation and filtering, in accordance with some demonstrative embodiments of the present invention.

Reference is made to FIG. 3A, which is a flow-chart of a method of particles generation and filtering, in accordance with some demonstrative embodiments of the present invention. For example, particles are generated (block 301); particles positions are predicted or estimated (block 302); particles scores are updated (block 303); then, particles are re-sampled (block 304), and the process repeats iteratively with operations of blocks 302-304.

Initially, the particles are generated and are randomly and homogeneously distributed all over the map, in the Generate Particles stage. Later, the particles are iteratively moved and resampled based on the device motion and device sensor measurements, decreasing the system variance and estimating with higher probability the location of the device in the map. The movement of the particles is performed in the Prediction stage where each particle is moved according to the motion of the device. In the Update stage, each particle probability score is calculated based on how well the particles sensor measurements explains the known map environment. This score is determined by detecting certain objects which are used as landmarks and were previously defined in the map. Finally, the Resampling stage is responsible to relocate the particles based on their probability score, increasing the density of hypothesis in areas with higher probability while reducing the density in regions with lower scores. The algorithm is expected to converge to the correct solution with a high probability after the device moved and detected enough landmarks.

In some embodiments, the process does not require the specification of the device starting point. In some embodiments, this approach allows to localize the device even when an object appears in multiple places. In some embodiments, the probabilistic nature of the process allows to robustly localize the device even in cases of mis-detection or non-detection or misplaced objects.

In some embodiments, the particle filter algorithm relies on or utilizes a map that describes the environment where the device is localized. The map is defined as a grid map, where each cell represents (for example) a 0.1×0.1 square meter of real-world environment; other suitable dimensions may be used.

In a demonstrative implementation, cells of the map may have the following values: (a) value of "0" indicates that the cell is a valid location where the device can be located; (b) value of "N" indicates that the cell is a non-valid location for this device; (c) value in the range of 1 to (N−1), indicates that the cell is occupied by a landmark with a specific identification code value. In some embodiments, N is a pre-defined positive integer, or a pre-defined positive number.

Figure 3B:
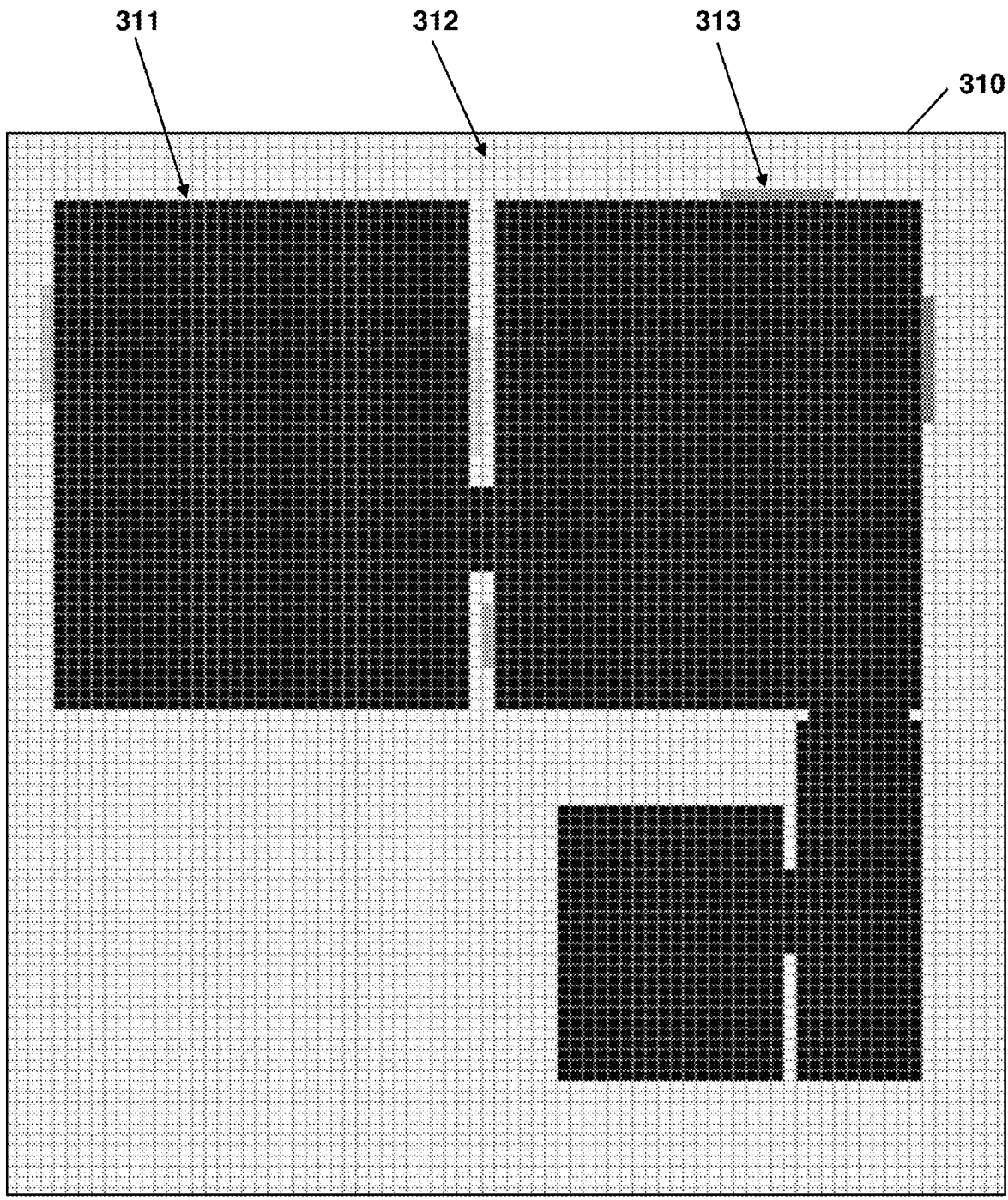
FIG. 3B is a schematic illustration of a map, generated and utilized in accordance with some demonstrative embodiments of the present invention.

Reference is made to FIG. 3B, which is a schematic illustration of a map 310, generated and utilized in accordance with some demonstrative embodiments of the present invention. For example, valid locations 311 are colored with black; white locations 312 indicate non-valid locations; grayscale locations 313 correspond to the different identification code for each landmark. Other coding schemes or coloring schemes may be used, and other types of representations may be used; such as, for example, a lookup table, a grid, a database, a matrix or array of values, or the like.

For generation of particles, the algorithm uses a total of M particles. The number of particles depends on the Degrees of Freedom (DOF) required for localization, the size of the map, and the number of landmarks available. In this stage, all particles are randomly generated with the same probability score, assuring that their position is within the map area and flagged as a valid map location. At this point, the position of the device is still unknown, and the particles represent a uniform probability distribution.

For prediction of particles positions, for each new frame at t+1, particles are moved according to the motion of the device (e.g., rotation and displacement), between the time-point t and the time-point t+1.

Figure 3C:
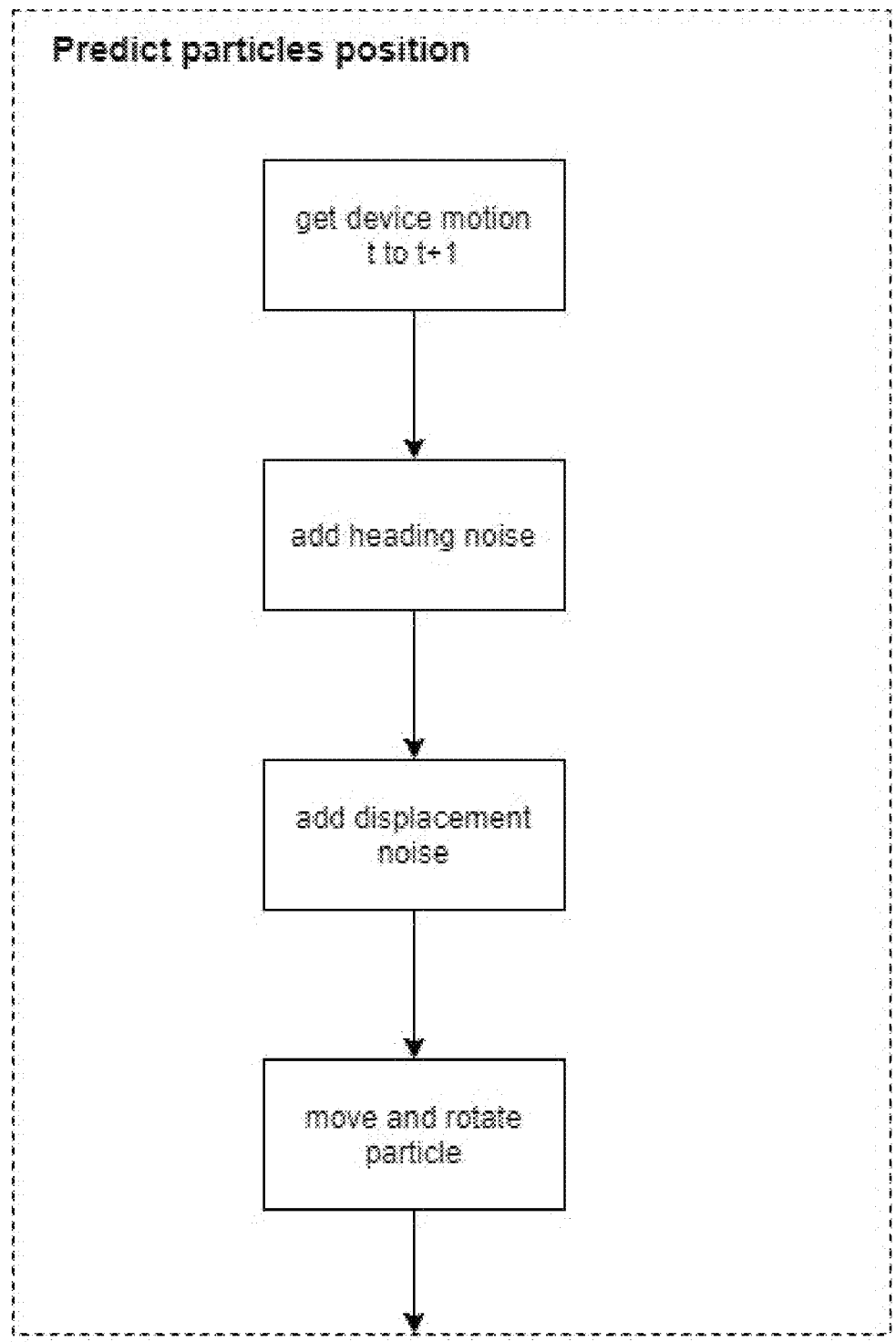
FIG. 3C is a flow-chart of a method of predicting particles positions, in accordance with some demonstrative embodiments of the present invention.

Reference is made to FIG. 3C, which is a flow-chart of a method of predicting particles positions, in accordance with some demonstrative embodiments of the present invention. Optionally, Gaussian noise is added to the particles, to account for the motion uncertainty and increase entropy among particles and robustness against convergence to local maxima.

Figure 3D:
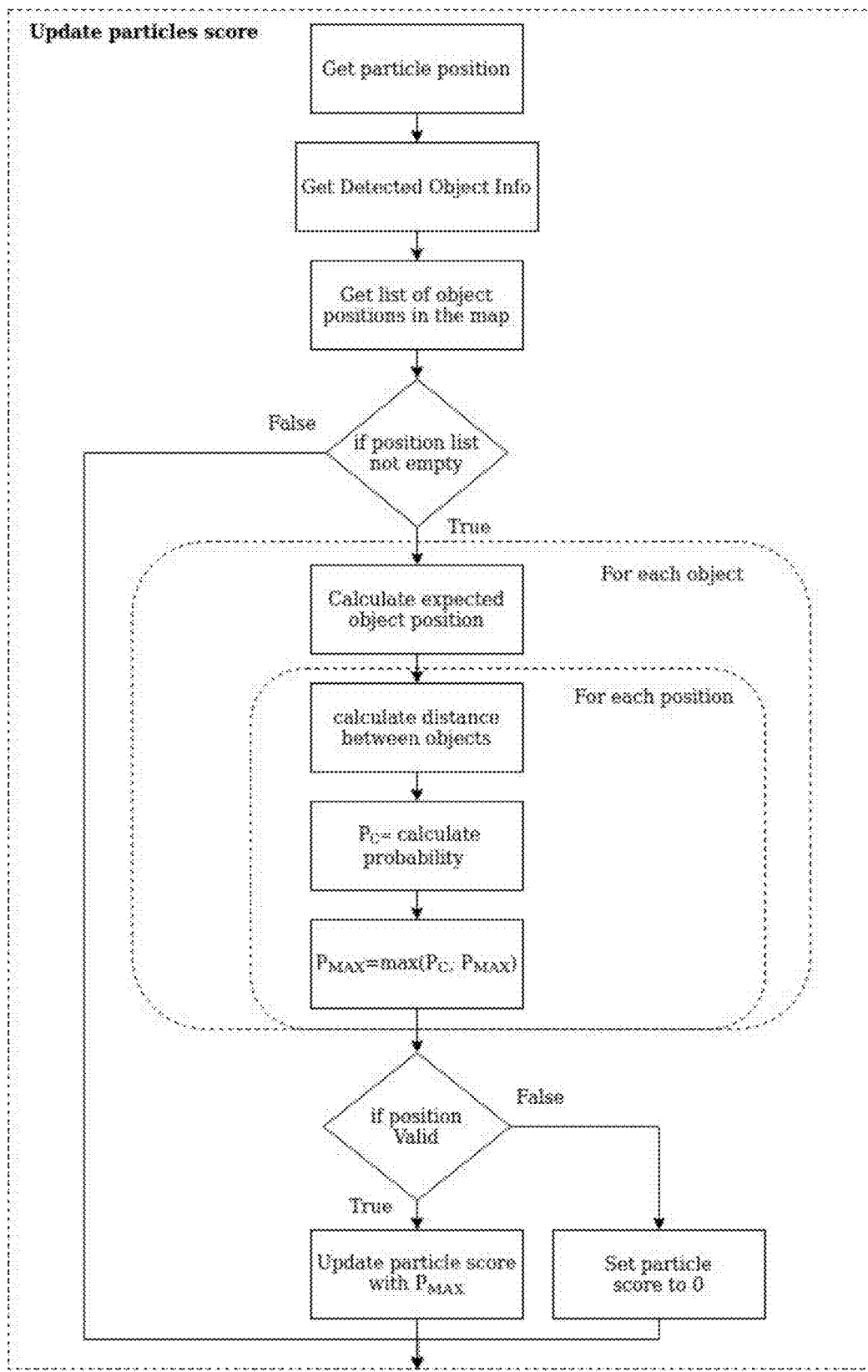
FIG. 3D is a flow-chart of a method of updating particles scores, in accordance with some demonstrative embodiments of the present invention.

Reference is made to FIG. 3D, which is a flow-chart of a method of updating particles scores, in accordance with some demonstrative embodiments of the present invention. The scores of the particles are updated to reflect the current probability of the particle to represent the right device location in the map by using the measurement sensors of the device.

For each sensor's detected object, the particle's expected object position is calculated and compared against all of the object's positions in the map. Based on the distance between the expected object position and real map position, a probability value is calculated. As an object can appear in multiples position in the map, the probability is calculated for each position; and the maximum obtained probability value is used. Finally, the particle score is updated with the probability value if the position of the particle is found to be valid, otherwise the particle score is set to 0.

The expected object position is calculated by the object detection information and the particle position. Objects near the particle position will be used to calculate their score; and if there are none, their score will be set to Pmin. The score is based on the probability density function of the normal distribution.

Figure 3E:
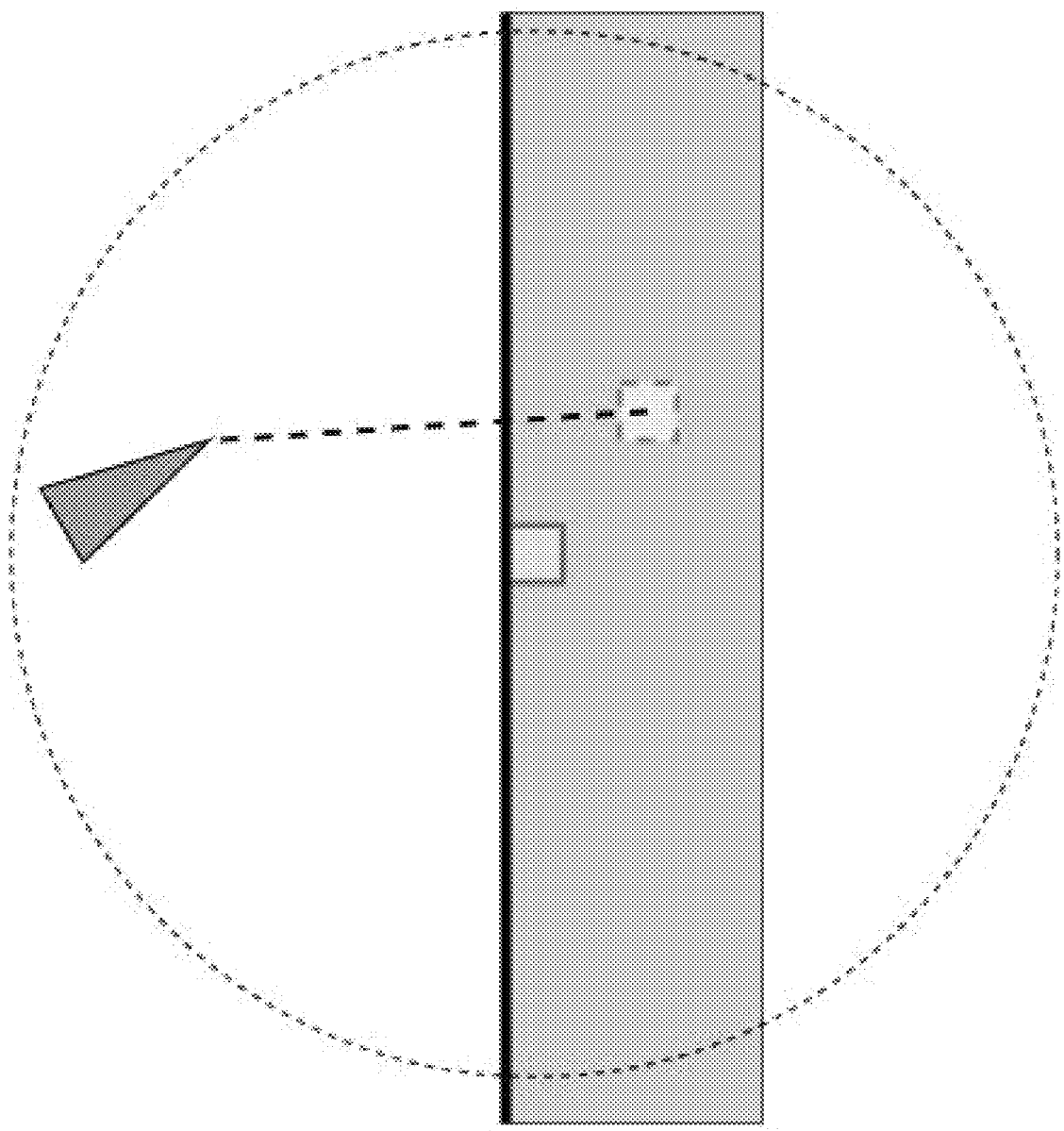
FIG. 3E is an illustration demonstrating particle positioning and object validation, in accordance with some demonstrative embodiments of the present invention.

Reference is made to FIG. 3E, which is an illustration demonstrating particle positioning and object validation, in accordance with some demonstrative embodiments of the present invention. For example, the particle is represented by the triangle; the expected object position in the upper-right square; and the map object position in the lower-left square. Accordingly, the object is located in a non-valid position.

Figure 3F:
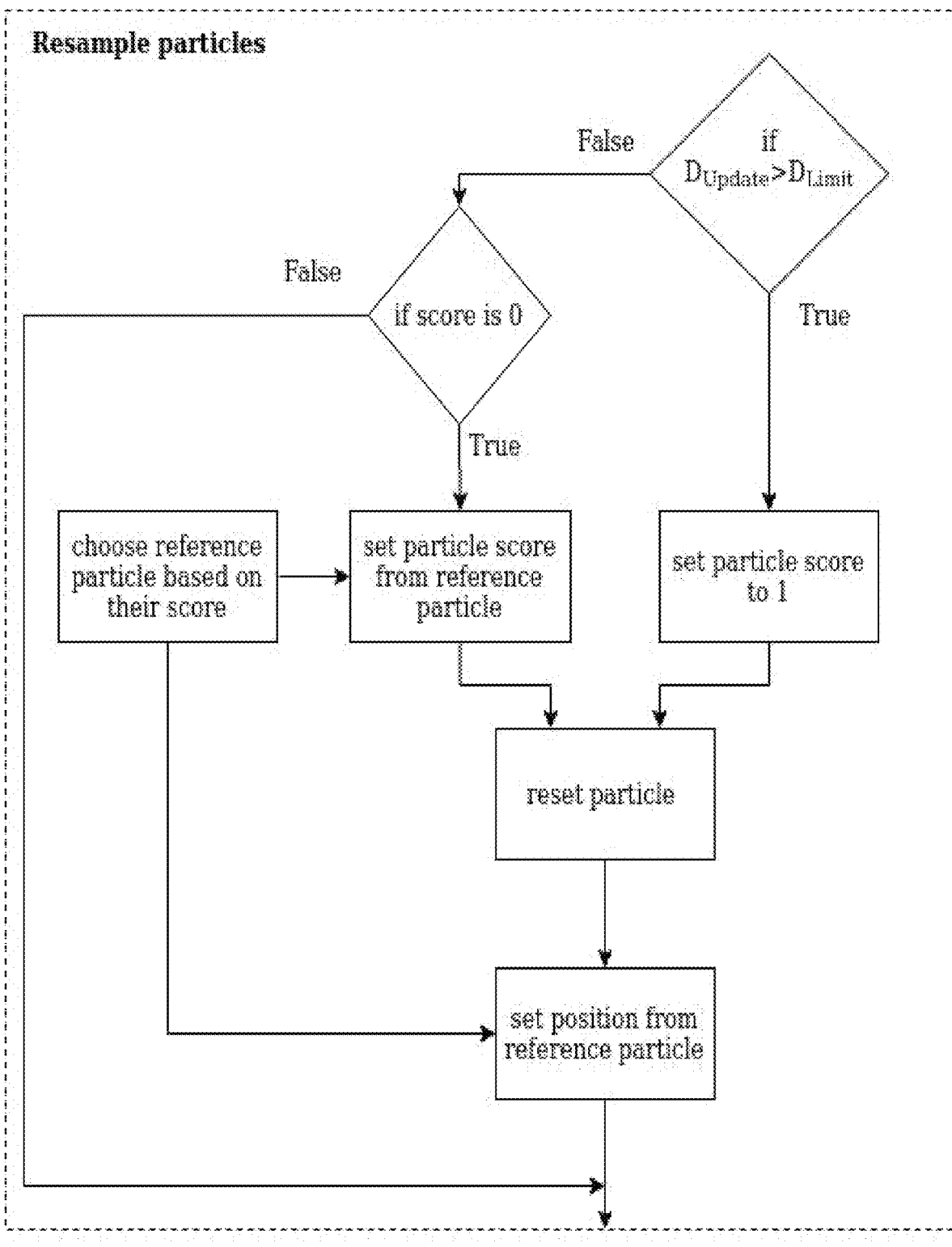
FIG. 3F is a flow-chart of a method of particles resampling, in accordance with some demonstrative embodiments of the present invention.

Reference is made to FIG. 3F, which is a flow-chart of a method of particles resampling, in accordance with some demonstrative embodiments of the present invention. During the resampling stage, the particles are re-located based on their probability score; for example, more particles are located on higher probability areas, and less particles are located on the low probability areas.

In some embodiments, a full resampling of all the particles is only undertaken after the device has moved a certain minimum distance; otherwise, only the particles with "0" scores are relocated. Particles with "0" score are randomly relocated on the area of other reference particles, based on their probability score; these particles get the score from the reference particles.

In the case of a full resampling, all particles are randomly relocated based on their probability, and all the scores are set to "1"; therefore, areas with high scores will be populated with more particles, and areas with low probability will contain less particles.

Some of the features that were discussed above, and/or other features of the present invention, are further demonstrated in the accompanying drawings.

Figure 20A:
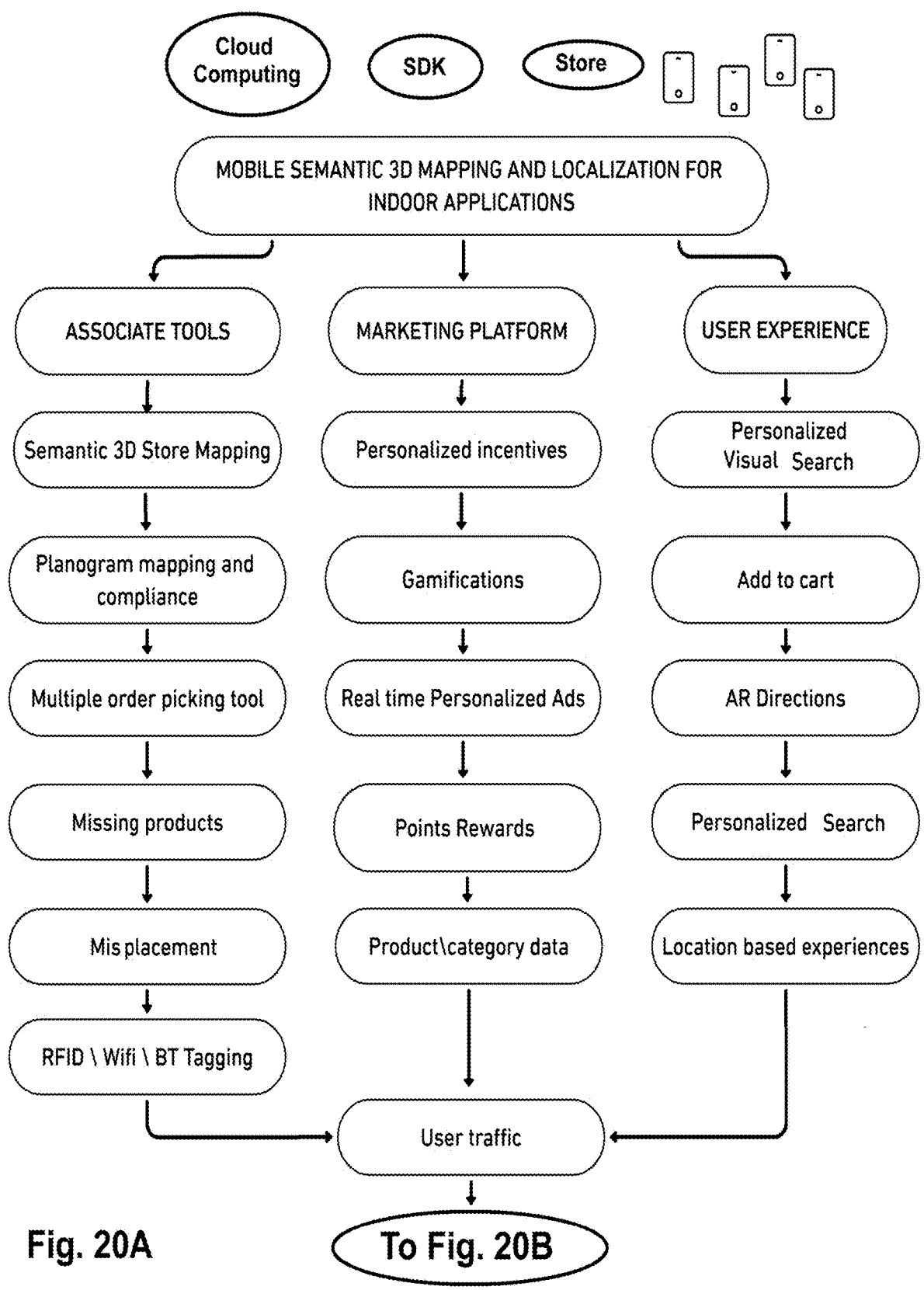
FIGS. 20A and 20B are two parts of a flow-chart of a process of providing and utilizing a set of mobile indoor tools or applications, in accordance with some demonstrative embodiments of the present invention.
Figure 20B:
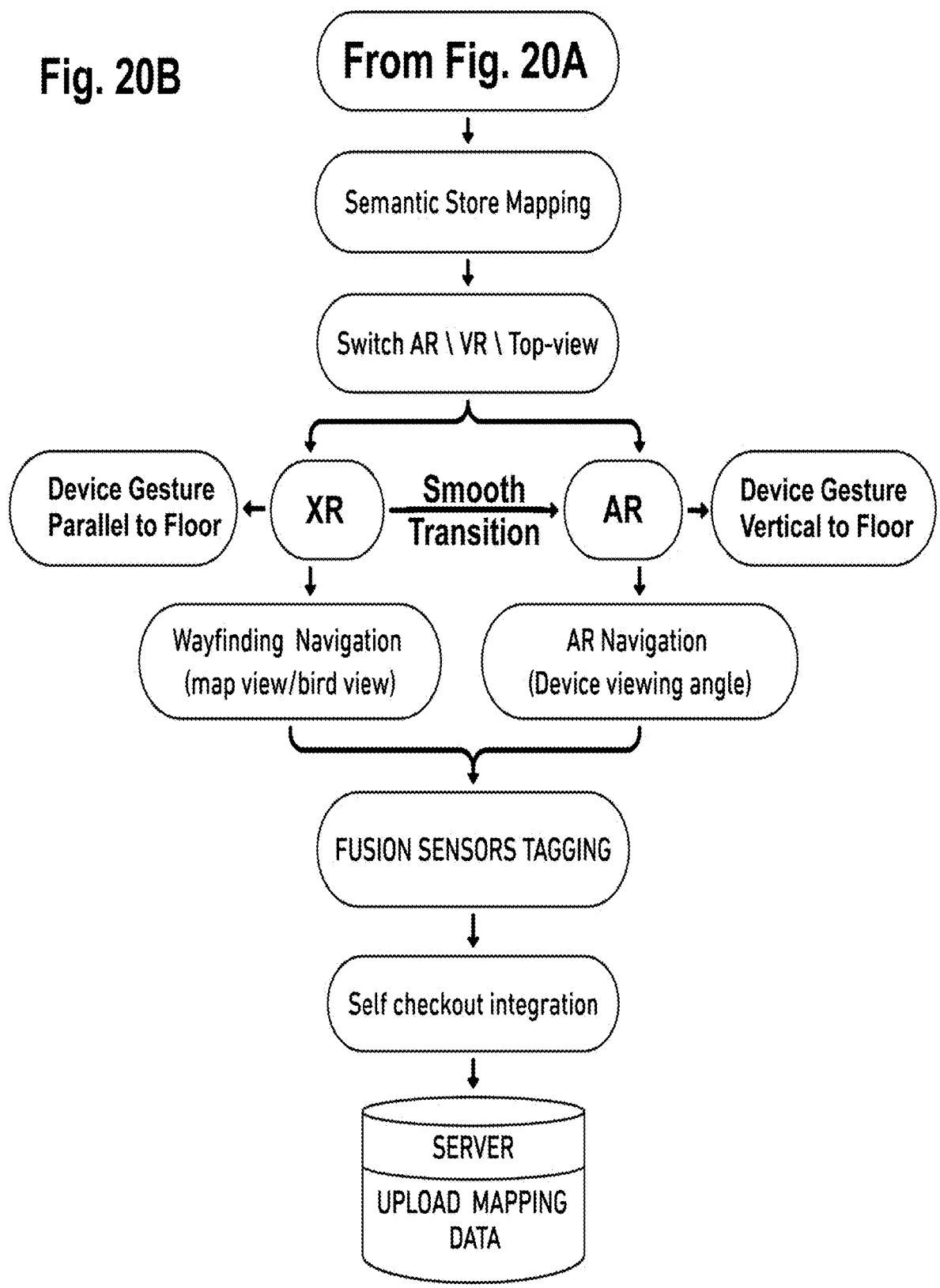

Reference is made to FIGS. 20A and 20B, which are two parts of a flow-chart of a process of providing and utilizing a set of mobile indoor tools or applications, in accordance with some demonstrative embodiments of the present invention. For example, a plurality of end-user devices may be utilized by end-users (e.g., store customers or visitors or guests; store associates or employees or team-members), cooperating with a central server and/or a remote server and/or a cloud-based server to provide mobile semantic 3D mapping and localization for indoor applications. The process may provide Associate Tools that are used by store associates, for example, for semantic 3D store mapping, for planogram mapping and planogram creation and updating, for detecting planogram compliance or non-compliance, a multiple order picking tool, a tool or unit for detecting missing products and/or mis-placed products, a unit or module to handle RFID/Bluetooth/Wi-Fi based tagging, or the like. Marketing Platform tools may be included, for example, to provide personalized incentives to customers that participate in the crowd-sourcing efforts, to provide gamification elements, to enable real-time bidding of advertisers for placement of user-specific or user-tailored AR/VR on-screen location-based and contextual advertisement content, a points or other rewards management tool, a product/category data module that creates and updates such data, or the like. User Experience tools or modules may enable a personalized visual search for products or items, may facilitate an add-to-cart process, may generate and provide on-screen AR-based navigation directions to a product, personalized search tools, and other location-based experiences which may be user-tailored. All these tools may operate in conjunction with a traffic of end-user devices that move throughout the store, held and operated by a plurality of users. The user traffic data, and the data captured and/or derived from end-user devices who roam the store, is analyzed to generate semantic store mapping; and the user may switch from an AR-based view to a VR-view or to a Top-View of the store, with a smooth transition between AR-based content and Extended Reality or Expanded Reality (XR) content (for example, upon transition from the device being vertical in XR mode, to the device being horizontal in AR mode). AR-based navigation may be provided to the end-user in AR mode; or, wayfinding navigation (map view, bird's eye view) may be provided to the end-user in XR mode. Optionally, tagging of users may be performed based on fusion of data from multiple sensors. Optionally, the process may further integrate or include a self-checkout process. Data gathered and derive is shared with, or transported or uploaded to, a central server which may be located in the store or may be remote or may be cloud-based.

Figure 21A:
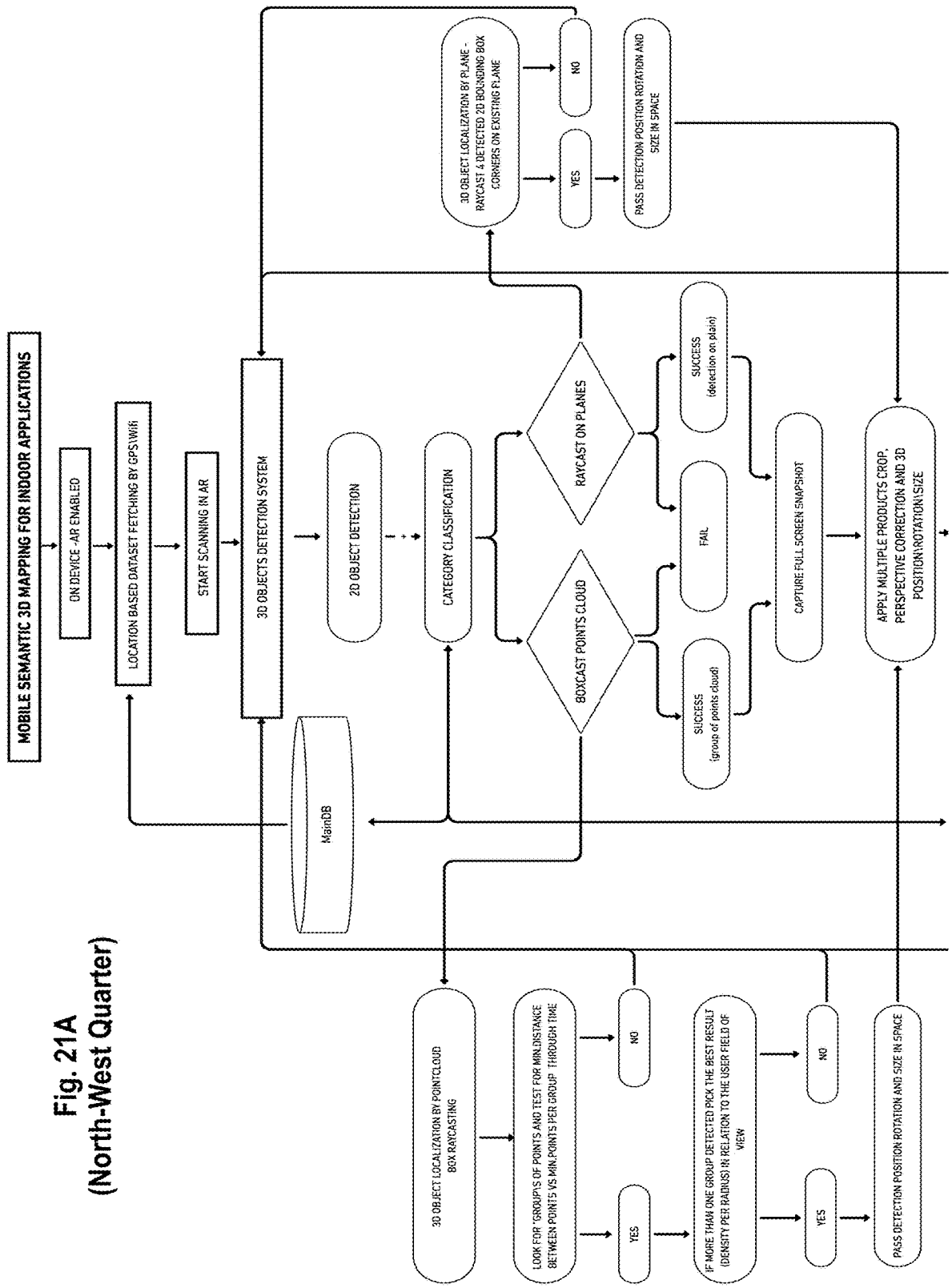
FIGS. 21A-21D are four parts of a flow-chart of a process of multiple object detection, classification, and 3D mapping, in accordance with some demonstrative embodiments of the present invention.
Figure 21B:
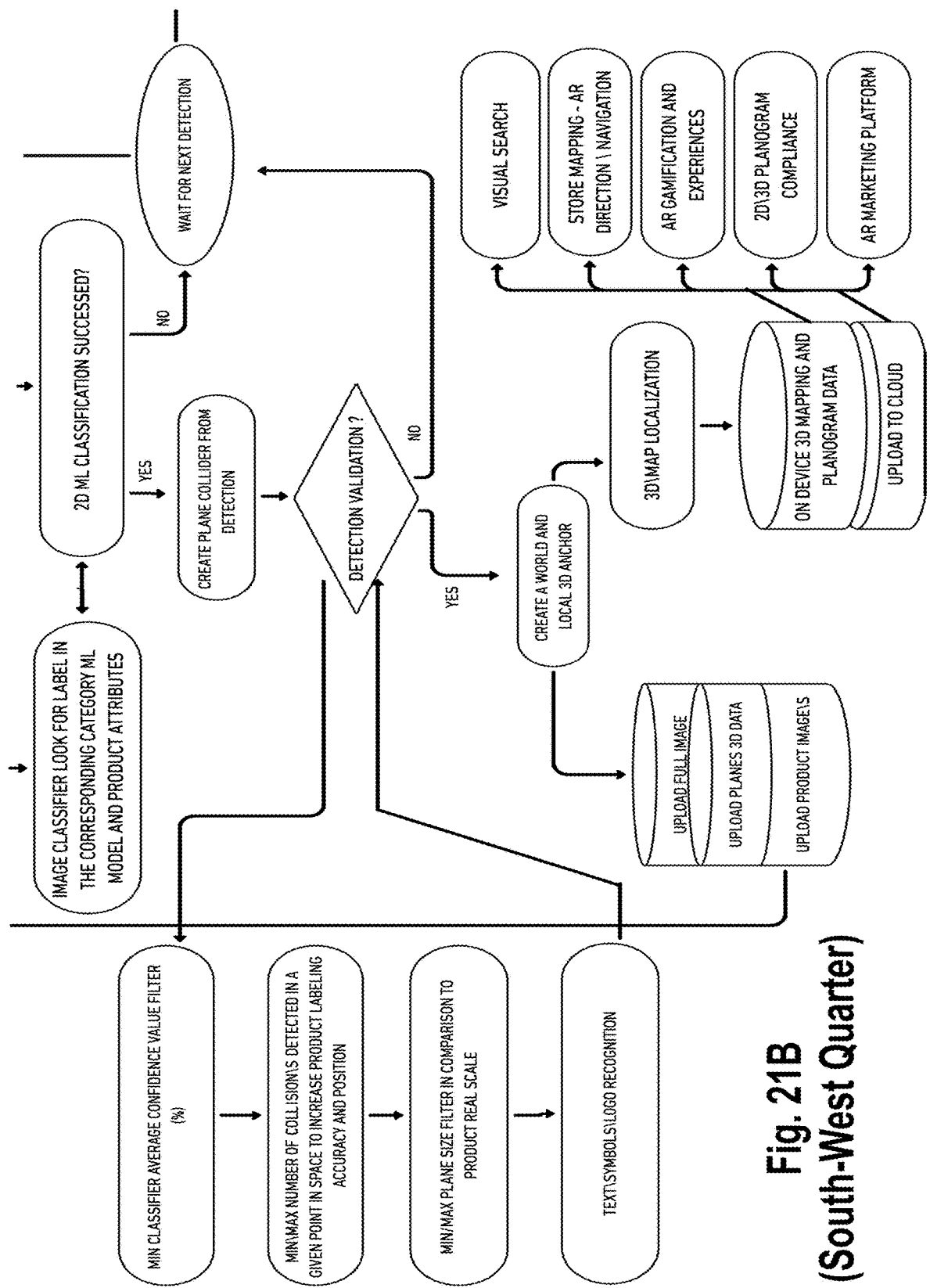
Figure 21C:
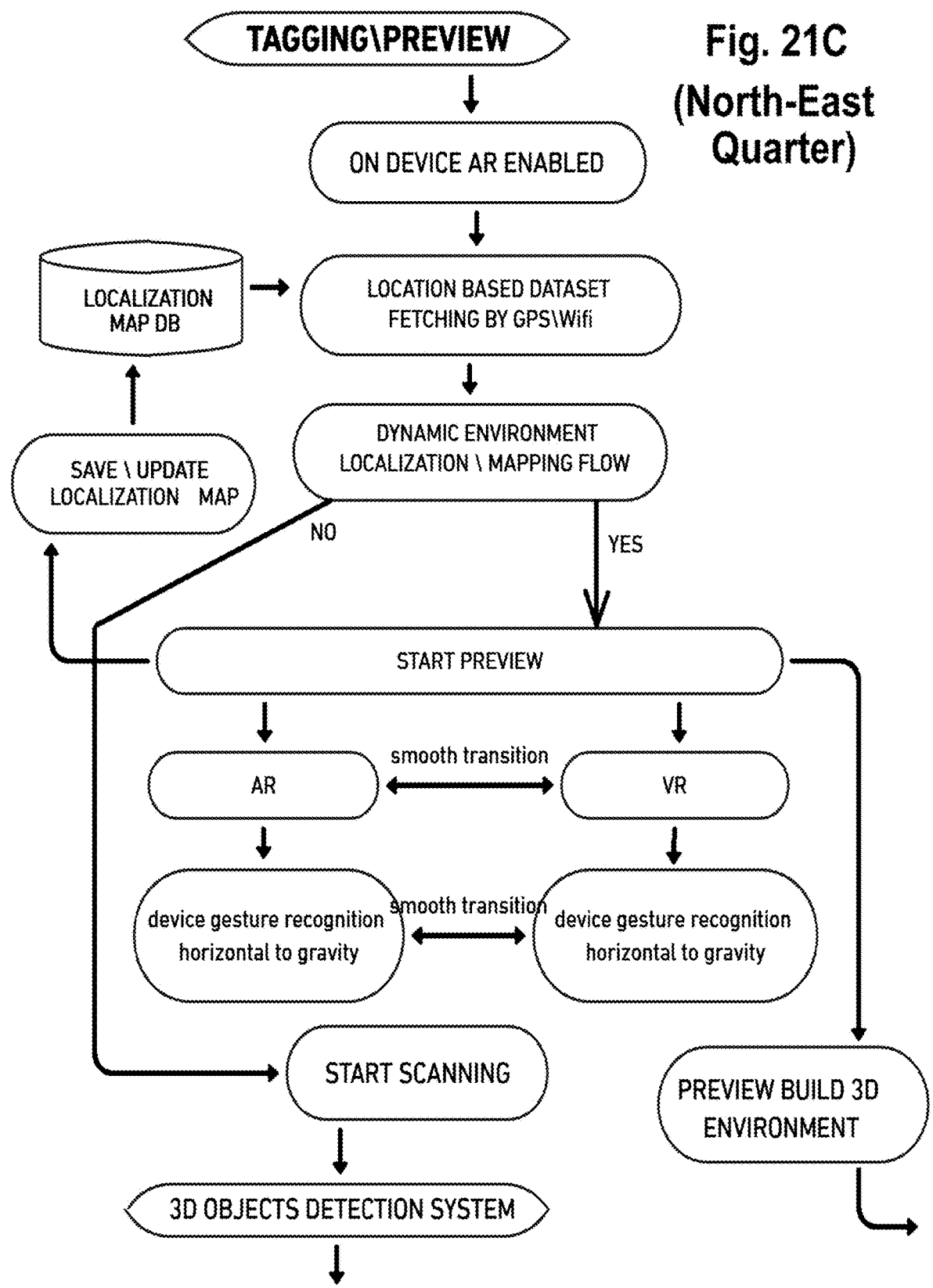
Figure 21D:
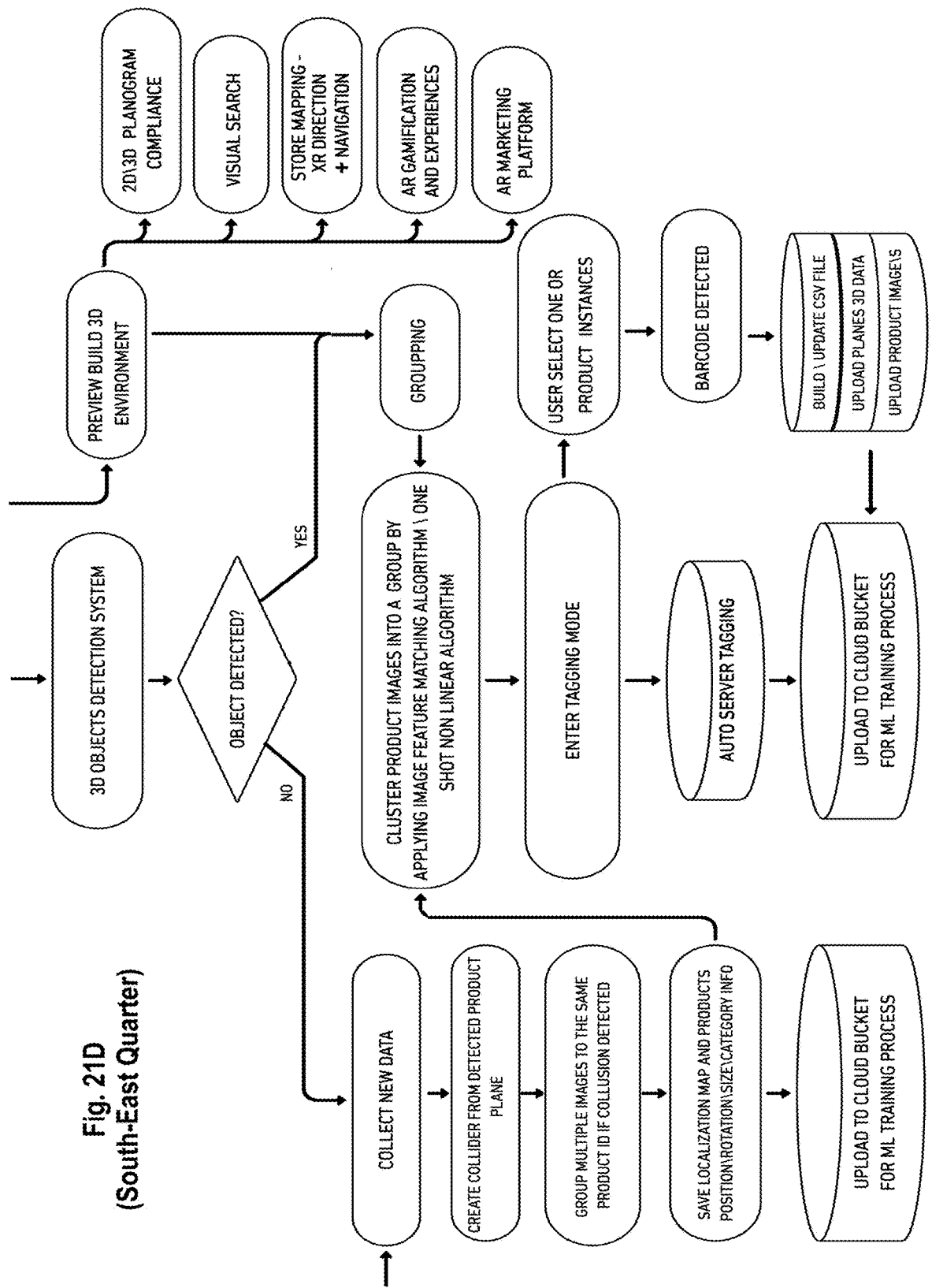

Reference is made to FIGS. 21A-21D, which are four parts of a flow-chart of a process of multiple object detection, classification, and 3D mapping, in accordance with some demonstrative embodiments of the present invention. For example, FIG. 21A is a north-west quarter or portion of the flow-chart; FIG. 21B is a south-west quarter or portion of the flow-chart; FIG. 21C is a north-east quarter or portion of the flow-chart; and FIG. 21D is a south-east quarter or portion of the flow-chart.

As indicated in FIG. 21A, the process may provide mobile semantic 3D mapping for indoor tools or applications. A plurality of end-user devices is utilized, and such devices are AR-enabled. Location-based dataset is fetched or obtained or downloaded, based on GPS localization and/or Wi-Fi localization and/or Bluetooth localization and/or Cellular-based localization and/or based on other localization methods. Scanning in AR-enabled device is performed, and a 3D object detection system is invoked, as well as a 2D object detection system. Classification into categories is performed, followed by attempts to ray-cast on planes and/or to box-cast points cloud. Upon successful casting, a full screen snapshot may be captured; and multiple processes may be applied, such as, product image cropping or cutting, perspective correction, 3D positioning, rotating, re-sizing, pattern detection, text recognition, Optical Character Recognition (OCR) and OCR-based analysis, image comparison (e.g., isolating a logo or a slogan that is shown on a box of cereal, and comparing it to a set of logos or slogans of various products as pre-defined in a database of products), or the like.

For ray-casting, 3D object localization is performed based on plane(s), with ray-casting for detected 2D bounded box corners on an existing plane. Upon success, the method may pass detection position rotation and size in space.

For box-casting, 3D object localization is performed based on a cloud of points, or point-cloud box ray-casting. For example, the process looks for one or more groups of points, and tests for minimum distance between points versus minimum points per group, over time. If more than one group is detected, then the process selects the best result (e.g., based on density-per-radius) in relation to the user's field-of-view; and then, it passes the detection position rotation and size in space.

As indicated in FIG. 21B, the 2D classification is performed, optionally using Machine Learning (ML) algorithms of computer vision; and optionally taking into account also labels, as an image classifier looks for a label in the corresponding category ML model and product attributes. If the 2D (e.g., ML-based) object detection is successful, a plane collider is created from the detection data, and detection validation is performed, based on one or more conditions or rules, such as: (a) minimum classifier average confidence value filter; (b) minimum/maximum number of collisions that are detected in a given point in space to increase product labeling accuracy and position; (c) minimum/maximum plane size filter, in comparison to product real scale; (d) recognition of text, logo, slogan, brand name, brand image, product name, product symbol, manufacturer name or symbol, or other text or item which may be recognized and may be used for validation.

Upon successful validation, the process creates a real-world anchor and a local 3D anchor; and the full image is uploaded to the central server, as well as planes 3D data and product image(s) captured by the end-user device. Additionally, 3D/map localization is performed, to enable one or more modalities or tools, such as: visual search; store mapping; AR-based directions and navigation; AR-based gamification; AR-based user experience challenges or tasks or games; AR-based user tools; tools that check and/or enforce 2D/3D planogram compliance; and AR-based or VR-based marketing and advertising. On-device 3D mapping and planogram data is stored, and is also uploaded to the central server.

As indicated in FIG. 21C, tagging and preview may be performed, using on-device AR-enabled tools. Location based dataset is fetched or downloaded, based on localization data as mentioned above. If dynamic environment localization/mapping is enabled, then AR or VR content is shown on the user's screen, taking into account the position of holding the device relative to the ground. The device is used for scanning and imaging its field-of-view, with 3D object detection being invoked.

Figure 22A:
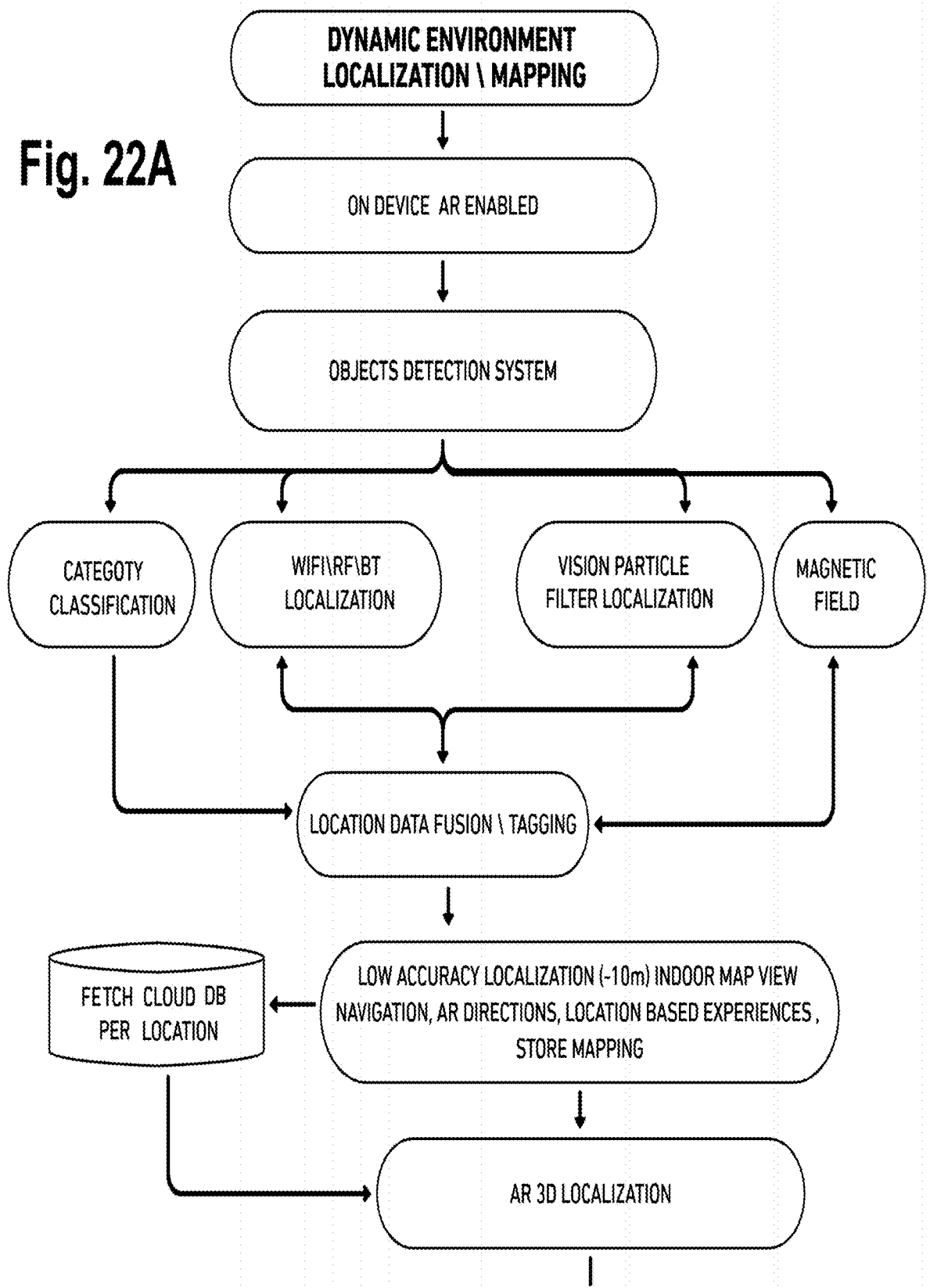
FIGS. 22A-22B are two parts of a flow-chart of a process of dynamic environment localization and mapping, in accordance with some demonstrative embodiments of the present invention.
Figure 22B:
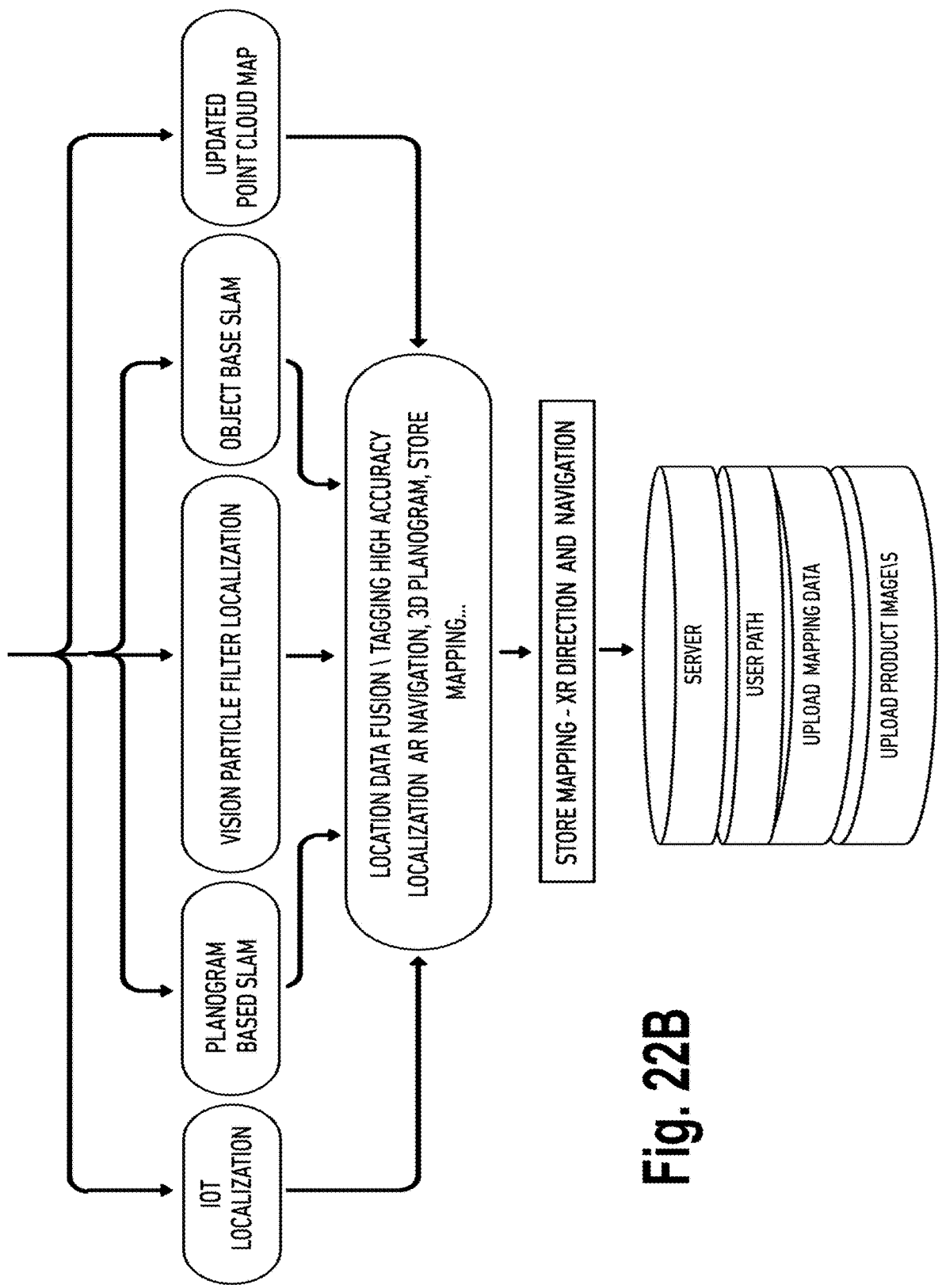

Reference is made to FIGS. 22A-22B, which are two parts of a flow-chart of a process of dynamic environment localization and mapping, in accordance with some demonstrative embodiments of the present invention. Devices are AR-enabled, and an objects detection system is invoked. Localization is performed based on fusion of data from multiple sources: Wi-Fi localization, Cellular localization, Bluetooth localization, vision particle filter localization, magnetic field based localization, localization that takes into account category classification and/or computer vision analysis results or insights, GPS data, real-time depth maps, depth, data (e.g., based on LIDAR scanner or sensor, structure light, stereo camera or mono odometry (fusion sensors), plane detection, shades and shading analysis, or other data which may be further segmented and anchored in space) and/or other sources which are fused together to enable low-accuracy (e.g., plus or minus 10 meters) location data determination and tagging. Indoor map navigation is generated and used, providing navigation and directions, AR-based content, location-based experiences and tools and content, as well as store mapping and real-time inventory mapping. AR-based 3D localization is performed, and a database per location is fetched or downloaded. For example, multiple processes may be used, such as IOT based localization, planogram based SLAM, object based SLAM, updated point cloud map, vision particle filter localization, and/or other parameters which may be fused for high accuracy or higher accuracy (e.g., plus or minus 10 or 50 centimeters), to further enable the above-mentioned modalities or functionalities. Databases are updated or augmented with the localization data, including store map, inventory map and real-time product inventory database, product images may be uploaded to the server, user travel path may be monitored and uploaded and stored (e.g., subject to the user's providing consent to such monitoring, uploading and storing; and/or by utilizing one or more mechanisms that maintain privacy and/or anonymity of users). Optionally, AR/VR/XR based navigation or directions are generated and provided to the user within the store.

It is noted that in some embodiments, optionally, detection of an object or a product may require a search in a limited-size network or database of data, such as, limited to 500 or 5,000 or 50,000 products or data-items (or other maximum limit of the number of products or data-items); and therefore, some embodiments may search, serially or in parallel or concurrently, in several such data-sets or data-bases or multiple classification networks, in order to increase the probability of finding an accurate match.

Figure 23A:
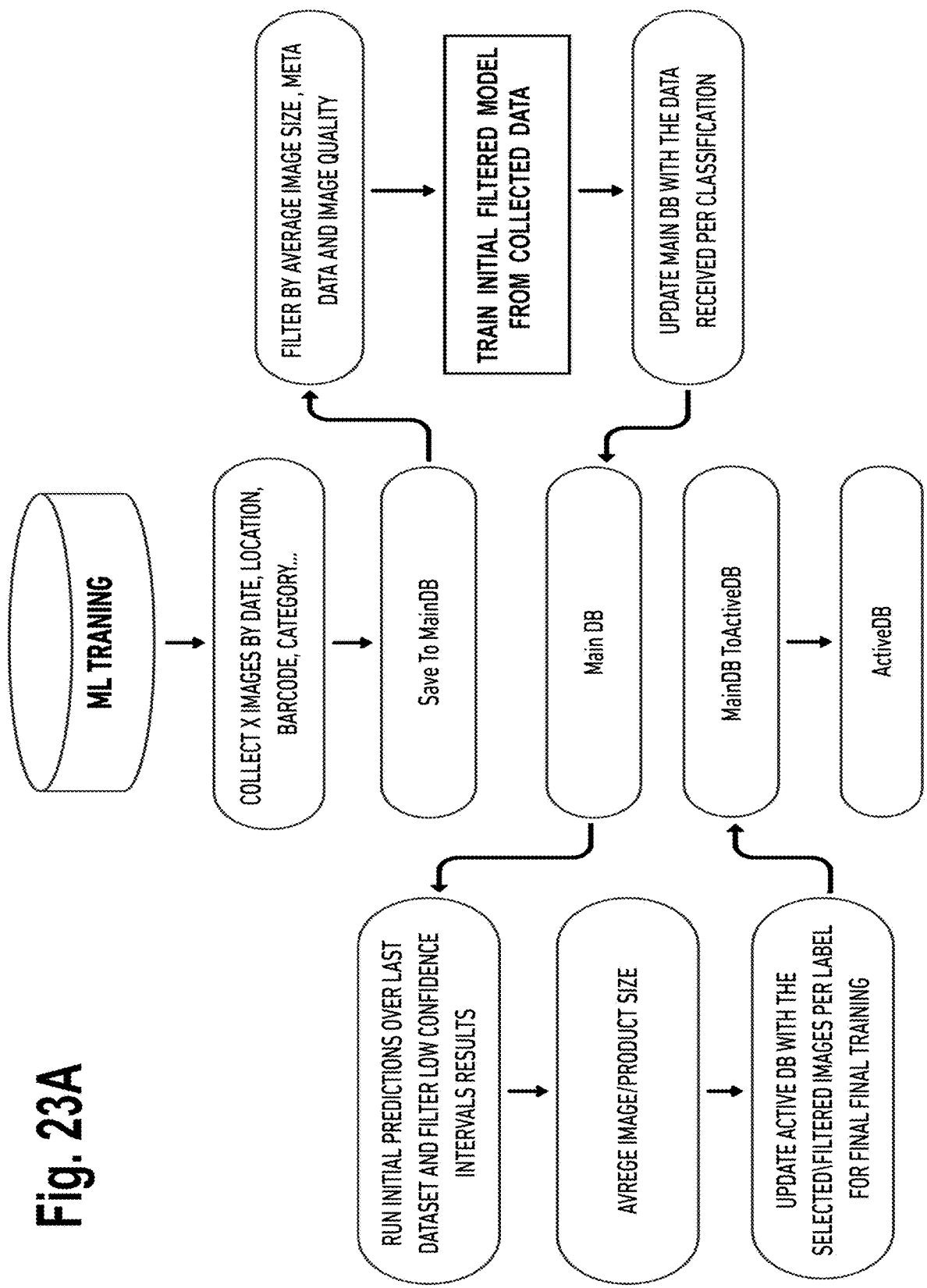
FIGS. 23A-23B are two parts of a flow-chart of a process of ML training and ML utilization, in accordance with some demonstrative embodiments of the present invention.
Figure 23B:
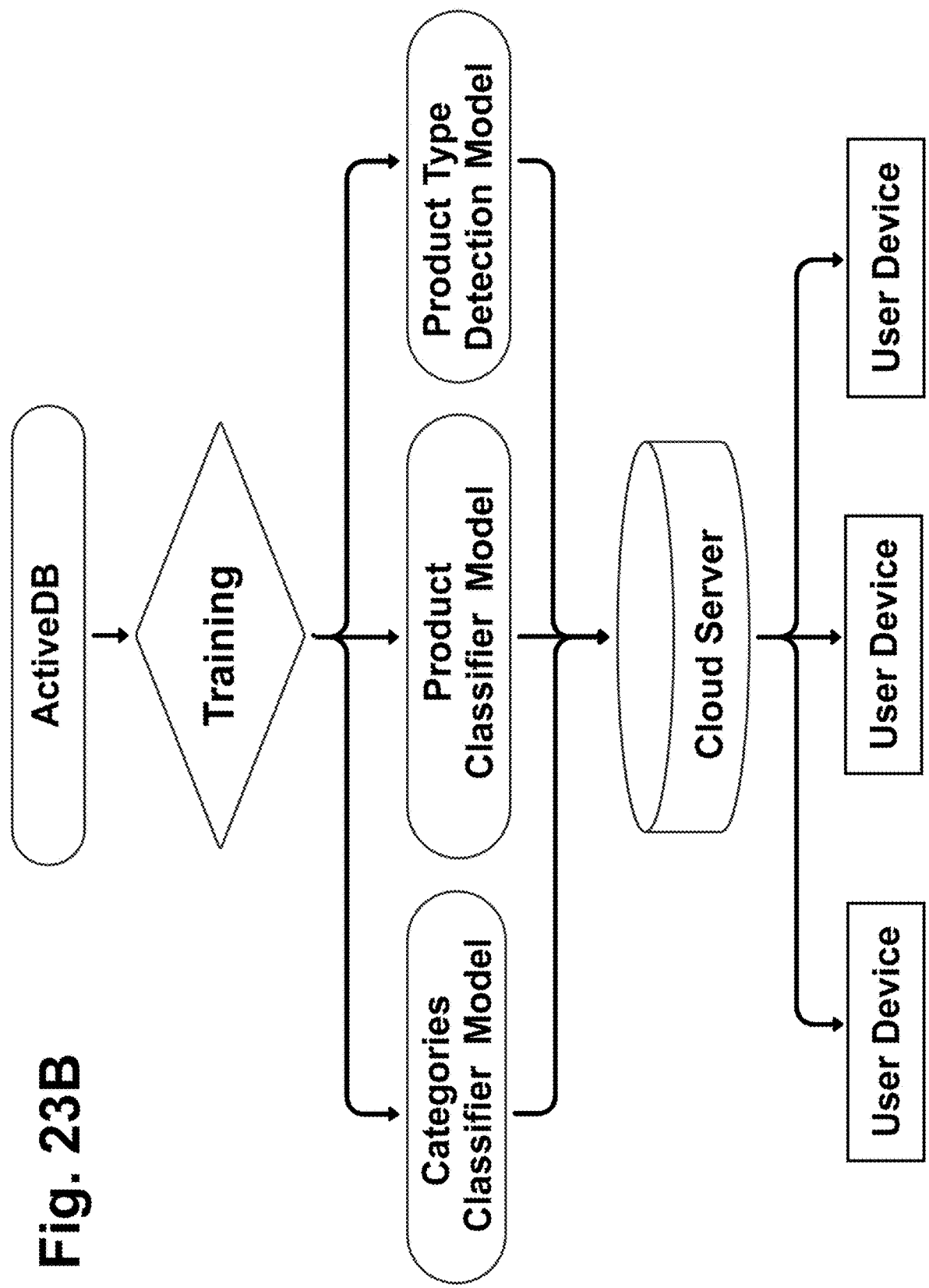

Reference is made to FIGS. 23A-23B, which are two parts of a flow-chart of a process of ML training and ML utilization, in accordance with some demonstrative embodiments of the present invention. For example, images captured by end-user devices are collected and gathered, and are categorized or classified based on location, date and time, depicted barcode, product category, and/or other parameters. The data is saved to a main database and/or to an active database. Data is filtered by average image size, image quality, meta-data, or other filtering conditions; and the main database is updated based on the data received per classification. Training of the initial filtered model is performed, based on collected data; and the main database is updated with the data received per classification. Additionally, the active database is updated, by running initial predictions over the last dataset and filtering low confidence interval results, with utilization of average image/product size, and with updating of the active database per label for the purpose of final ML training. The ML training is performed using categories classifier model, product classifier model, and product type detection model. Data is stored in a database or a server, and data portions are later shared with relevant end-user devices.

Figure 24A:
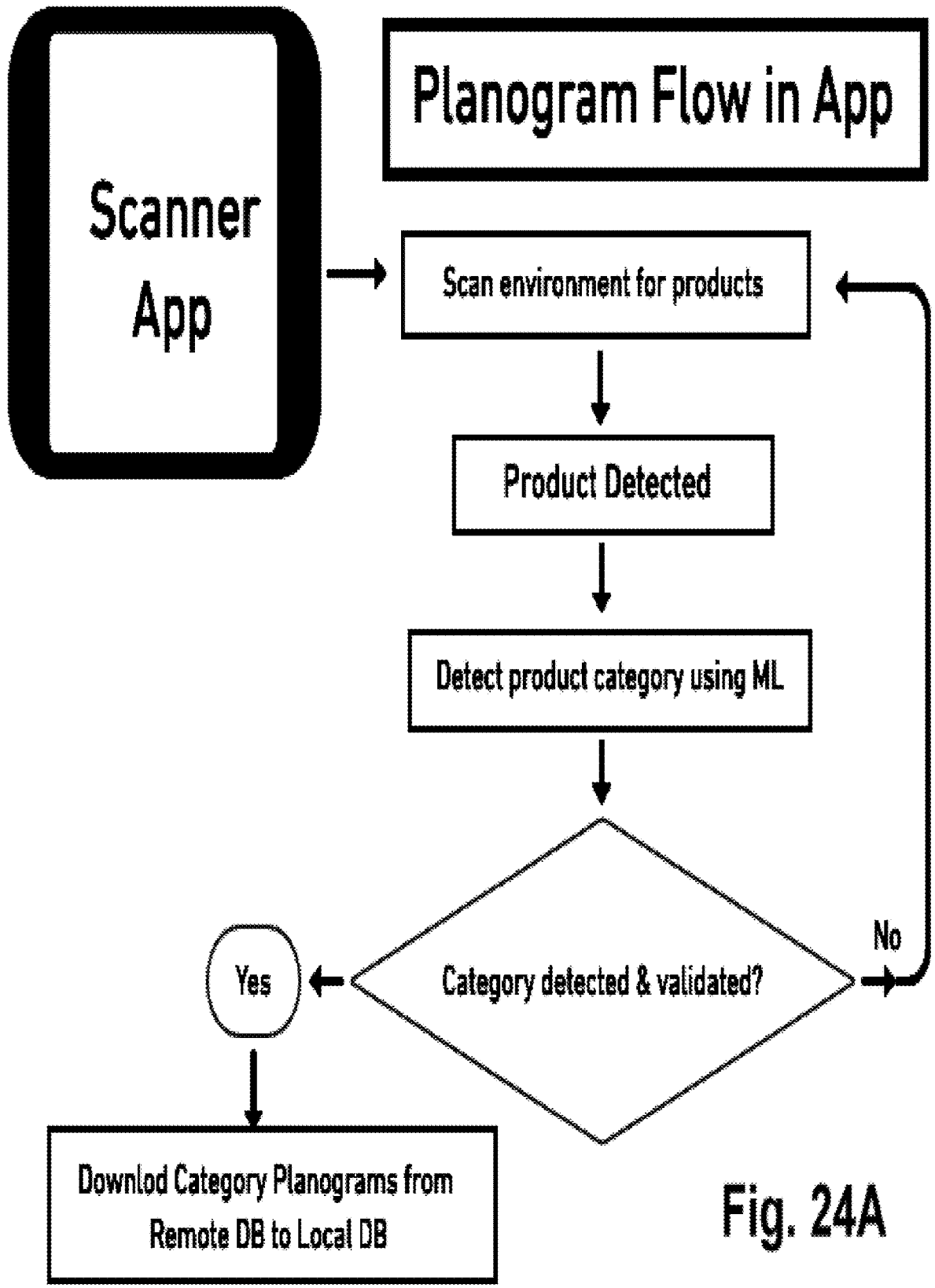

Reference is made to FIGS. 24A-24B, which are two parts of a flow-chart demonstrating planogram flow in an application, in accordance with some demonstrative embodiments of the present invention. A scanner application scans the environment for products; a product is detected or recognized; product category is determined based on ML; and a Category-specific Planogram is downloaded from a remote database to a local (on-device) database. Then, the environment is scanned for products, and products are recognized/detected and classified. If the planogram is recognized, then the planogram may be re-calculated and then updated at the server. Otherwise, a temporary planogram is calculated, and is encoded to a searchable string, and the database is queried to find if a planogram match exists, and a matching planogram (if exists) is selected for further updating.

Figure 25A:
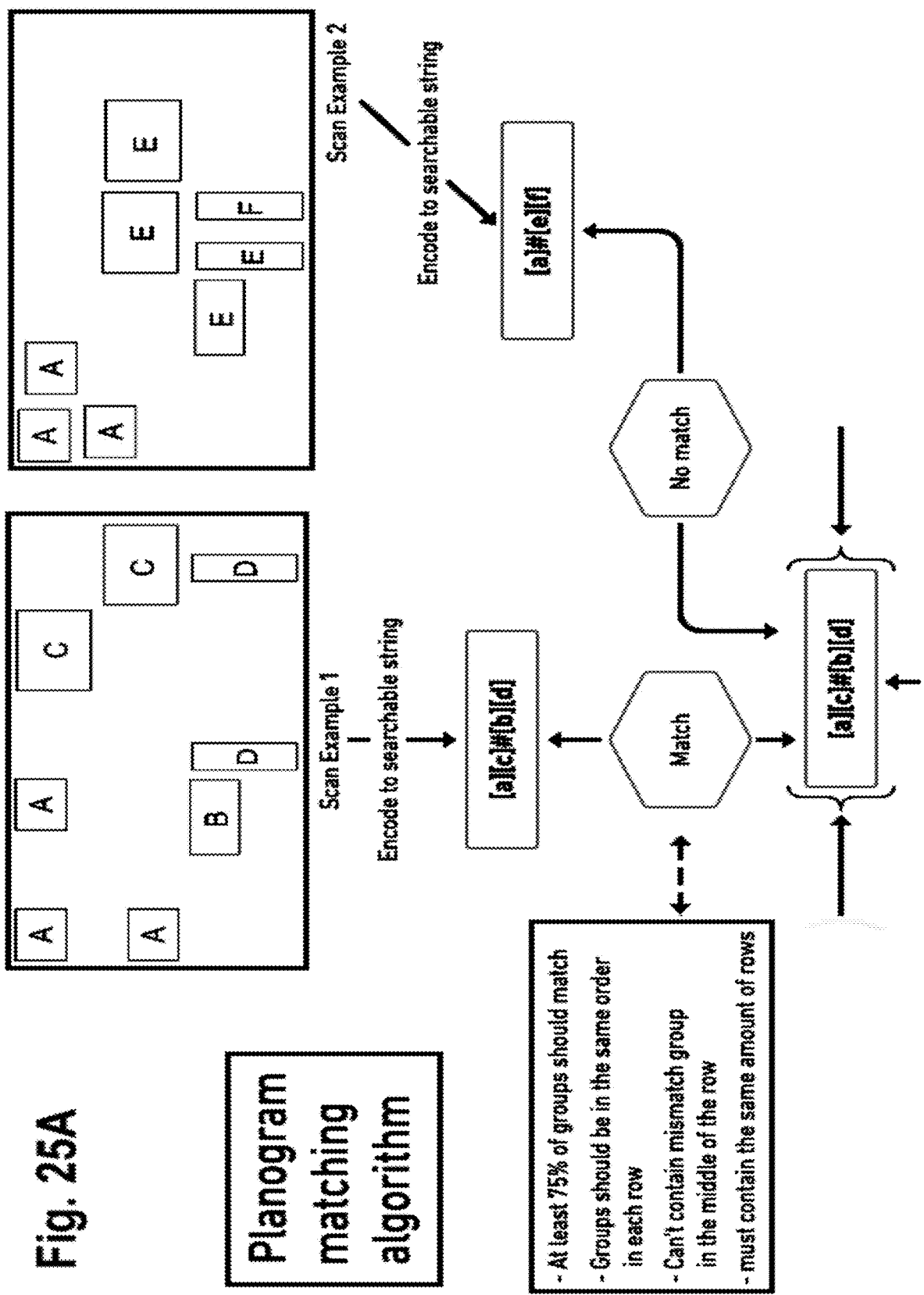
FIGS. 25A-25C are three parts of a flow-chart demonstrating planogram matching, in accordance with some demonstrative embodiments of the present invention.
Figure 25B:
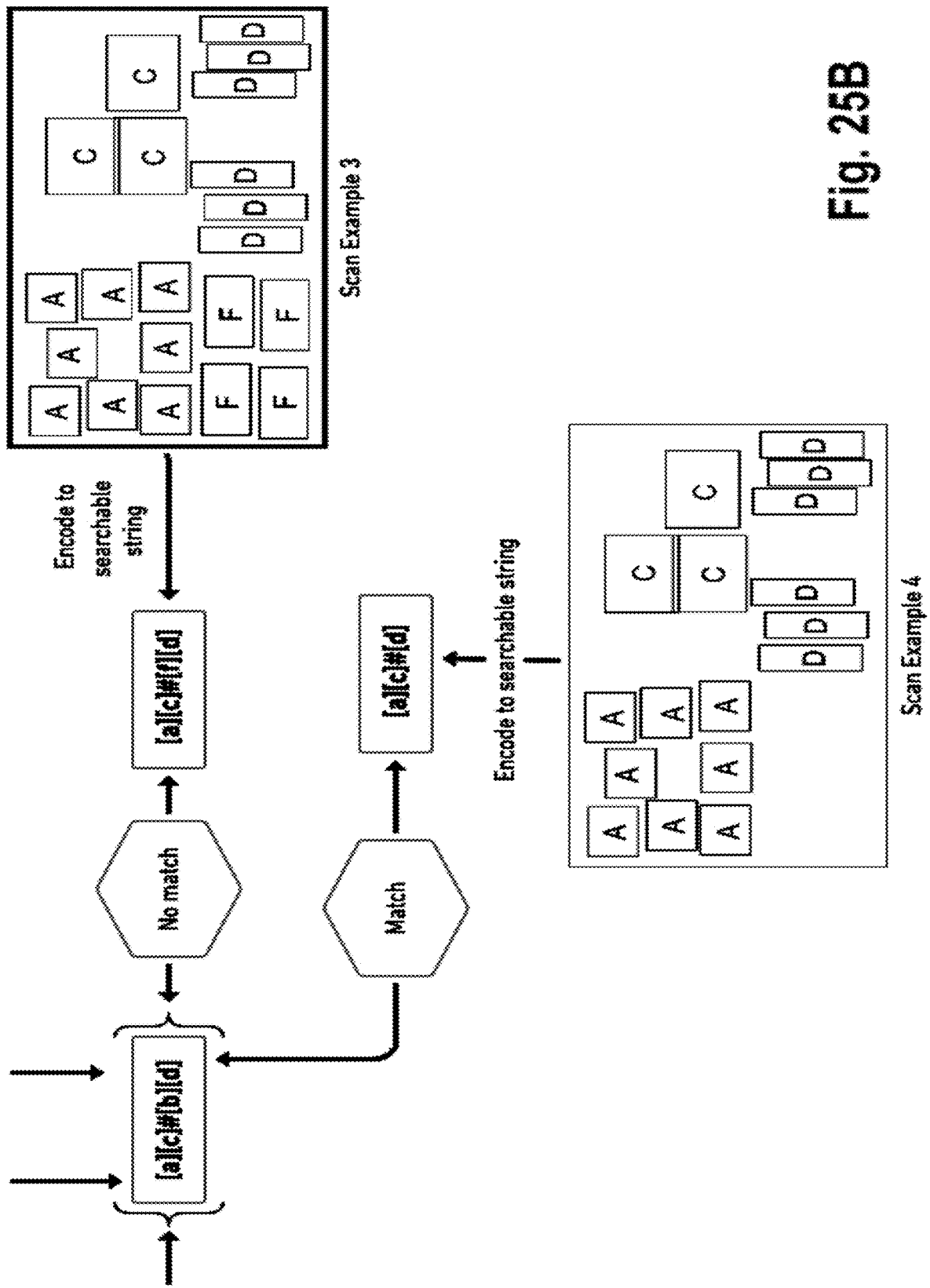
Figure 25C:
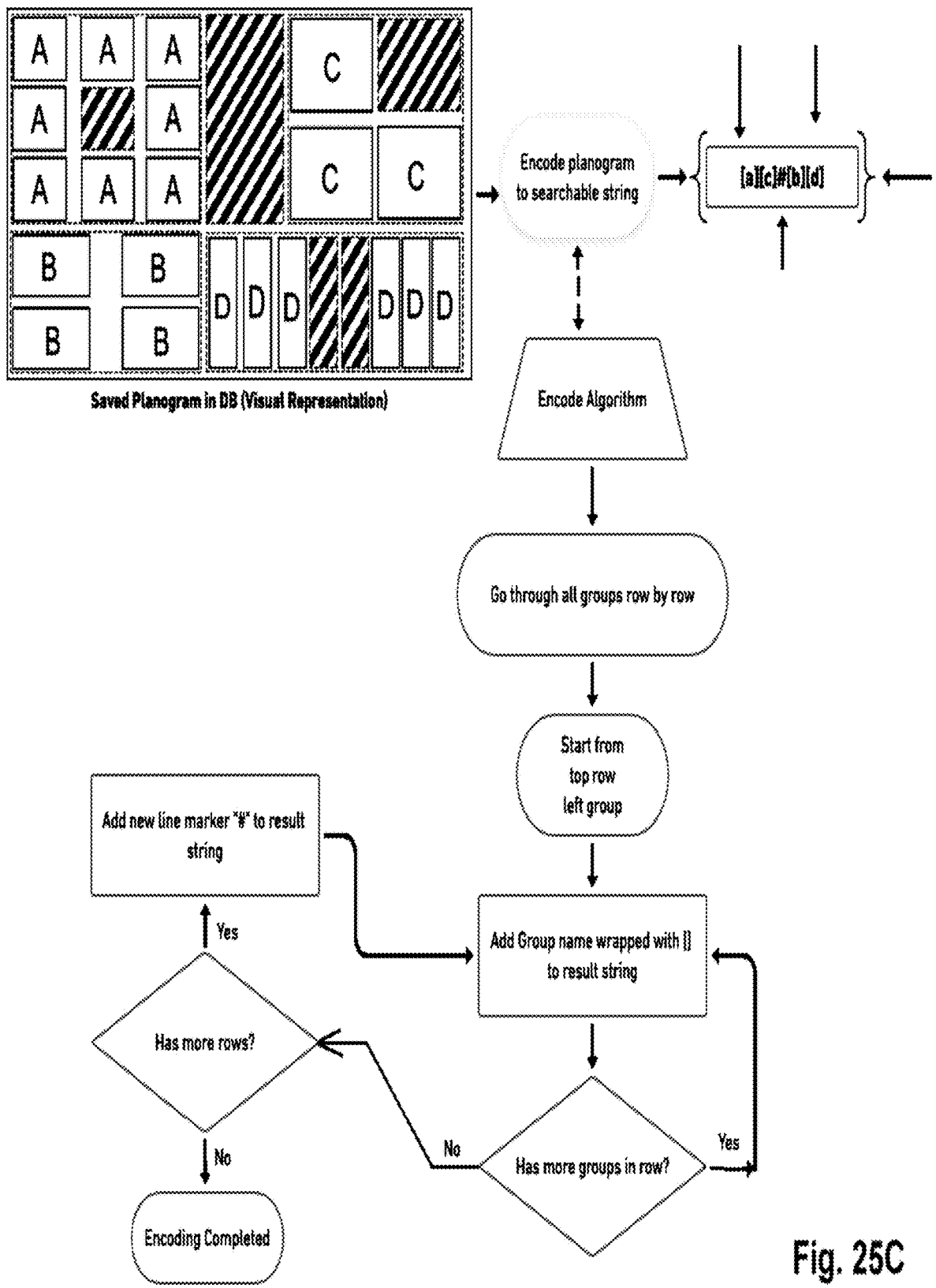

Reference is made to FIGS. 25A-25C, which are three parts of a flow-chart demonstrating real-time planogram matching, in accordance with some demonstrative embodiments of the present invention. For example, as shown in FIGS. 25A-25B demonstrate four different scans that are obtained; products are recognized or detected in each scan; and each scan is encoded to a searchable string. FIG. 25C demonstrates a matching module checks whether a scan matches a planogram, and a string encoding module that constructs the encoded string per scan.

Figure 26:
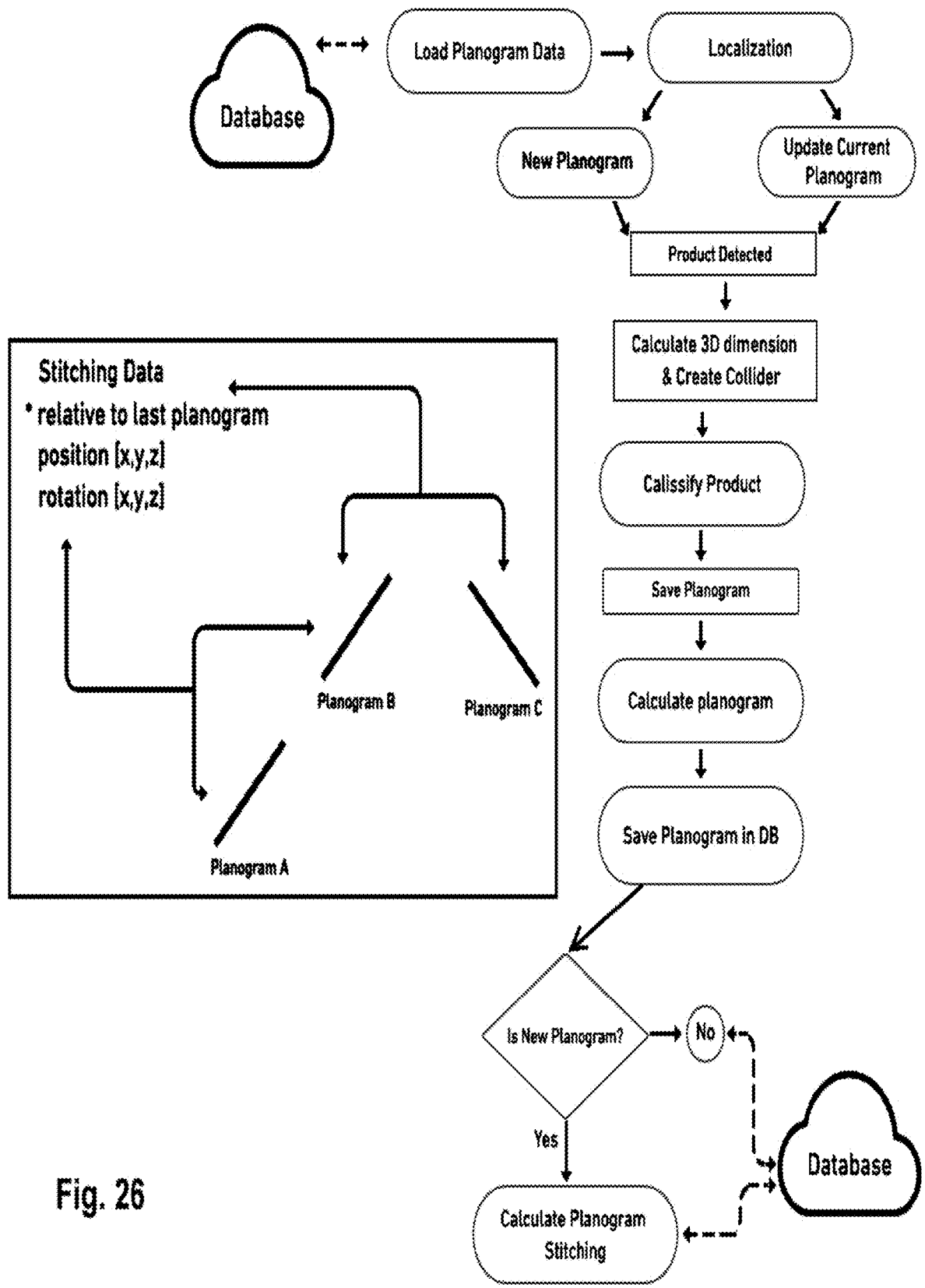
FIG. 26 is a flow-chart demonstrating planogram handling and stitching, in accordance with some demonstrative embodiments of the present invention.

Reference is made to FIG. 26, which is a flow-chart demonstrating planogram handling and stitching, in accordance with some demonstrative embodiments of the present invention. Planogram data is loaded from the database, and localization is performed; either a current planogram is updated, or a new planogram is created. A product is detected, 3D dimensions are calculated, and colliders are defined or created. Product classification is followed by saving the planogram, calculating it and updating the database; and if it is a new planogram then planogram stitching is performed relative to the last planogram detected. The method of FIG. 26 may be used, for example, for updating a store planogram (e.g., in real-time or in near-real-time), for matching between existing and planned/previous versions, for determining the user's 6DOF position in relation to the store map/planogram in a dynamic environment localization.

Figure 27A:
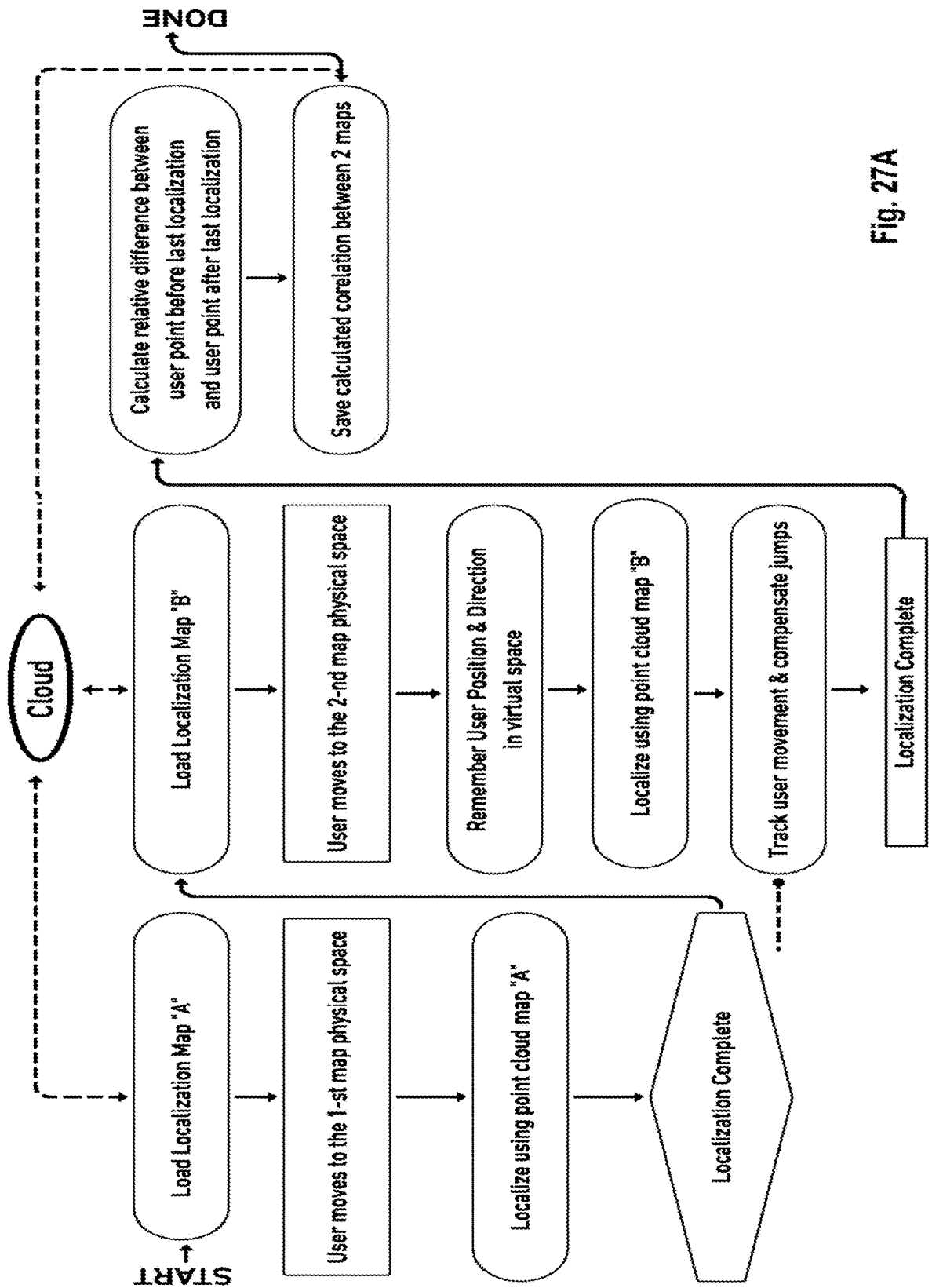
FIGS. 27A-27B are two parts of a flow-chart demonstrating stitching of point cloud maps, in accordance with some demonstrative embodiments of the present invention.
Figure 27B:
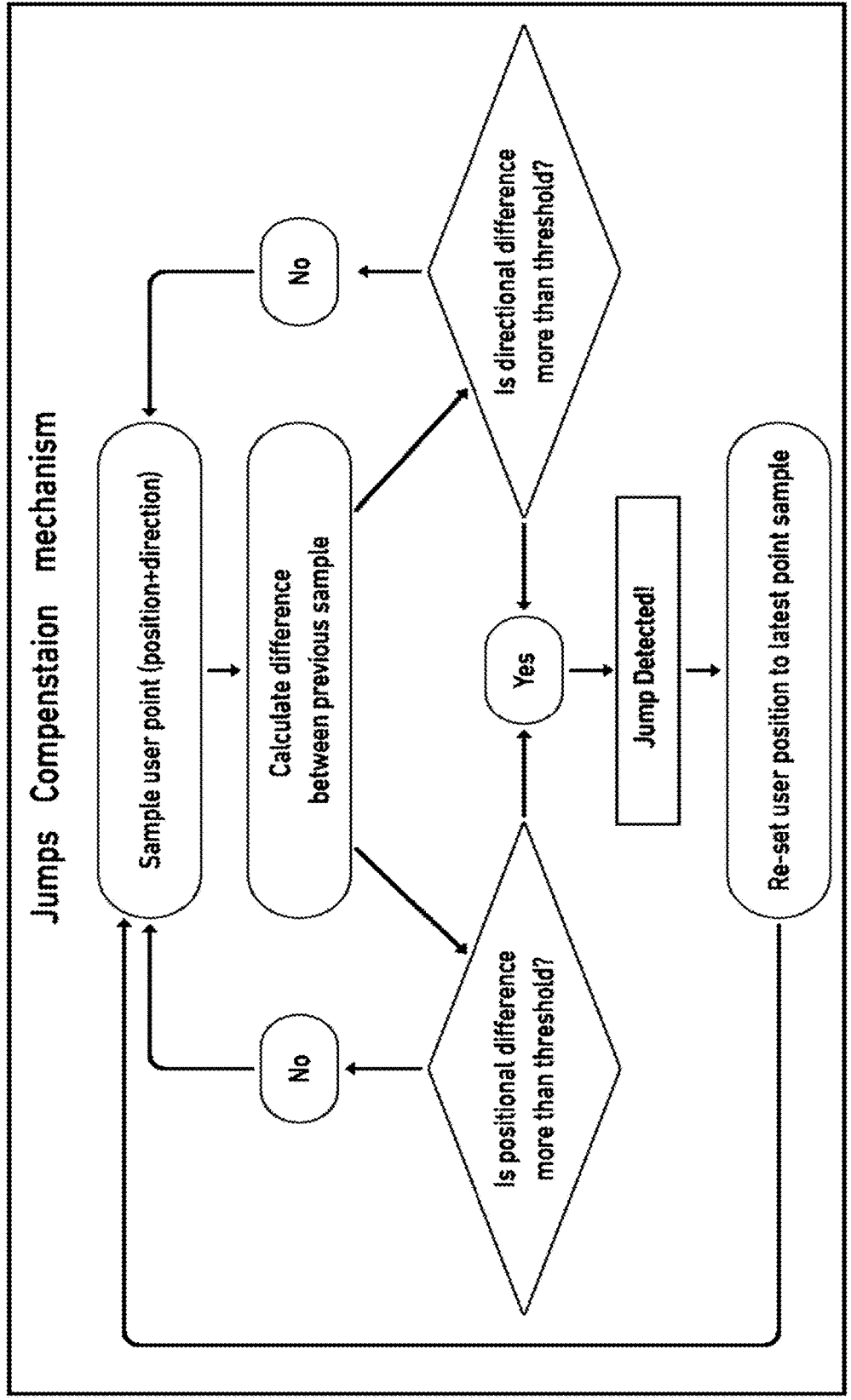

Reference is made to FIGS. 27A-27B, which are two parts of a flow-chart demonstrating stitching of point cloud maps, in accordance with some demonstrative embodiments of the present invention. For example, as demonstrated in FIG. 27A, localization map A is loaded; the user moves to the first physical space represented on that map; the user is localized using point cloud map A; and the localization is complete. Later, localization map B is loaded, and the user moves to the second physical space represented on that map; the system remembers and tracks the user's position and direction in virtual space, and localizes the user using point cloud map B. User movement is tracked through the session, and re-localization jumps compensation is performed, to complete the localization; the system then calculates the relative difference between (i) user point before last localization, and (ii) user point after last localization; and the calculated correlation between the two maps is saved.

Further in relation to the discussion of FIG. 27A, and for purposes of compensation between two localization maps, FIG. 27B demonstrates the Jumps Compensation mechanism or process: by sampling the user point (position and direction); calculating the difference relative to the previous sample; and if the directional difference is greater than a pre-defined threshold, and/or the positional difference is greater than another pre-defined threshold, then determining that a "jump" has occurred, and re-setting the user position to the latest point sample; otherwise, repeating the process with further sampling of the user point.

The Applicants have realized that conventional systems for mapping, which may include the utilization of cameras for capturing images or video or other footage, are not suitable for the purpose of real-time mapping and real-time localization of products and/or customers within an indoor retail store. The Applicants have realized, for example, that a conventional system may include a Google Maps car that travels slowly through a city, taking photos of its surrounding houses while tracking the GPS-based location of the car, and later constructing of a "street-view" representation of the houses on that street. The Applicants have realized that this conventional approach is not suitable for real-time mapping and real-time localization of products and/or customers within an indoor retail store, dur to multiple reasons. Firstly, houses on the street remain generally constant and fixed and non-changing, in their spatial location, in their quantity, and in their general characteristics; and even if they change (e.g., an old house is demolished and a new house is being constructed in its stead), such changes are typically slow and take months; whereas, in a retail store, every single minute, shelves of the store change their visual appearance as products are taken of the shelf by customers and/or as products are re-stocked onto the shelf by store associates. Secondly, houses on the street do not "shuffle" their locations; the Red House cannot move from Avenue A to Avenue B; whereas in a retail store, shuffling and in-store moving of products occurs very frequently, due to store promotions and due to holidays or national holidays or other reasons (e.g., Beer and Snacks appear on a shelf at the front of the store before an important sporting even such as the Super Bowl; costumes and accessories appear on certain shelves before Halloween; specific merchandise appears on shelves in the weeks that precede holidays such as Christmas or Valentine Day; or the like). Thirdly, houses on the street do not need to conform, at any given moment in time, to a pre-planned map or planogram, as houses do not move; whereas, products on the shelves of a retail store "move" since a customer took a bottle of Soda from the Soda Shelf, but later decided not to purchase it and has left the bottle on a shelf in the Toys section; or, a store associated has mistakenly placed a particular school-related item in the Toys section instead of in the School Supplies section; or the like. Fourthly, GPS-based localization provides sufficient granularity or resolution for the purposes of Outdoor mapping of a street of houses; but does not provide sufficient granularity or resolution for in-door localization of products and/or customers within a retail store, and also, GPS-based localization is typically unavailable within an indoor retail store (e.g., when the user or product is not immediately next to a window or a door and thus his electronic device does not have a line-of-sight with any GPS satellite). Fifthly, the mapping or imaging of streets or houses is performed in performed in a process that Knows the spatial location of the camera (based on GPS) and then knows to construct a "street view" image for that urban region based on captured images; whereas, the system of the present invention operates in an opposite manner: the system of the present invention continuously performs object recognition and product recognition based on computer-vision analysis of images captured within a retail store by a crowd-sourced plurality of end-user devices (e.g., of customers and/or store associates), and from the corpus of recognized objects, infers and detects location and localization and mapping insights. In other words, a Google Maps car that roams through a street of houses, firstly "knows" that it is located in a certain geographical location based on GPS data, and then captures images and tags them as correlating to said Known location; whereas, the present invention operates in an opposite way, of firstly taking images and recognizing their content, then inferring the indoor location based on the visual content analysis, and then constructing and updating product inventory maps and planograms based on the real-time data that was learned from captured images in the dynamically-changing environment of a retails store.

For demonstrative purposes, some portions of the discussion may relate to generating AR-based and/or VR-based content that is generated and displayed onto a Screen of an end-user device; however, some embodiments may utilize an AR/VR gear or sunglasses or helmet or other unit, which may not necessarily include a screen, and/or which may project or otherwise overlay visual data onto the field-of-view that the user sees with his eyes.

In some embodiments, the system and/or applications of the present invention may be implemented using names or titles such as, for example, "ARstore" or "AR store" or "AR-store", or "We R shopping" or "weR shopping" or We R shopper" or "weR shopper, or "We R AR shopper" or "We R AR shopping", "AR compass", "AR smart compass", or similar names and/or other names.

For demonstrative purposes, some portions of the discussion may relate to real-time or continuous object recognition, mapping and/or localization (as well as other operations) while the user is "walking" within the store; however, this is only a non-limiting example, and such operations may be performed while the user is standing but moving or rotating or spinning his end-user device and/or his hand and/or his arm and/or his body and without actually walking or moving his body; or while the user is running, or while the user is moving via other means (e.g., on a wheelchair), or the like.

In some embodiments, the system is able to recognize missing products that are typically located on a shelf that the user device is currently imaging, but that are missing or absent from such shelf right now; and may notify the user that a particular product is missing from that shelf; and may provide to the use the ability to request that this particular missing product, that is not available for immediate pick-up from the shelf and purchase, would be added to an online shopping cart of the user and would be delivered to his home, or would be purchased online for a later or subsequent pickup from this same store or from another store. In some embodiments, the system may operate to autonomously suggest such "missing products" to the user, as the user analyzes a captured image of a shelf, recognizes existing products and recognizes an empty space of a missing product, and then retrieves from a planogram or from a store map the indications and data (and images) of the missing product(s), to further propose to the user to purchase them separately online.

For demonstrative purposes, some portions of the discussion and/or some of the drawings may show a field-of-view from a first-person view; however, some embodiments may similarly operate to generate and display a "map view" or a "third-person view" or a "bird's eye" view, of a store or a portion of a store, with AR-based or VR-based content that is further displayed or presented as overlay upon such content; and may similarly generate and present navigation indicators, directions, arrows, running or moving avatars, pop-out or animated advertisements that appear to pop-out from a shelf or an aisle, gamification challenges, and/or other user experience processes which may be added similarly to such other types of views. Optionally, avatars of other shoppers or customers (or store associates) may be shown on such map views, enabling the user to see in advance which store-regions are crowded or are empty; and providing to the user, who is in Aisle 6, the unique ability to see in real-time that Aisle 7 is currently very crowded (has more than N persons in that aisle), while Aisle 5 is currently empty or is non-crowded (has N or less persons in that aisle).

In some embodiments, based on RF signal localization (e.g., Wi-Fi, cellular, Bluetooth, magnetic field, or the like), the system may generate a notification on the user's device, alerting the user to the possibility of invoking the visual navigation system of the present invention, the AR-based or VR-based content that can be generated, the AR-based or VR-based tools and gamification elements or gamification challenges, the Visual Search capabilities, and/or other features of the present invention; and may propose to the user to approve the utilization of such features on his device.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

Some embodiments of the present invention may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

The present invention may be implemented by using code or program code or machine-readable instructions or machine-readable code, which is stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such device to perform a method in accordance with the present invention.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process (es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a list of reference value(s) or a database of reference values or ranges; a comparison or matching or searching process which searches for matches and/or identical results and/or similar results and/or sufficiently-close results, among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Repeated use of the phrase "in one embodiment" does not necessarily refer to the same embodiment, although it may. Repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may comprise, or may be implemented by using, an "app" or application which may be downloaded or obtained from an "app store" or "applications store", for free or for a fee, or which may be pre-installed on a computing device or electronic device, or which may be transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A method comprising:
performing a crowd-sourced mapping and localization process for a dynamically-changing indoor environment, that (i) maps a retail store, and (ii) maps particular products that are actually currently sold on shelves within said retail store, and (iii) localizes users within said retail store, based on computer-vision analysis of a plurality of images captured by a plurality of hand-held or wearable end-user devices of customers within said retail store, wherein each hand-held or wearable end-user device comprises a camera and a processor and a spatial orientation sensor, and is moved and rotated by a respective end-user with six degrees of freedom that are sensed by said spatial orientation sensor, by performing non-barcode computerized image recognition of external packages of retail products that are depicted in said plurality of images captured by the plurality of end-user devices of customers, and identifying said retail products based on visual analysis their external packages that are facing aisles of said retail store;

generating an updated three-dimensional semantic representation of a store map reflecting actual and current real-time location of particular products within said retail store with six degrees of freedom, based on identification of said retail products via visual analysis of their external packages;

determining a precise spatial location of a particular end-user within said retail store, not based on and not limited by GPS or Wi-Fi or Bluetooth signal strength, but rather, by performing non-barcode computerized image recognition of external packages of retail products that are depicted in a plurality of images captured by an end-user device of said particular end-user;

creating an up-to-date three-dimensional semantic representation of said retail store and its current inventory, reflecting a current supply of products that are facing aisles of the retail store and reflecting their current and precise in-store spatial locations and arrangement, based on crowd-sourced images received from multiple end-users having multiple respective end-user devices;

wherein creating said up-to-date three-dimensional semantic representation comprises creating an inventory map representation that represents therein not only aisles and corridors in which end-users walk, but also actual real-time inventory and spatial placement of items and products on shelves of said retail store; and allocating a real-time real-life spatial location of each end-user and observed products that corresponds to a visual content depicted in each image;

wherein the method comprises: firstly, obtaining images and spatial data and spatial orientation data captured by end-user devices within the retail store and recognizing their content via said computerized image process; secondly, inferring a precise indoor location and a precise spatial arrangement of items based on visual content analysis of said images; and thirdly, reconstructing and updating three-dimensional product inventory maps of said retail store based on real-time data that was learned from captured images in a dynamically-changing indoor environment of said retail store;

wherein said localization process comprises:
(I) capturing an image of a retail shelf of said retail store by a particular end-user device that is equipped with a camera,
(II) performing non-barcode-based computerized image recognition of one or more retail products that are depicted in said image, based on recognition of visual elements of visible external packages,
(III) determining which products are depicted in said image,
(IV) querying a dynamically-changing inventory map of said retail store,
(V) obtaining from said dynamically-changing inventory map a current location of one or more image-depicted products within said retail store, and determining that said particular end-user is located at said current location.

2. The method of claim 1, comprising:
determining an actual location of a particular product within said retail store, and determining an actual spatial location and orientation of a particular end-user device within said retail store, based on fusion of data from at least: (i) Wi-Fi signal strength of a particular end-user device that imaged said particular product; (ii) computer-vision analysis of an image of said particular product captured by said particular end-user device; (iii) Global Positioning System (GPS) localization data of said particular end-user device which indicates, at least, in which retails store and in which region of said retail store the particular end-user device is currently located.

3. The method of claim 1, comprising:
(a) performing fusion of device localization data collected from multiple sensors that include at least two of: (i) a Wi-Fi based localization unit, (ii) a Bluetooth based localization unit, (iii) a GPS based localization unit, (iv) a Cellular localization unit;
(b) analyzing fused data generated in step (a), with results of a computer-vision analysis of an image of shelf of products captured by a camera of an end-user device;
(c) based on the analyzing of step (b), determining a high-accuracy indoor location of said end-user device within said retail store at an accuracy level of under 100 centimeters;
(d) based on said high-accuracy indoor location of said end-user device within said retail store: (I) selecting a specific advertisement for a specific product that is located on said shelf of product, and (II) generating an Augmented Reality (AR) promotional content for said specific product, and (III) displaying said AR promotional content on a screen of said end-user device over an actual real-time image depicting said shelf of products.

4. The method of claim 1,
wherein each of said end-user devices of said customers, performs locally its own process of computer-vision analysis of imaged products, and transfers to a central server data which comprises the computed results of said computer-vision analysis;
wherein each end-user device of each particular user, enables and performs at least one of:
(I) visual searching for a product via AR-based content, by receiving a user query to locate a specific product, determining an in-store and in-image location of said specific product, and generating a visual emphasis on the end-user device of said particular user which emphasizes visually said specific product;
(II) similarity searching for products via AR-based content, by receiving a user query to locate one or more products that are similar to a specific product or that substitute a specific product, by determining a relevant subset of products that are pre-defined as similar or substitutes, by determining the on-shelf location of products in said relevant subset of products, and by generating a visual emphasis of said subset of products or AR-based navigation directions towards said subset of products.

5. The method of claim 1, comprising performing at least one of:
(a) based on one or more images, captured by one or more end-user devices of customers in said retail store, detecting that a particular product is misplaced relative to its planned in-store location; and generating and sending an alert notification that said particular product is misplaced within said retail store;
(b) based on one or more images, captured by one or more end-user devices of customers in said retail store, detecting that an on-shelf inventory of particular product is non-matching a planned on-shelf inventory amount of said particular product; and generating and sending a product inventory discrepancy notification alert, regarding said particular product within said retail store.

6. The method of claim 1, comprising:
receiving a user request to generate turn-by-turn walking directions, for a current in-store location of the user, towards a destination product within said retail store;
determining a current in-store location of said user;
determining a destination in-store location of said destination product;
based on said store map, generating and conveying to said user, a set of turn-by-turn walking directions, from said current in-store location of said user, to said destination in-store location of said destination product.

7. The method of claim 6, wherein the generating comprises:
generating at least one walking direction, that is not aisle-based, and which guides said user to make a turn when he sees a particular interim product along his route to said destination product.

8. The method of claim 7, wherein the generating comprises:
continuously monitoring the location of said user as he walks within said retail store towards said destination product;
detecting a deviation of said user from a planned route that was suggested to said user in order to reach said destination product;
in response to said deviation, generating and conveying to said user at least one of: (i) a notification alert that he deviated from said planned route that was suggested in order to reach said destination product, (ii) a corrective set of turn-by-turn walking directions that guide said user along an adapted walking path from a current deviated in-store location to said destination product.

9. The method of claim 6, wherein the generating comprises:
determining that one or more prior shopping visits of said user in said retail store, have included said user purchasing a particular product in said retail store;
determining said particular product, that said user purchased in one or more prior shopping visits, is currently located at a particular aisle in said retail store;
generating said turn-by-turn walking directions towards said in-store destination product, by including in said walking directions also a direction to walk along said particular aisle which is an adaptive user-specific promotion path generated by said method specifically for said user, even if said particular aisle is not part of a shortest walking route towards said in-store destination product.

10. The method of claim 1, comprising:
(a) performing fusion of device localization data collected from multiple sensors that include at least two of: (i) a Wi-Fi based localization unit, (ii) a Bluetooth based localization unit, (iii) a GPS based localization unit, (iv) a Cellular localization unit;
(b) analyzing fused data generated in step (a), with results of a computer-vision analysis of an image of shelf of products captured by a camera of an end-user device;
(c) based on the analyzing of step (b), determining a high-accuracy indoor location of said end-user device within said retail store at an accuracy level of under 100 centimeters;
(d) based on said high-accuracy indoor location of said end-user device within said retail store, generating an Augmented Reality based (AR-based) virtual shopping assistant, and displaying it as an AR-based overlay of content on a screen of said end-user device, over an actual real-time image depicting said shelf of products; wherein said AR-based virtual shopping assistant provides to the user of said end-user device specific information regarding a specific product located on said shelf of products, wherein said specific information is one or more of: (I) a promotion related to said specific product, (II) information about characteristics of said specific product, (III) an advertisement related to said specific product, (IV) an advertisement for an alternative product to said specific product.

11. The method of claim 1, comprising:
receiving a user request to generate in-store walking directions that guide said user only to products that are currently associated with a promotion;
determining a current in-store location of said user;
determining a set of N products, that are currently sold in said retail store and that are currently associated with a promotion, and that are currently defined as products that are being promoted towards said user, wherein N is a positive integer;
determining N respective in-store locations of said N products;
generating a walking route for said user, which begins at said current location of said user, and guides said user to walk from product to product in said set of N products that are currently associated with a promotion.

12. The method of claim 1, comprising:
receiving a user request to generate in-store walking directions that guide said user only to products that are associated with a particular constraint;
wherein said particular constraint is one or more of: (i) being a gluten free product, (ii) being a vegan product, (iii) being a dairy free product, (iv) being a soy free product, (v) being an organic product, (vi) being a Kosher product, (vii) being an environmentally-friendly product, (viii) being a generic brand product, (ix) being a product associated with another constraint regarding one or more ingredients of said product;
determining a current in-store location of said user;
determining a set of N products, that are currently sold in said retail store and that are currently associated with said particular constraint, wherein N is a positive integer;
determining N respective in-store locations of said N products;

generating a walking route for said user, which begins at said current location of said user, and guides said user to walk from product to product in said set of N products that are currently associated with said particular constraint.

13. The method of claim 1, comprising:

monitoring in-store location of a particular user within said retail store, based on in-store location of his end-user device;

generating a user-specific heat map, that is tailored to said particular user, and that indicates particular aisle-segments in said retail store that said particular user typically visits and lingers at;

based on said user-specific heat map, and based on real-time inventory of products within said retail store, determining which specific products correspond to said particular aisle-segments;

based on said determining, selecting at least one specific product to promote to said particular user via his end-user device during a current shopping visit or a subsequent shopping visit of said user in said retail store.

14. The method of claim 1, comprising:

selectively providing a pre-defined reward, only to customers who participate in a crowd-sourced process of imaging and mapping in-store elements and products via their end-user devices as well as crowd-sourced collection of real-time on-shelf product inventory data, and not to customers that refused to participate in said crowd-sourced process of imaging and mapping and said crowd-sourced collection of real-time on-shelf product inventory data;

wherein said pre-defined reward comprises one or more of: a monetary amount, a crypto-currency, a discount coupon, a gift item, a store credit, a tangible item, a virtual item.

15. The method of claim 1, comprising:

receiving a user command, via his end-user device, to generate an x-ray vision version of said retail store;

determining a current in-store location of said end-user device;

based on computer-vision analysis, determining that said end-user device is currently facing a first particular shelf of a first particular aisle of said retail store;

based on the store map, determining which second particular shelf is located at a second particular aisle that is a next aisle relative to the first particular aisle that said end-user device is currently facing;

determining which specific products are currently available for sale on said second particular shelf of said second particular aisle, by performing real-time computerized vision analysis of crowdsourced images that are collected from other end-user devices in said retail store, and by recognizing particularly currently-available products that are depicted in said crowdsourced images;

causing the end-user device of said user, to display images of said specific products that are currently available for sale on said second particular shelf of said second particular aisle.

\* \* \* \* \*